(12) United States Patent
Ali-Santosa

(10) Patent No.: US 6,654,017 B1
(45) Date of Patent: Nov. 25, 2003

(54) SMOOTHING OF LINE SEGMENTS ON A COMPUTER DISPLAY

(75) Inventor: Gunawan Ali-Santosa, Milpitas, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 422 days.

(21) Appl. No.: 09/679,430

(22) Filed: Oct. 3, 2000

Related U.S. Application Data

(63) Continuation-in-part of application No. 09/588,635, filed on Jun. 6, 2000, and a continuation-in-part of application No. 09/544,868, filed on Apr. 7, 2000, which is a continuation-in-part of application No. 09/544,658, filed on Apr. 6, 2000.

(51) Int. Cl.⁷ .............................................. G06T 11/20
(52) U.S. Cl. ........................ 345/443; 345/610; 345/611
(58) Field of Search ................................ 345/443, 610, 345/611

(56) References Cited

U.S. PATENT DOCUMENTS

| | | | | |
|---|---|---|---|---|
| 4,808,988 A | * | 2/1989 | Burke et al. ................. | 345/440 |
| 5,625,768 A | * | 4/1997 | Dye ............................. | 395/141 |
| 6,295,044 B1 | * | 9/2001 | Geisow et al. ................ | 345/97 |
| 6,337,686 B2 | * | 1/2002 | Wong et al. ................. | 345/443 |

* cited by examiner

*Primary Examiner*—Matthew C. Bella
*Assistant Examiner*—Tam Tran
(74) *Attorney, Agent, or Firm*—Thelen Reid & Priest LLP; Marc S. Hanish

(57) ABSTRACT

The middle of line segments may be drawn on a computer display using an iterative method that reduces the number of calculations required. The process is repeated for each column. The first pixel is plotted according to a formula that allows the first pixel to best represent the location of the line in the column. A second pixel is then plotted either above, below, to the left of, or the right of the first pixel depending on the direction of the line. A normalized intensity value between 0 and 1.0 is then assigned to the first pixel according to the amount of area above, below, to the left of, or the right of the line in the first pixel depending on the direction of the line. This value may be assigned using a variable computed in plotting the first pixel. A normalized intensity value for the second pixel equal to 1.0 minus the normalized intensity value of the first pixel may then be assigned. Finally, the first and second pixels are shaded according to the normalized intensity values.

56 Claims, 37 Drawing Sheets

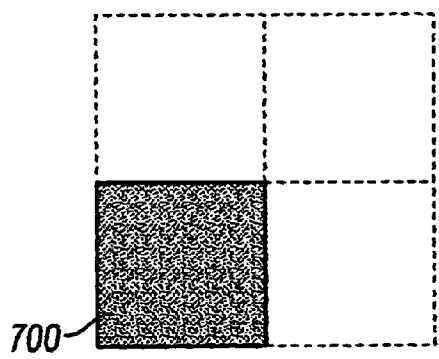
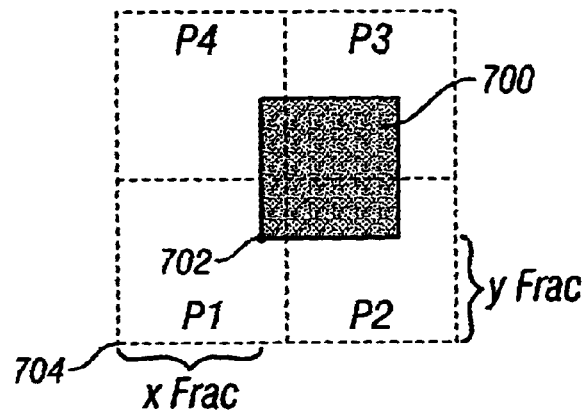
FIG. 7A     FIG. 7B
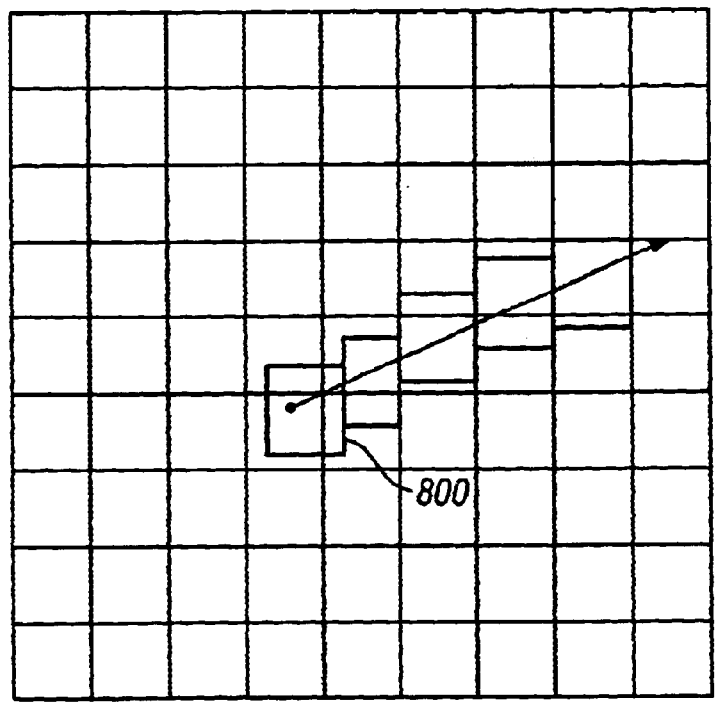
FIG. 8

|   | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0 | 100 | 0F0 | 0E0 | 0D0 | 0C0 | 0B0 | 0A0 | 090 | 080 | 070 | 060 | 050 | 040 | 030 | 020 | 010 |
| 1 | 0F0 | 0E1 | 0D2 | 0C3 | 0B4 | 0A5 | 096 | 087 | 078 | 069 | 05A | 04B | 03C | 02D | 01E | 00F |
| 2 | 0E0 | 0D2 | 0C4 | 0B6 | 0A8 | 09A | 08C | 07E | 070 | 062 | 054 | 046 | 038 | 02A | 01C | 00E |
| 3 | 0D0 | 0C3 | 0B6 | 0A9 | 09C | 08F | 082 | 075 | 068 | 05B | 04E | 041 | 034 | 027 | 01A | 00D |
| 4 | 0C0 | 0B4 | 0A8 | 09C | 090 | 084 | 078 | 06C | 060 | 054 | 048 | 03C | 030 | 024 | 018 | 00C |
| 5 | 0B0 | 0A5 | 09A | 08F | 084 | 079 | 06E | 063 | 058 | 04D | 042 | 037 | 02C | 021 | 016 | 00B |
| 6 | 0A0 | 096 | 08C | 082 | 078 | 06E | 064 | 05A | 050 | 046 | 03C | 032 | 028 | 01E | 014 | 00A |
| 7 | 090 | 087 | 07E | 075 | 06C | 063 | 05A | 051 | 048 | 03F | 036 | 02D | 024 | 01B | 012 | 009 |
| 8 | 080 | 078 | 070 | 068 | 060 | 058 | 050 | 048 | 040 | 038 | 030 | 028 | 020 | 018 | 010 | 008 |
| 9 | 070 | 069 | 062 | 05B | 054 | 04D | 046 | 03F | 038 | 031 | 02A | 023 | 01C | 015 | 00E | 007 |
| A | 060 | 05A | 054 | 04E | 048 | 042 | 03C | 036 | 030 | 02A | 024 | 01E | 018 | 012 | 00C | 006 |
| B | 050 | 04B | 046 | 041 | 03C | 037 | 032 | 02D | 028 | 023 | 01E | 019 | 014 | 00F | 00A | 005 |
| C | 040 | 03C | 038 | 034 | 030 | 02C | 028 | 024 | 020 | 01C | 018 | 014 | 010 | 00C | 008 | 004 |
| D | 030 | 02D | 02A | 027 | 024 | 021 | 01E | 01B | 018 | 015 | 012 | 00F | 00C | 009 | 006 | 003 |
| E | 020 | 01E | 01C | 01A | 018 | 016 | 014 | 012 | 010 | 00E | 00C | 00A | 008 | 006 | 004 | 002 |
| F | 010 | 00F | 00E | 00D | 00C | 00B | 00A | 009 | 008 | 007 | 006 | 005 | 004 | 003 | 002 | 001 |

FIG. 14

SMOOTHING OF LINE SEGMENTS ON A COMPUTER DISPLAY

STATEMENT OF RELATED APPLICATIONS

This application claims is a continuation-in-part of co-pending application Ser. No. 09/588,635, entitled "Efficiently Rendering Line Segments on a Computer Display" by Gunawan Ali-Santosa, filed on Jun. 6, 2000 and a continuation-in-part of co-pending application Ser. No. 09/544,868, entitled "Apparatus for Approximation of Caps of Smooth Line Segments" by Gunawan Ali-Santosa, filed on Apr. 7, 2000, which was a continuation of co-pending application Ser. No. 09/544,658, entitled "Method for Approximation of Caps of Smooth Line Segments, by Gunawan Ali-Santosa, filed on Apr. 6, 2000.

BACKGROUND OF THE INVENTION

1. Field Of The Invention

The present invention relates to computer displays. More specifically, the present invention relates to a method for the approximation of caps of line segments on computer displays.

2. The Background

A computer display is made up of rows and columns of pixels. Each pixel may be very small. However, computer display technology has not yet advanced to the point where the pixels are small enough to avoid several limitations encountered when graphics are viewed by the human eye.

Sampling of images to be displayed on a computer, or of equations representing lines, results in a somewhat jagged appearance, also called the "staircase" effect. This is due to the fact that the sampling process digitizes coordinate points on an object or line to discrete integer pixel positions, resulting in an image having staggered edges. This distortion is also called "aliasing". FIG. 1 is a diagram illustrating the staircase effect. Line 100 is sampled and then displayed using a group of shaded pixels 102. One can see by viewing the shaded pixels 120 that they appear jagged and suffer from the staircase effect.

Techniques used to decrease the aliasing suffered in computer graphics are known collectively as antialiasing techniques. The most obvious antialiasing technique is to simply increase the resolution of the display, so that each pixel is smaller. However, as discussed earlier, computer monitor technology as of yet does not provide for a display with such small pixels that aliasing is not viewable to the human eye.

A common antialiasing method is to increase the sampling rate by treating the display as if it were covered by a finer grid than it really is. This is known as supersampling. Supersampling works best on displays which are capable of displaying pixels at different intensities. In these displays, each pixel is actually made up of many subpixels, which can be turned on or off in certain patterns to give the pixel a specific intensity.

Typical supersampling techniques attempt to smooth the staircase effect by using the surrounding pixels. FIG. 2 is a diagram illustrating a supersampling technique applied to the aliased line of FIG. 1. The group of shaded pixels 200 is now much wider than in FIG. 1, and there is less of a staircase effect simply because they are wider. However, this technique also utilizes the ability to vary intensity of each pixel to smooth the edges of the line. For example, without the ability to vary intensities, pixel 202 would have to be completely shaded. However, by selectively turning on or off certain subpixels within pixel 202, it give the viewer the impression that only a region of pixel 202 is filled, and thus makes the line appear much smoother.

One drawback to supersampling is that identifying subpixels to be selectively turned on and off requires a larger number of calculations than simply determining which pixels are along a line path. These calculations are further complicated by the fact that the position of the line path within each pixel varies depending on the slope of the line. In a 45-degree line, the line path cuts each pixel in half diagonally, but a 30-degree line path does not.

Endpoints of a line, also known as caps, require very complex calculations, such as inverse squares. FIG. 3 is a diagram illustrating a single pixel containing an end-point of a line. The mathematical line 300 is known, and therefore the length of segment c can be determined fairly easily. However, the area of the entire shaded region 302 must be determined in order to determine the intensity of the pixel and the orientation of the subpixels. This involves numerous computations using the Pythagorean theorem, beginning with determining a from b and c (according to the Pythagorean theorem, $a^2+b^2=c^2$, so in order to determine a, a square root, or in computer terms inverse root must be computed).

Similar computations must be made to determine the "middle" of the line, or the segment portion. Thus, repeated complex calculations must be made, which can create problems with limited processing power.

Line segments are represented as mathematical equations. Each segment will have a starting point, and ending point, and a slope. While some line segments may be relatively easy to draw on a computer display, such as precisely horizontal or vertical lines, most lines require some degree of approximation in choosing which pixels to illuminate in order to best represent the line segment to a viewer.

FIG. 4 is a diagram illustrating a line segment overlaid on a group of pixels. As can be seen, decisions must be made as to which pixels should be illuminated. For example, in column 2, a decision must be made between pixel 400 and pixel 402.

A common method for determining which pixels to illuminate to best represent a line segment is Bresenham's line algorithm. In Bresenham's approach, for lines with slopes between 0 and 1, pixel positions along a line segment are determined by sampling the line in one-pixel increments. Therefore, the process starts at the starting point 404 and steps to each successive column. At each column, the pixel is chosen whose y value is closest to the line segment.

Starting from the left end-point $(x_0,y_0)$ of a given line, the process steps to each successive column (x position) and illuminates the pixel whose scan-line y value is closest to the line segment. FIG. 5 is a diagram illustrating the kth step in this process. Assuming that the pixel at $(x_k,y_k)$ is to be displayed, the process needs to determine which pixel to plot in column $x_{k+1}$. The choices are the pixels at positions $(x_k+1,y_k)$ and $(x_k+1,y_k)$.

At sampling position $x_k+1$, the vertical pixel separations from the mathematical line path may be termed $d_1$ and $d_2$. The y coordinate on the mathematical line segment at pixel column position $x_k+1$ is calculated as $$y=m(x_k+1)+b$$

where m=dy/dx
Then $$d_1=y-y_k$$

$$d_1=m(x_k+1)+b-y_k$$

$$d_2=(y_k+1)-y$$

$$d_2=y_k+131\ m(x_k+1)-b$$

The difference between these two separations is $$d_1-d_2=2m(x_k+1)-2y_k+2b-1$$

The decision parameter $p_k$ for the kth step in the line process may be determined by rearranging the equations so that they only involve integer calculations. This may be accomplished by substituting $m=\cdot y/\cdot x$, where $\cdot y$ and $\cdot x$ are the vertical and horizontal separations of the endpoint positions, and defining:

$$p_k=\cdot x(d_1-d_2)$$

$$p_k=2\cdot y\cdot x_k-2/\cdot x\cdot y_k+c$$

The sign of $p_k$ is the same as the sign of $d_1-d_2$, since in the present case $\cdot x>0$. Parameter c is constant and has the value $2\cdot y+\cdot x(2b-1)$, which is independent of pixel position and will be eliminated in the recursive calculations for $p_k$. If the pixel at $y_k$ is closer to the line path than the pixel at $y_k+1$ (that is, $d_1<d_2$), then decision parameter $p_k$ is negative. In that case, the lower pixel is illuminated, otherwise the upper pixel is illuminated.

Coordinate changes along the line occur in unit steps in either the x or y directions. Therefore, the values of successive decision parameters can be obtained using incremental integer calculations. At step k+1, the decision parameter is evaluated as $$P_{k+1}=p_k+2\cdot y\cdot x_{k+1}-2\cdot x\cdot y_{k+1}+c$$

Subtracting $p_k=2\cdot y\cdot x_k-2/\cdot x\cdot y_k+c$ from the preceding equation, we have $$P_{k+1}p_k=2\cdot y(x_{k+1}-x_k)-2\cdot x(y_{k+1}+y_k)$$

But $x_{k+1}=x_k+1$, so that $$P_{k+1}=p_k+2\cdot y-2\cdot x(y_{k+1}+y_k)$$

where the term $y_{k+1}+y_k$ is either 0 or 1, depending on the sign of parameter $p_k$.

This iterative calculation of decision parameters is performed at each integer x position, starting at the left coordinate endpoint of the line. The first parameter, $p_0$, is evaluated at the starting pixel position $(x_0, y_0)$ and with m evaluated as $\cdot y/\cdot x$:

$$p_0+2\cdot y-\cdot x$$

Bresenham's method may be summarized as follows (for slope value between −1 and 1):

1. Begin with starting point $(x_0, y_0)$
2. calculate the following constants:
   Δx—the change in x over the entire line segment
   Δy—the change in y over the entire line segment
   2Δy
   2Δy−2Δx
3. Calculate the starting value for the decision parameter (p) as $$p_0=2\Delta y-\Delta x$$

4. At each $x_k$, along the line segment, starting at k=0, perform the following test: if $p_k<0$, the next point to plot is $(x_k+1, y_k)$ and $$p_{k+1}=p_k+2\Delta y$$

Otherwise, the next point to plot is $(x_k+1, y_k+1)$ and $$p_{k+1}=p_k+2\Delta y-2\Delta x$$

5. Repeat step 4 for each column until the ending point is reached.

An inverse root is one of the most complicated computations a processor can make. In recent years, there has been movement away from powerful mainframe computers to smaller, cheaper, less powerful processors, such as those that may be contained in hand-held computers or laptop computers. These types of processors, due to market pressures, are therefore very cost and size sensitive.

While in a large computer, antialiasing techniques may be applied using hardware, such as graphics cards, the space may not be available for such hardware in these smaller, less powerful processors. Additionally, the cost of implementing the techniques in hardware may be prohibitive. Therefore, it would be preferable to perform such techniques using software.

However, performing the traditional antialiasing in software would take too much processing power due to all the inverse squares that would have to be calculated, which would slow down the processor to intolerable levels. What is needed is a solution which allows for an antialiasing technique to be applied and approximation of line segments to be performed which could be performed by software but which do not use as much processing power as traditional techniques.

SUMMARY OF THE INVENTION

The middle of line segments may be drawn on a computer display using an iterative method that reduces the number of calculations required. The process is repeated for each column. The first pixel is plotted according to a formula that allows the first pixel to best represent the location of the line in the column. A second pixel is then plotted either above, below, to the left of, or the right of the first pixel depending on the direction of the line. A normalized intensity value between 0 and 1.0 is then assigned to the first pixel according to the amount of area above, below, to the left of, or the right of the line in the first pixel depending on the direction of the line. This value may be assigned using a variable computed in plotting the first pixel. A normalized intensity value for the second pixel equal to 1.0 minus the normalized intensity value of the first pixel may then be assigned. Finally, the first and second pixels are shaded according to the normalized intensity values.

BRIEF DESCRIPTION OF THE DRAWINGS

FIG. 7A is a diagram illustrating an example of a case in which the shaded region of a cap falls precisely within a single pixel.

FIG. 7B is a diagram illustrating an example of a case in which the shaded region of a cap falls within the purview of four pixels.

FIG. 8 is a diagram illustrating a problem with using four pixels to draw a cap of a line segment.

FIG. 14 is an example of a look-up table in accordance with a presently preferred embodiment of the present invention.

DETAILED DESCRIPTION OF A PREFERRED EMBODIMENT

Those of ordinary skill in the art will realize that the following description of the present invention is illustrative only and not in any way limiting. Other embodiments of the invention will readily suggest themselves to such skilled persons after review of this disclosure.

In accordance with a presently preferred embodiment of the present invention, the components, processes and/or data structures are implemented using software. Different implementations may be used and may include other types of programming languages, computing platforms, computer programs, firmware and/or general purpose machines. In addition, those of ordinary skill in the art will readily recognize that devices of a less general purpose nature, such as hardwired devices, devices relying on FPGA (field programmable gate array) or ASIC (Application Specific Integrated Circuit) technology, or the like, may also be used without departing from the scope and spirit of the inventive concepts disclosed herein.

Figure 3:
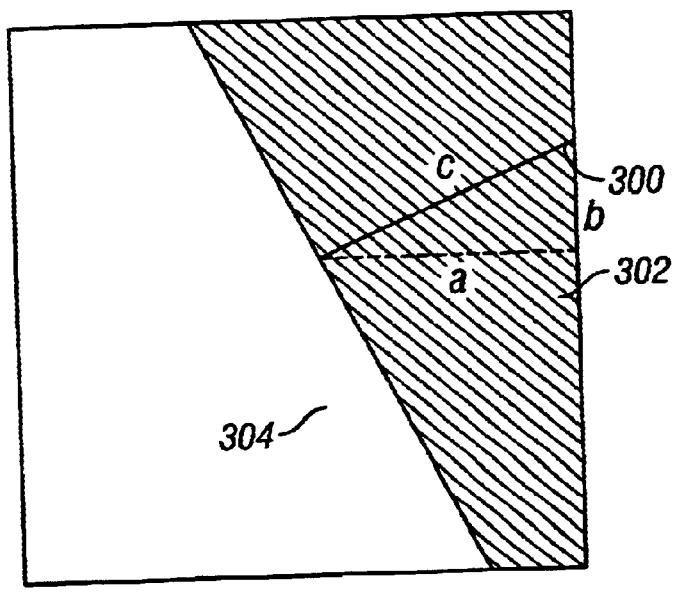
FIG. 3 is a diagram illustrating a single pixel containing an endpoint of a line.
Figure 4:
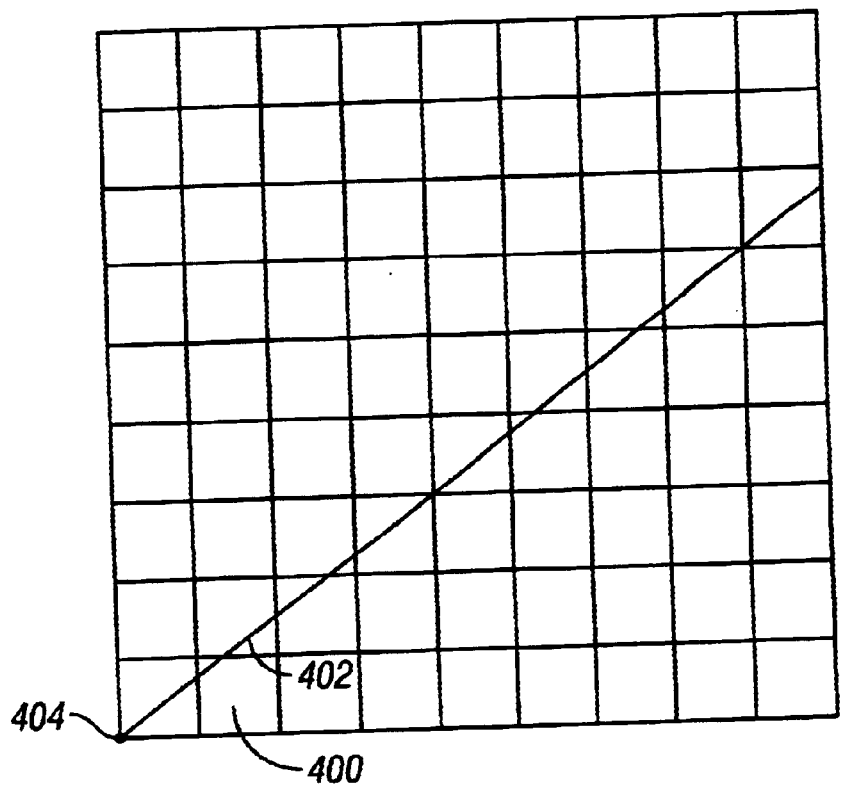
FIG. 4 is a diagram illustrating a line segment overlaid a group of pixels.
Figure 5:
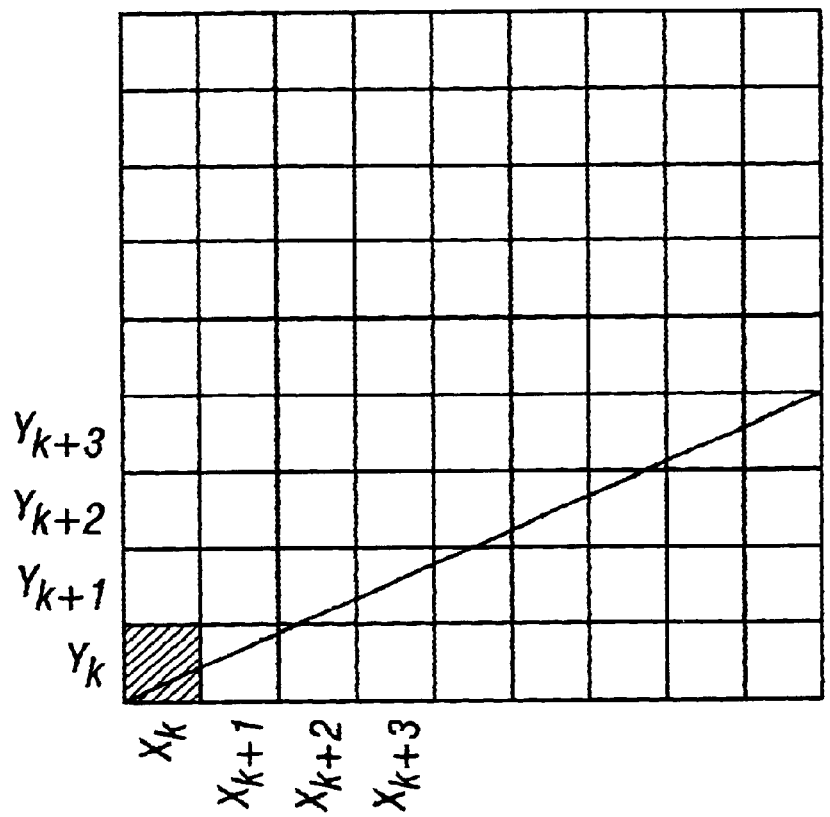
FIG. 5 is a diagram illustrating the kth step in a process for determining which pixels to illuminate.

As depicted in FIG. 3, traditional anti-aliasing techniques draw endpoints of a line by using subpixel orientation to make the endpoint appear to be trapezoidal in nature, causing the far side of the endpoint 304 to be diagonal, except in the case where the line being drawn is perfectly horizontal or vertical. This diagonal far side 304 causes the computation of the area of the shaded region to be fairly complex.

Figure 6:
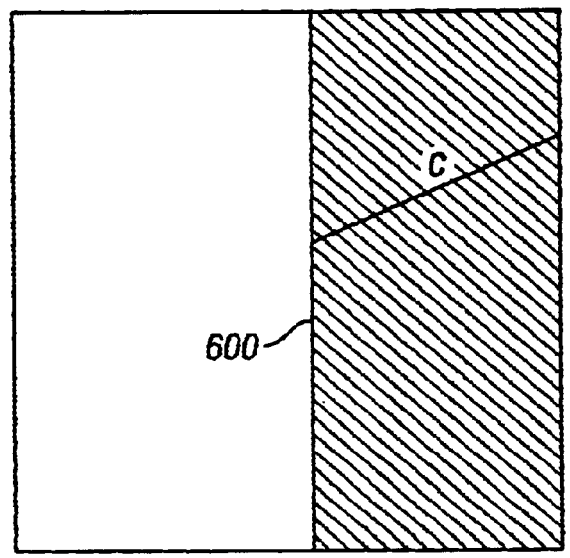
FIG. 6 is a diagram illustrating a cap pixel containing the line c from FIG. 3 drawn using the anti-aliasing technique of a presently preferred embodiment of the present invention.

In a specific embodiment of the present invention, the cap is drawn as rectangular, rather than trapezoidal, no matter what the angle of the line is, with the far side being parallel or perpendicular to the x-axis. FIG. 6 is a diagram illustrating the line c 300 from FIG. 3 drawn using the anti-aliasing technique of a presently preferred embodiment of the present invention. Far side 600 is now perpendicular to the x-axis. Now the computation of the area of the shaded region can be performed without any inverse squares, as the area of a rectangle can be determined by simply multiplying its width by its height. Additionally, the human eye will not notice any significant difference between the endpoint drawn using the old anti-aliasing techniques and the endpoint drawn using the anti-aliasing technique of a presently preferred embodiment of the present invention.

This is accomplished by first computing a square, at one corner of which is the mathematical origin (or endpoint) of the line segment, and the length of any side being the thickness of the line segment. For purposes of this application, this area may be termed the "shaded region". The region may be chosen so that the mathematical origin lies at any corner, but in a presently preferred embodiment of the present invention, the mathematical origin will lie in the bottom left corner of the shaded region. For illustrative purposes, this application will assume a line thickness of one pixel. However, one of ordinary skill in the art will recognize that the same or similar techniques could be applied to lines having any thickness. If the shaded region falls precisely within a single pixel, then the depiction of that origin on a computer display may normally be as easy as lighting up the pixel at the intensity level of the line. FIG. 7A is a diagram illustrating an example of a case where the shaded region 700 falls precisely within a single pixel P1.

However, it is much more common for the shaded region to fall over several pixels. FIG. 7B is a diagram illustrating an example of a case where the shaded region 700 falls within the purview of four pixels, labeled P1, P2, P3, and P4. In such a case, the intensities of the four pixels P1, P2, P3, and P4 may be individually altered so as to give the appearance of the square being precisely placed at its proper location. The details of such a procedure are outside the scope of this application. Therefore, for purposes of this application, such a procedure will be described only as far as the determination of what intensities each pixel must display.

To determine the intensities of the pixels containing the shaded region, the distances from a fixed point at one of the corners of the 4-pixel grouping must be computed (there of course, may be more pixels involved if the line segment thickness is greater). For simplicity, the corner chosen is the bottom left-hand corner 702. Then an x-fraction (xfrac) and y-fraction (yfrac) are determined as (respectively) the distance of the mathematical origin 704 from that chosen corner point (since the mathematical origin, as discussed earlier, is at the bottom left hand corner of the shaded region 700). The length of any pixel is 1.0, therefore xfrac and yfrac will each be between 0 and 1. It should be noted that it is not necessary for either the mathematical origin 704 or the corner chosen for measurement 702 be in the bottom left corner. The same or similar results can be achieved by measuring the distances from any corner of the four pixels P1, P2, P3, P4 to the closest corner of the shaded region 700.

Once xfrac and yfrac are determined, the intensities of the various pixels may be computed using the following formulas:

$P1: (1.0-xfrac)*(1.0-yfrac)$ $P2: xfrac*(1.0-yfrac)$ $P3: xfrac*yfrac$ $P4: (1.0-xfrac)*yfrac$ Again, this formula is streamlined under the assumption that the mathematical origin and corner chosen for measurement are both in the bottom left hand corner, with P1 being the pixel containing both those corners, and the pixels counting upwards as they extend counter-clockwise. This formula may be modified if any of these assumptions are varied.

This in essence gives the overlapped area on each pixel. These values may be adjusted by the full intensity value of the line segment being drawn, which yields the intensity value of each pixel being covered by the true origin. If the line thickness is such that some pixels in the middle of the origin are completely shaded, obviously that would require no further calculations. There will always be no more than 4 pixels covered by the shaded region which require calculations in order to vary their intensities (at most 4 pixels being only partially shaded).

Figure 9:
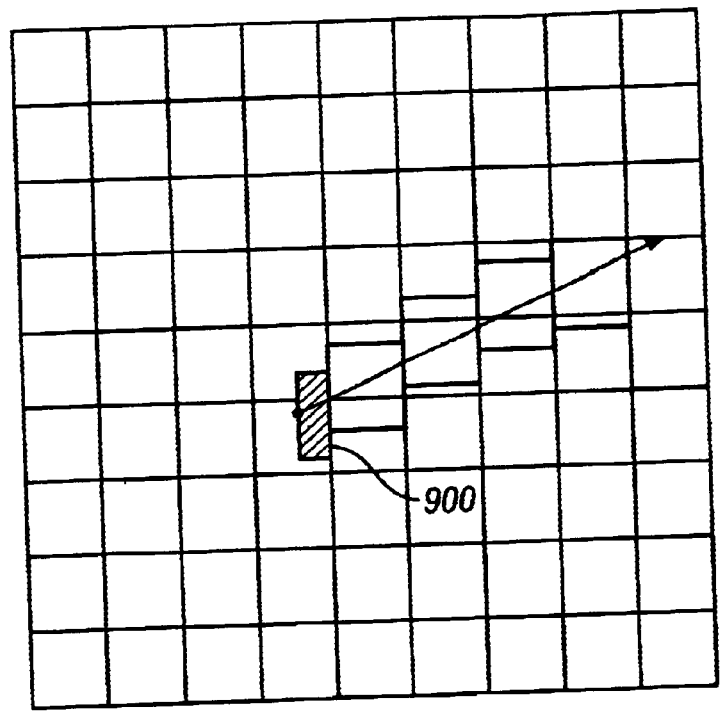
FIG. 9 is a diagram illustrating a sampling of a line in accordance with a presently preferred embodiment of the present invention.

When a line is not perfectly horizontal or vertical, a problem is encountered in that one does not necessarily wish to use four (or more) pixels to draw the endpoint, as that may result in more problems with the staircase effect. FIG. 8 is a diagram illustrating a problem with using four pixels to draw the starting point of a line segment. The intensity applied to the portion of pixel 800 may be too intense given the slope of the line and could give the impression that the line actually starts out by moving in the horizontal direction before moving in its true direction. FIG. 9 is a diagram illustrating a preferable sampling of the line, where the horizontal extension of the first few pixels 900 is not as prevalent.

Therefore, while it is useful to "sample" the starting and ending points of a line segment using four pixels, it is preferable to only draw them using two pixels. The question then becomes, which two pixels? Obviously the pixels should be contiguous, and also should be placed so that the "direction" of the cap is the same as the direction in which the line extends (i.e. if the line extends more vertically than horizontally, the two pixels should be contiguous horizontally, while if the line extends more horizontally than vertically, the two pixels should be contiguous vertically). An additional choice might be to have that the two pixels chosen such that one of them contains the mathematical origin. Therefore, only the intensities of the two pixels to be illuminated for the starting or end cap need to be computed. This also has the advantage of saving on computing time.

Figure 10A:
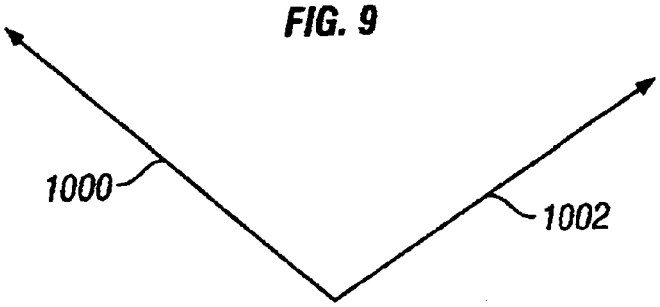
FIG. 10A is a diagram illustrating a mathematical representation of two line segments originating from the same point yet extending in different directions.
Figure 10B:
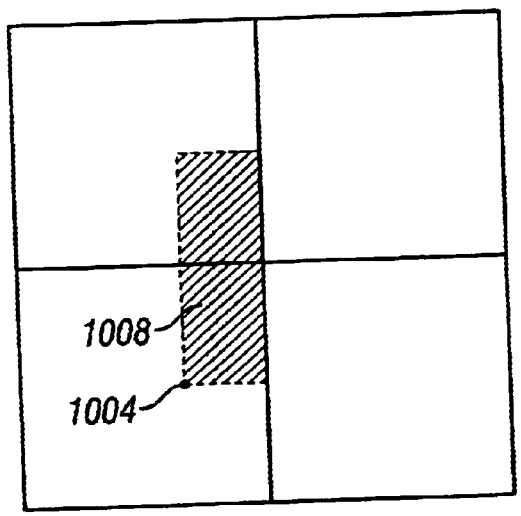
FIG. 10B is a diagram illustrating how a four pixel grouping may display the starting caps of the two line segments of FIG. 10A.

A problem, however, may be encountered if this method is applied. When two lines originate at the same point yet extend in different directions, there may be a perceptual problem that appears. FIGS. 10A–10F are diagrams illustrating such a problem. FIG. 10A is a diagram illustrating a mathematical representation of what two line segments 1000 and 1002 originating from the same point yet extending in different directions should look like. FIG. 10B is a diagram illustrating how a four pixel grouping using the method outlined above would display the origin points of the two line segments. Point 1004 is the mathematical origin of both line segments. According to the scheme described above, the region illuminated for line 1000 is region 1006, while the same region would be illuminated for line 1002.

Figure 10C:
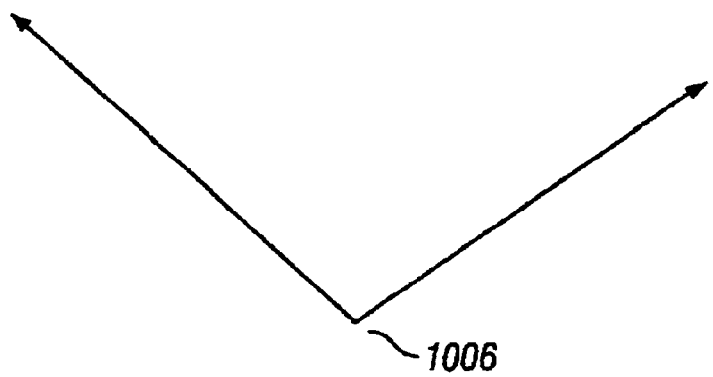
FIG. 10C is a diagram illustrating how drawing the starting caps using the four pixel grouping of FIG. 10B may create a problem on a computer display.

FIG. 10C, however, is a diagram illustrating how drawing the starting points according to this scheme may create a problem on a computer display. The lines may appear to not completely connect at area 1006.

Figure 10D:
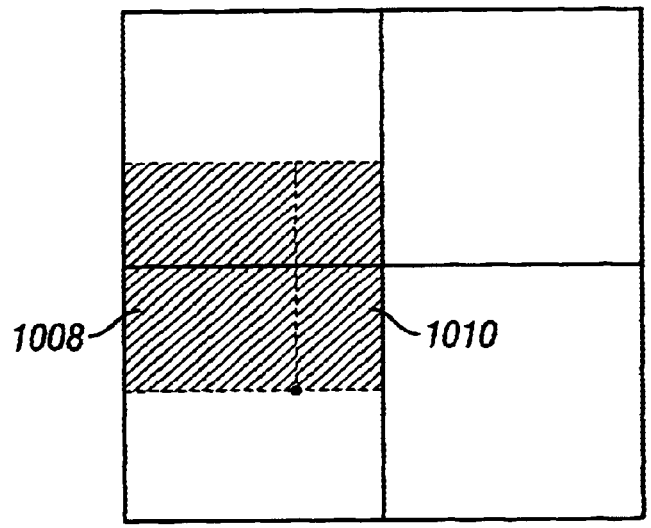
FIG. 10D is a diagram illustrating how a four pixel grouping according to an older scheme may display the starting caps of the two line segments of FIG. 10A.

Under an old scheme, the corner of the shaded region having the mathematical origin would actually vary according to the direction of the line segment. Thus, line 1000 would have the origin in the bottom right hand corner rather than the lower left. FIG. 10D is a diagram illustrating the four pixel grouping according to this older scheme, where line segment 1000 would produce a starting cap in region 1008, while line segment 1002 would produce a starting cap in region 1010.

Figure 10E:
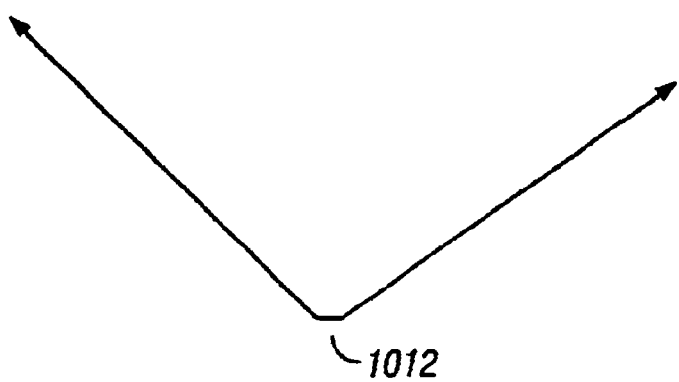
FIG. 10E is a diagram illustrating how drawing the starting caps using the four pixel grouping of FIG. 10D may create a problem on a computer display.
Figure 10F:
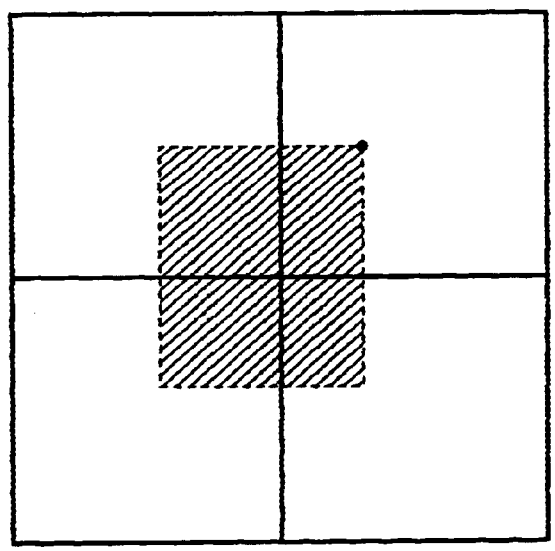
FIG. 10F is a diagram illustrating the orientation of regions drawn for the starting caps of the two line segments of FIG. 10A in accordance with a presently preferred embodiment of the present invention.

FIG. 10E, however, is a diagram illustrating how drawing the starting points according to this scheme may also create a problem on a computer display. The origin point 1012 may appear as a horizontal segment. In order to remedy both these situations, it is preferable to draw the origin points in different pixels even though the mathematical origins of the two line segments are identical. FIG. 10F is a diagram illustrated the preferred orientation of the regions drawn for the starting caps for line segments 1000 and 1002.

According to a specific embodiment of the present invention, the caps of a line are not always drawn covering the pixel that contains its mathematical origin. As described earlier, the cap is still drawn with two pixels rather than four, and the orientation of the pixels being drawn still corresponds to the four pixel sampling configuration determined earlier. However, the two pixels actually illuminated are chosen according to the following formula:

Starting Cap:
(1) if the line is extending in the positive direction, the pixels are chosen according to the normal scheme (including the pixel containing the mathematical origin)
(2) if the line is extending in the negative direction, the pixels chosen are offset by one pixel (pixels opposite the pixel containing the mathematical origin)

Ending Cap:
(1) if the line is extending in the negative direction, the pixels are chosen according to the normal scheme (including the pixel containing the mathematical origin)
(2) if the line is extending in the positive direction, the pixels chosen are offset by one pixel (pixels opposite the pixel containing the mathematical origin)

This formula may then be simplified by stating that the said intensity values for a starting cap are zero for any shaded pixels on a side of said group of shaded pixels in the same direction as said direction of said line segment if said direction is between −45 degrees and 135 degrees, said intensity values being zero for any shaded pixels on a side of said group of shaded pixels in the opposite direction as said direction of said line segment if said direction of said line segment is between 135 degrees and 180 degrees or between −45 degrees and −180 degrees. Additionally, only the intensities for the two pixels which are going to represent the endpoint need be calculated.

Similarly, the intensity values for an ending cap are zero for any shaded pixels on a side of said group of shaded pixels in the opposite direction as said direction of said line segment if said direction is between −45 degrees and 135 degrees, said intensity values being zero for any shaded pixels on a side of said group of shaded pixels in the same direction as said direction of said line segment if said direction of said line segment is between 135 degrees and 180 degrees or between −45 degrees and −180 degrees.

Figure 11A:
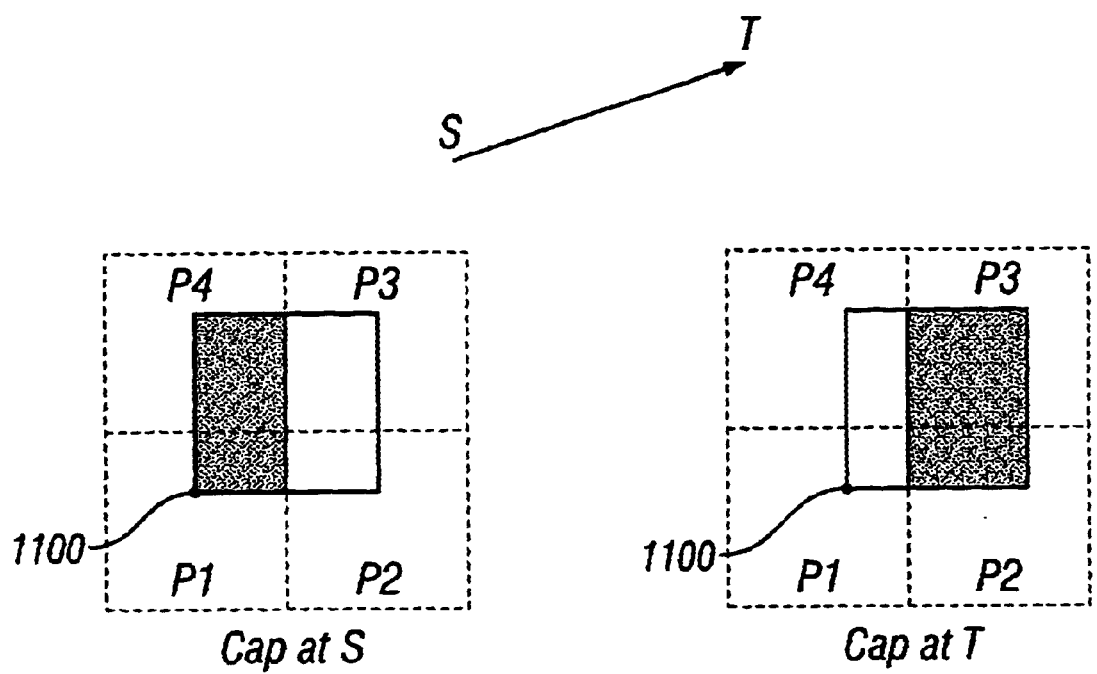
FIG. 11A is a diagram illustrating a line segment extending in the direction of the first octant in accordance with a presently preferred embodiment of the present invention.

FIGS. 11A–11H are diagrams illustrating how this formula applies to line segments in each of the eight octants. FIG. 11A is a diagram illustrating a line segment extending in the direction of the first octant. Since the line is extending more horizontally than vertically, the pixels chosen to draw both the starting and ending caps are contiguous vertically. Since the line extends in the positive horizontal direction, the starting cap is drawn according to the normal scheme (including the pixel having the mathematical origin 1100) and the ending cap is drawn using the pixels opposite the pixel having the mathematical origin.

Figure 11B:
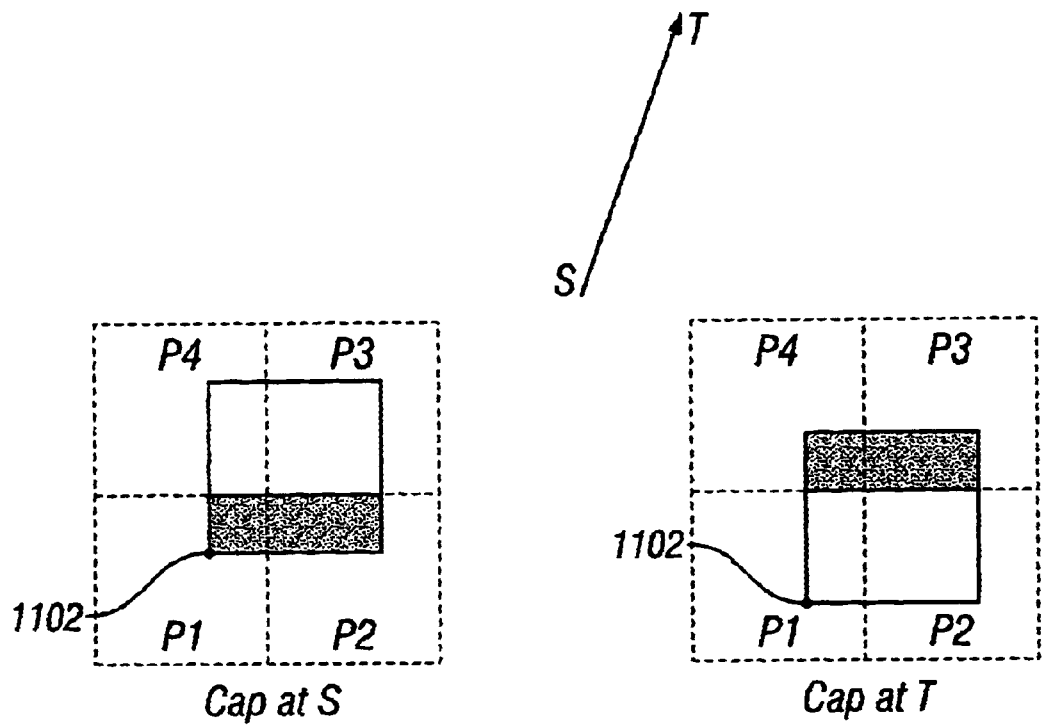
FIG. 11B is a diagram illustrating a line segment extending in the direction of the second octant in accordance with a presently preferred embodiment of the present invention.

FIG. 11B is a diagram illustrating a line segment extending in the direction of the second octant. Since the line is extending more vertically than horizontally, the pixels chosen to draw both the starting and ending caps are contiguous horizontally. Since the line extends in the positive vertical direction, the starting cap is drawn according to the normal scheme (including the pixel having the mathematical origin 1102) and the ending cap is drawn using the pixels opposite the pixel having the mathematical origin.

Figure 11C:
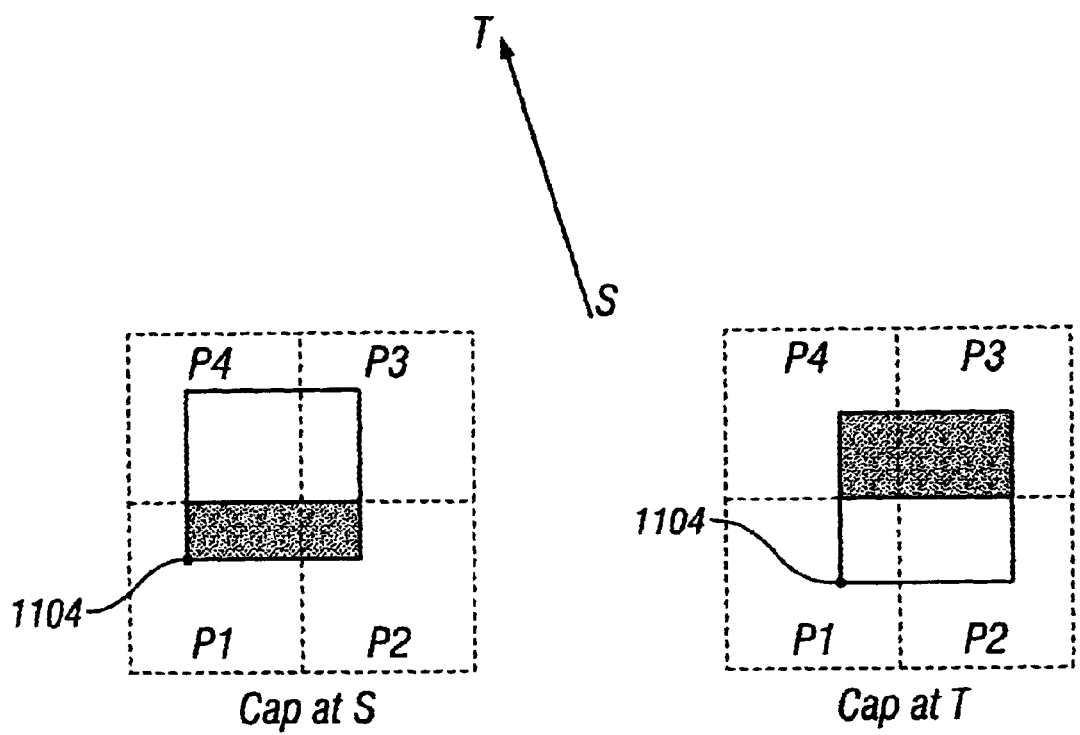
FIG. 11C is a diagram illustrating a line segment extending in the direction of the third octant in accordance with a presently preferred embodiment of the present invention.

FIG. 11C is a diagram illustrating a line segment extending in the direction of the third octant. Since the line is extending more vertically than horizontally, the pixels chosen to draw both the starting and ending caps are contiguous horizontally. Since the line extends in the positive vertical direction, the starting cap is drawn according to the normal scheme (including the pixel having the mathematical origin 1104) and the ending cap is drawn using the pixels opposite the pixel having the mathematical origin.

Figure 11D:
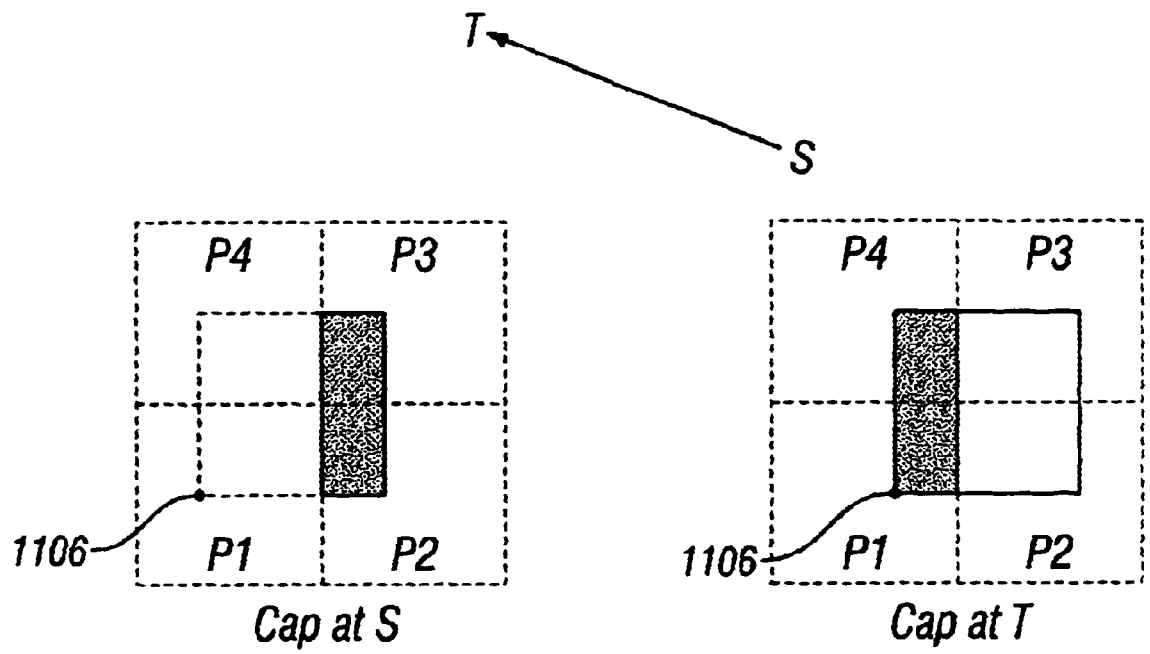
FIG. 11D is a diagram illustrating a line segment extending in the direction of the fourth octant in accordance with a presently preferred embodiment of the present invention.

FIG. 11D is a diagram illustrating a line segment extending in the direction of the fourth octant. Since the line is extending more horizontally than vertically, the pixels chosen to draw both the starting and ending caps are contiguous vertically. Since the line extends in the negative horizontal direction, the starting cap is drawn using the pixels opposite the pixel having the mathematical origin and the ending cap is drawn according to the normal scheme (including the pixel having the mathematical origin 1106).

Figure 11E:
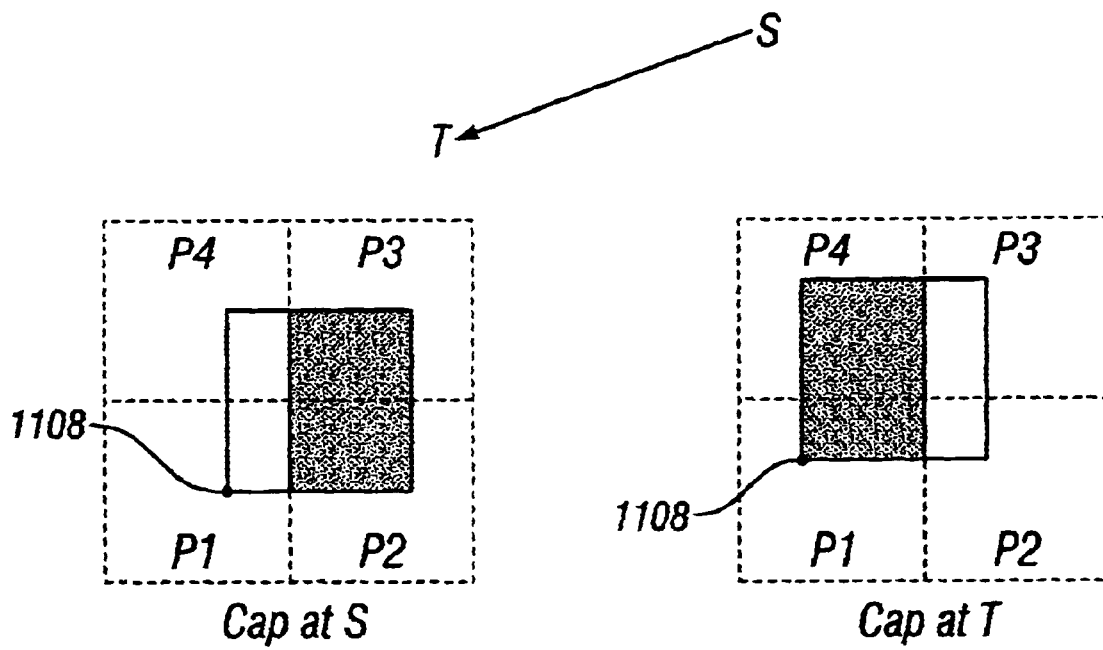
FIG. 11E is a diagram illustrating a line segment extending in the direction of the fifth octant in accordance with a presently preferred embodiment of the present invention.

FIG. 11E is a diagram illustrating a line segment extending in the direction of the fifth octant. Since the line is extending more horizontally than vertically, the pixels chosen to draw both the starting and ending caps are contiguous vertically. Since the line extends in the negative horizontal direction, the starting cap is drawn using the pixels opposite the pixel having the mathematical origin and the ending cap is drawn according to the normal scheme (including the pixel having the mathematical origin 1108).

Figure 11F:
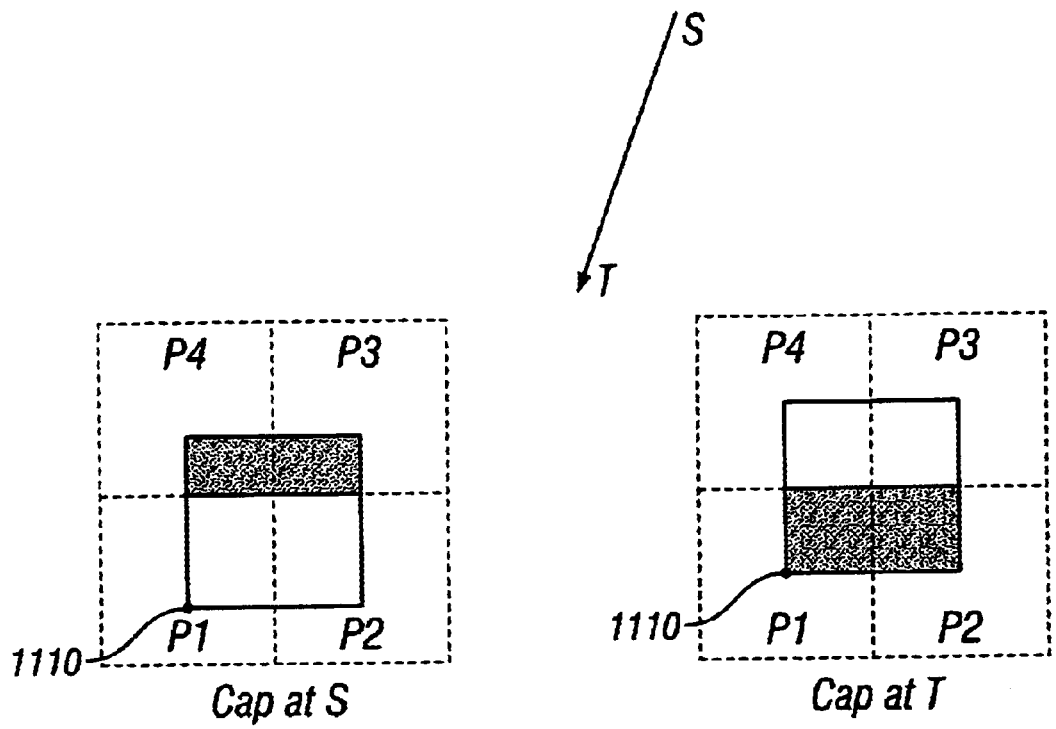
FIG. 11F is a diagram illustrating a line segment extending in the direction of the sixth octant in accordance with a presently preferred embodiment of the present invention.

FIG. 11F is a diagram illustrating a line segment extending in the direction of the sixth octant. Since the line is extending more vertically than horizontally, the pixels chosen to draw both the starting and ending caps are contiguous horizontally. Since the line extends in the negative vertical direction, the starting cap is drawn using the pixels opposite the pixel having the mathematical origin and the ending cap is drawn according to the normal scheme (including the pixel having the mathematical origin 1110).

Figure 11G:
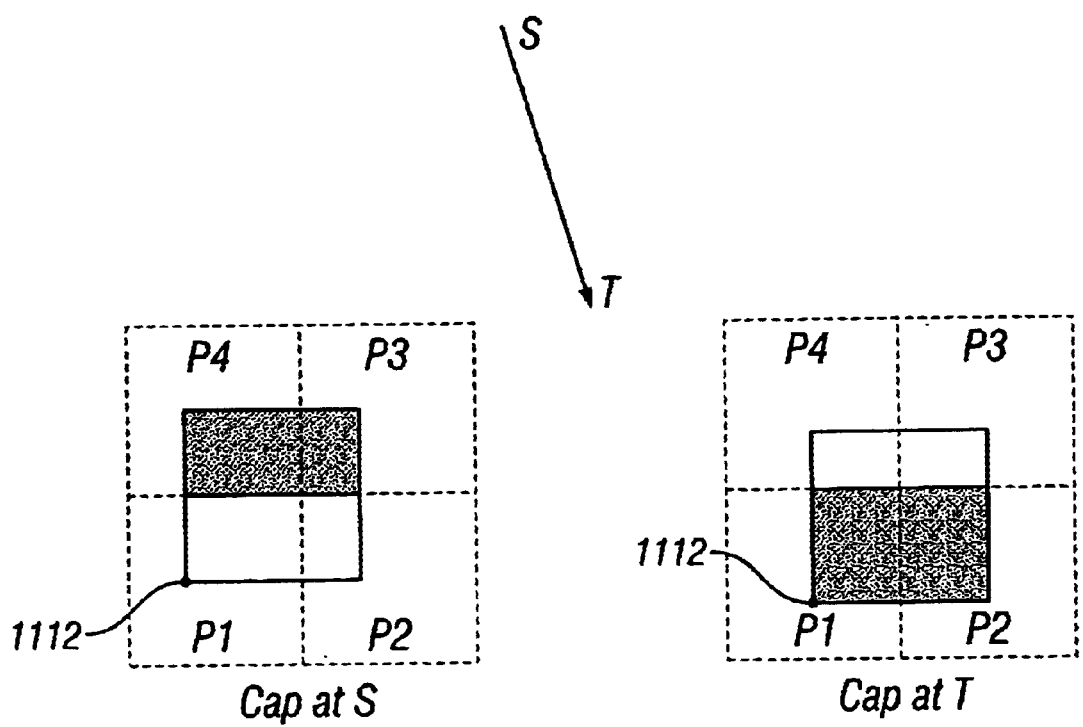
FIG. 11G is a diagram illustrating a line segment extending in the direction of the seventh octant in accordance with a presently preferred embodiment of the present invention.

FIG. 11G is a diagram illustrating a line segment extending in the direction of the seventh octant. Since the line is extending more vertically than horizontally, the pixels chosen to draw both the starting and ending caps are contiguous horizontally. Since the line extends in the negative vertical direction, the starting cap is drawn using the pixels opposite the pixel having the mathematical origin and the ending cap is drawn according to the normal scheme (including the pixel having the mathematical origin 1112).

Figure 11H:
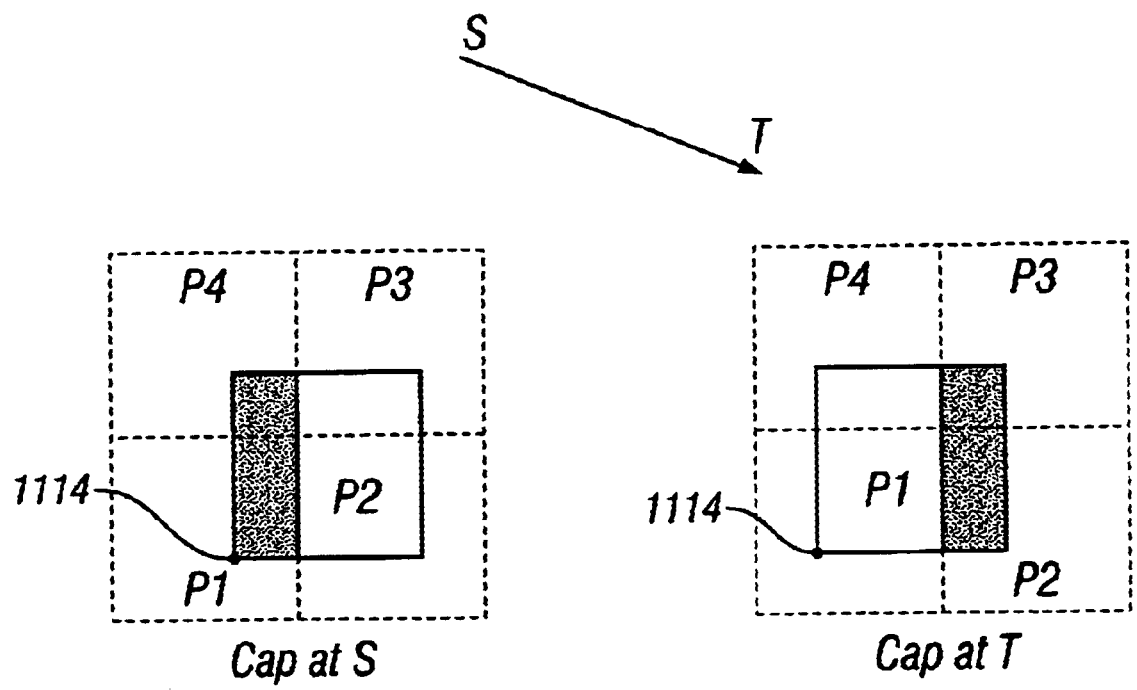
FIG. 11H is a diagram illustrating a line segment extending in the direction of the eighth octant in accordance with a presently preferred embodiment of the present invention.

FIG. 11H is a diagram illustrating a line segment extending in the direction of the eighth octant. Since the line is extending more horizontally than vertically, the pixels chosen to draw both the starting and ending caps are contiguous vertically. Since the line extends in the positive horizontal direction, the starting cap is drawn according to the normal scheme (including the pixel having the mathematical origin 1114) and the ending cap is drawn using the pixels opposite the pixel having the mathematical origin.

Figure 12A:
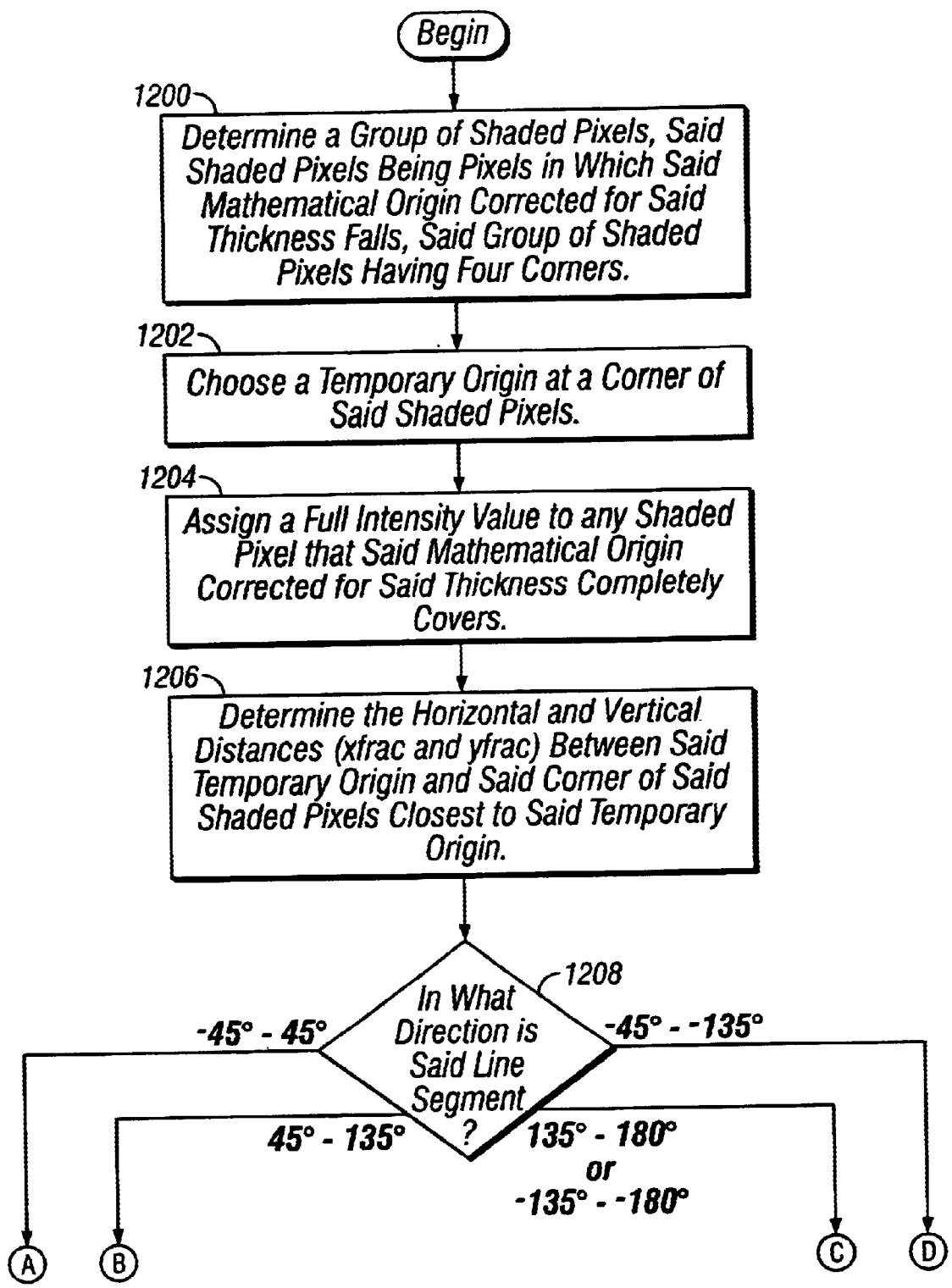
FIG. 12 is a flow diagram illustrating a method for plotting a starting cap of a line segment on a computer display in accordance with a presently preferred embodiment of the present invention.
Figure 12B:
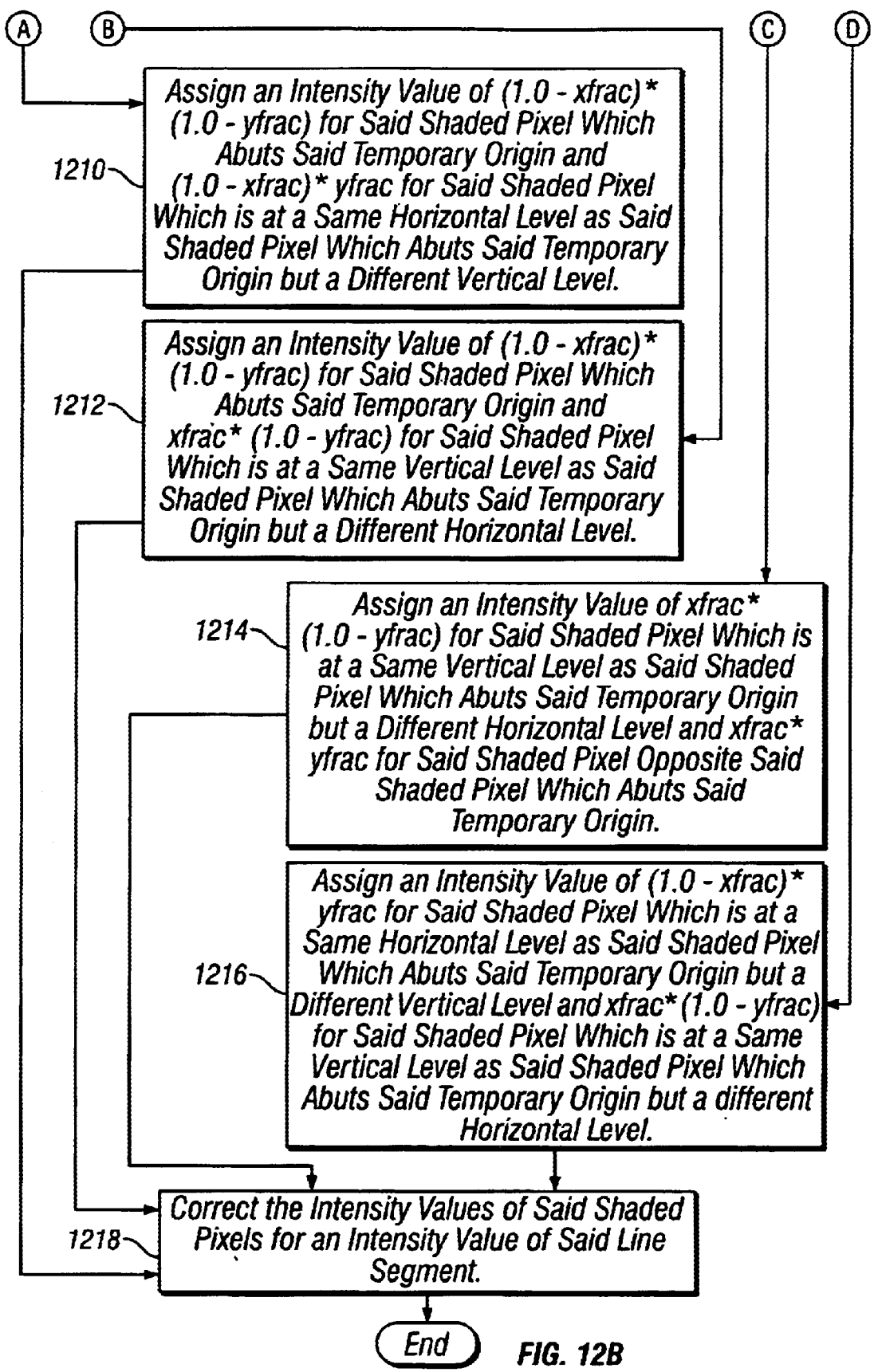

FIG. 12 is a flow diagram illustrating a method for plotting a starting cap of a line segment on a computer display, said computer display comprising a plurality of pixels with an x-axis, wherein said x-axis in a positive direction has a direction of 0 degrees, said line segment having a mathematical origin, a direction, and a thickness, in accordance with a presently preferred embodiment of the present invention.

At 1200, a group of shaded pixels is determined, said shaded pixels being pixels in which said mathematical origin corrected for said thickness falls, said group of shaded pixels having four corners. At 1202, a temporary origin is chosen at a corner of said shaded pixels. Then, at 1204, a full intensity value is assigned to any shaded pixel that said mathematical origin corrected for said thickness completely covers.

At 1206, the horizontal and vertical distances (xfrac and yfrac) between said temporary origin and said corner of said shaded pixels closest to said temporary origin are determined. Then, at 1208, the direction of the line segment is determined. If the direction of the line segment is between −45 degrees and 45 degrees, at 1210 an intensity value of (1.0−xfrac)*(1.0−yfrac) is assigned for said shaded pixel which abuts said temporary origin and (1.0−xfrac)*yfrac is assigned for said shaded pixel which is at a same horizontal level as said shaded pixel which abuts said temporary origin but a different vertical level.

If the direction of said line segment is between 45 degrees and 135 degrees, at 1212 an intensity value of (1.0−xfrac)*(1.0−yfrac) is assigned for said shaded pixel which abuts said temporary origin and xfrac*(1.0−yfrac) is assigned for said shaded pixel which is at a same vertical level as said shaded pixel which abuts said temporary origin but a different horizontal level.

If the direction of said line segment is between 135 degrees and 180 degrees or between −135 degrees and −180 degrees, at 1214 an intensity value of xfrac*(1.0−yfrac) is assigned for said shaded pixel which is at a same vertical level as said shaded pixel which abuts said temporary origin but a different horizontal level and xfrac*yfrac is assigned for said shaded pixel opposite said shaded pixel which abuts said temporary origin.

If said direction of said line segment is between −45 degrees and −135 degrees, at 1216 an intensity value of (1.0−xfrac)*yfrac is assigned for said shaded pixel which is at a same horizontal level as said shaded pixel which abuts said temporary origin but a different vertical level and xfrac*(1.0−yfrac) is assigned for said shaded pixel which is at a same vertical level as said shaded pixel which abuts said temporary origin but a different horizontal level.

Lastly, at 1218, the intensity values of the shaded pixels may be corrected for an intensity value of the line segment.

Figure 13A:
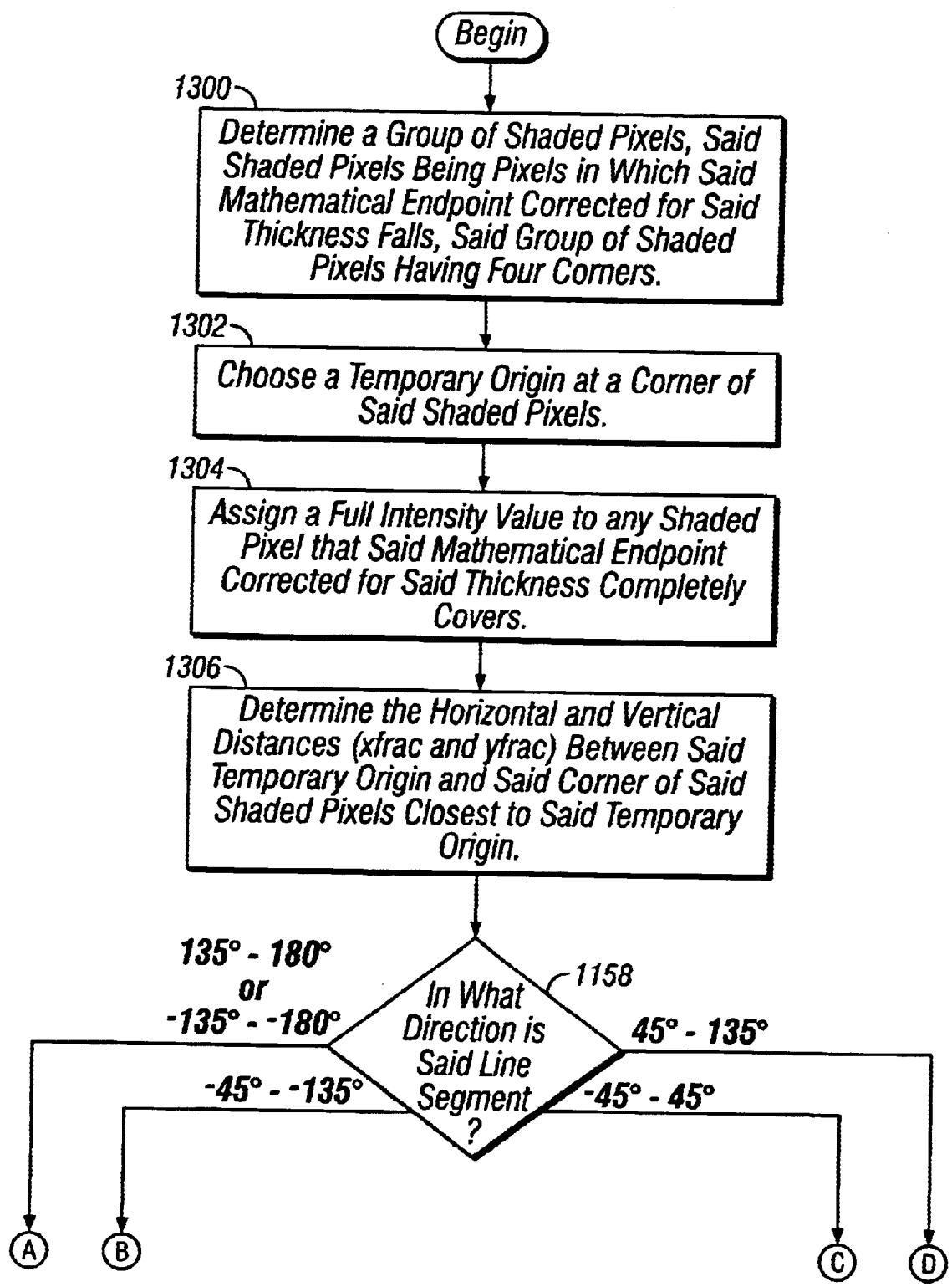
FIG. 13 is a flow diagram illustrating a method for plotting an ending cap of a line segment on a computer display in accordance with a presently preferred embodiment of the present invention.
Figure 13B:
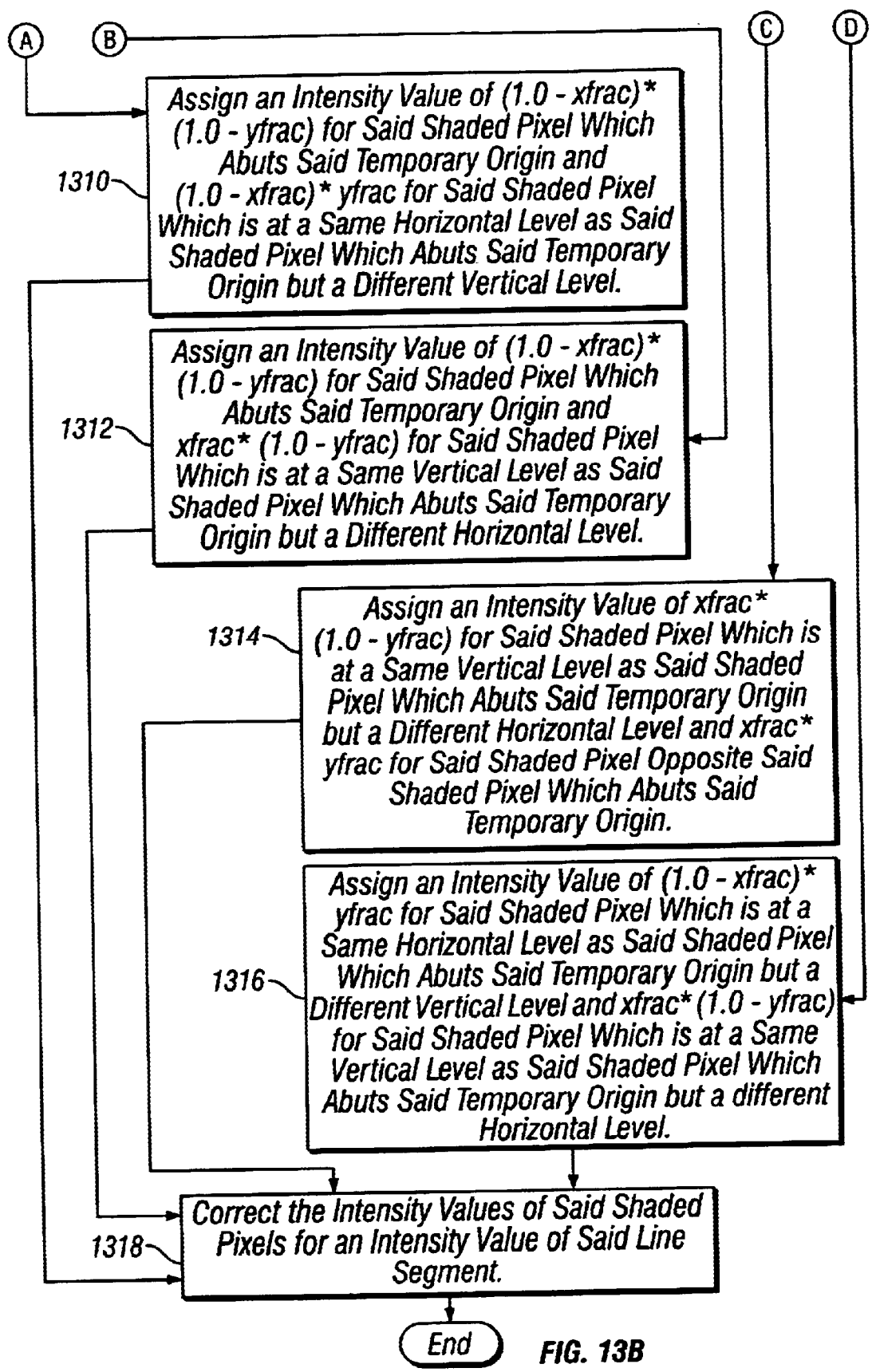

FIG. 13 is a flow diagram illustrating a method for plotting an ending cap of a line segment on a computer display, said computer display comprising a plurality of pixels with an x-axis, wherein said x-axis in a positive direction has a direction of 0 degrees, said line segment having a mathematical endpoint, a direction, and a thickness, in accordance with a presently preferred embodiment of the present invention.

At 1300, a group of shaded pixels is determined, said shaded pixels being pixels in which said mathematical origin corrected for said thickness falls, said group of shaded pixels having four corners. At 1302, a temporary origin is chosen at a corner of said shaded pixels. Then, at 1304, a full intensity value is assigned to any shaded pixel that said mathematical endpoint corrected for said thickness completely covers.

At 1306, the horizontal and vertical distances (xfrac and yfrac) between said temporary origin and said corner of said shaded pixels closest to said temporary origin are determined. Then, at 1308, the direction of the line segment is determined. If the direction of the line segment is between 135 degrees and 180 degrees or between −135 degrees and −180 degrees, at 1310 an intensity value of (1.0−xfrac)*(1.0−yfrac) is assigned for said shaded pixel which abuts said temporary origin and (1.0−xfrac)*yfrac is assigned for said shaded pixel which is at a same horizontal level as said shaded pixel which abuts said temporary origin but a different vertical level.

If the direction of said line segment is between −45 degrees and −135 degrees, at 1312 an intensity value of (1.0−xfrac)*(1.0−yfrac) is assigned for said shaded pixel which abuts said temporary origin and xfrac*(1.0−yfrac) is assigned for said shaded pixel which is at a same vertical level as said shaded pixel which abuts said temporary origin but a different horizontal level.

If the direction of said line segment is between −45 degrees and 45 degrees, at 1314 an intensity value of xfrac*(1.0−yfrac) is assigned for said shaded pixel which is at a same vertical level as said shaded pixel which abuts said temporary origin but a different horizontal level and xfrac*yfrac is assigned for said shaded pixel opposite said shaded pixel which abuts said temporary origin.

If said direction of said line segment is between 45 degrees and 135 degrees, at 1316 an intensity value of (1.0−xfrac)*yfrac is assigned for said shaded pixel which is at a same horizontal level as said shaded pixel which abuts said temporary origin but a different vertical level and xfrac*(1.0−yfrac) is assigned for said shaded pixel which is at a same vertical level as said shaded pixel which abuts said temporary origin but a different horizontal level.

Lastly, at 1318, the intensity values of the shaded pixels may be corrected for an intensity value of the line segment.

Rather than performing discrete calculations, a loop-up table may be used which contains the proper intensity values for pixels based on the criteria outlined above. FIG. 14 is an example of a look-up table which may be used with a presently preferred embodiment of the present invention.

Figure 15:
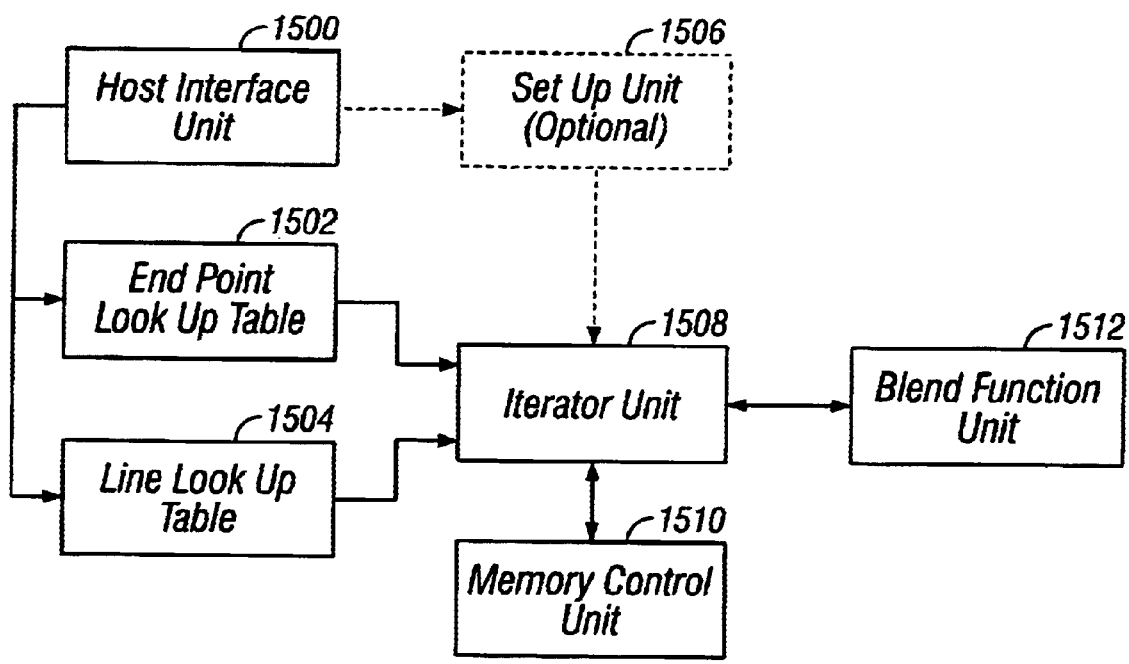
FIG. 15 is a block diagram illustrating a hardware apparatus for the plotting of a starting or ending cap of a line segment on a computer display in accordance with a presently preferred embodiment of the present invention.

FIG. 15 is a block diagram illustrating a hardware apparatus for the plotting of a starting or ending cap of a line segment on a computer display in accordance with a presently preferred embodiment of the present invention. A host interface unit 1500 contains registers which stores any parameters needed. It also may contain an address decoder to select which register is being accessed. The host interface unit 1500 also controls accesses to the look-up tables 1502, 1504. Additionally, if a set-up unit 1506 is implemented in hardware, the host interface is responsible for sending parameters needed to the setup unit once a drawing command is received from the host.

The end point look-up table 1502 stores pixel coverage values for both starting and ending caps. The line look-up table 1504 stores line segment pixel coverage areas. A set-up unit 1506 is an optional unit which calculates various parameters. The more calculations it performs, the less information needs to be retrieved from look-up tables 1502, 1504.

An iterator unit 1508 performs line segment iteration (outside the scope of this application) and may aid in calculating the ending cap.

A memory control unit 1510 performs memory read and write accesses related to each pixel's data. Write access is performed once the final attributes data is calculated. Read access is performed when data is needed for blending or for depth calculation, or any other attributes.

A blend function unit 1512 may perform arithmatics needed to do blend functions for each pixel (outside the scope of this application).

Figure 1:
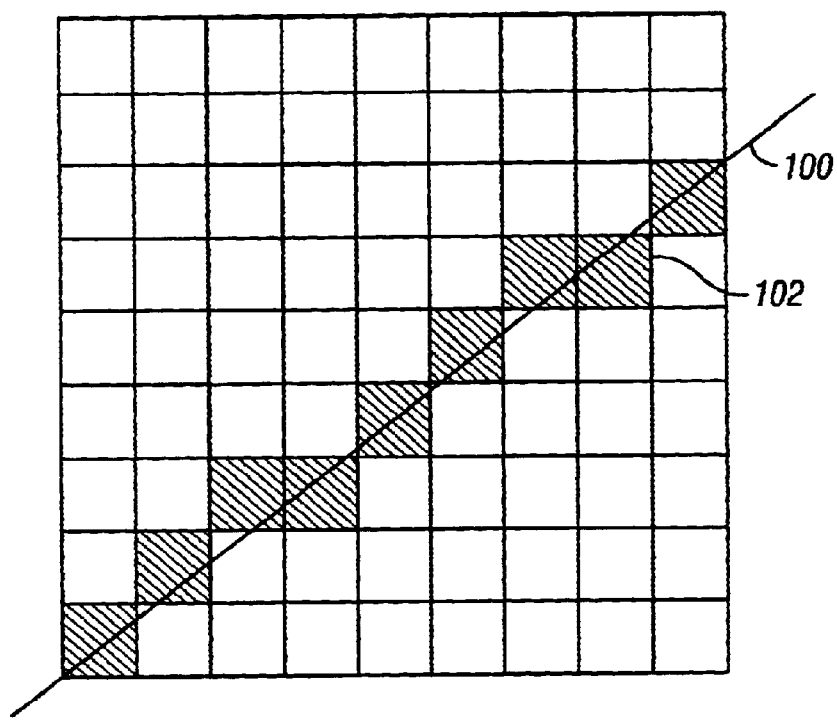
FIG. 1 is a diagram illustrating the staircase effect of a group of pixels on a computer display.
Figure 2:
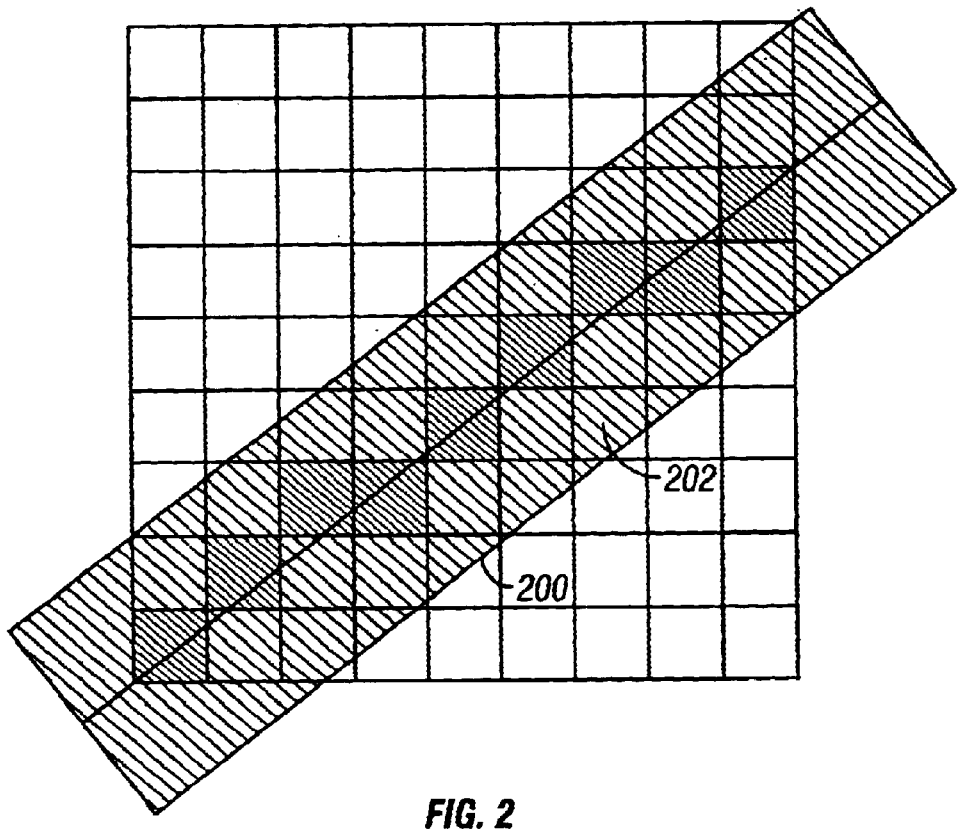
FIG. 2 is a diagram illustrating a supersampling technique applied to the aliased line of FIG. 1.
Figure 16:
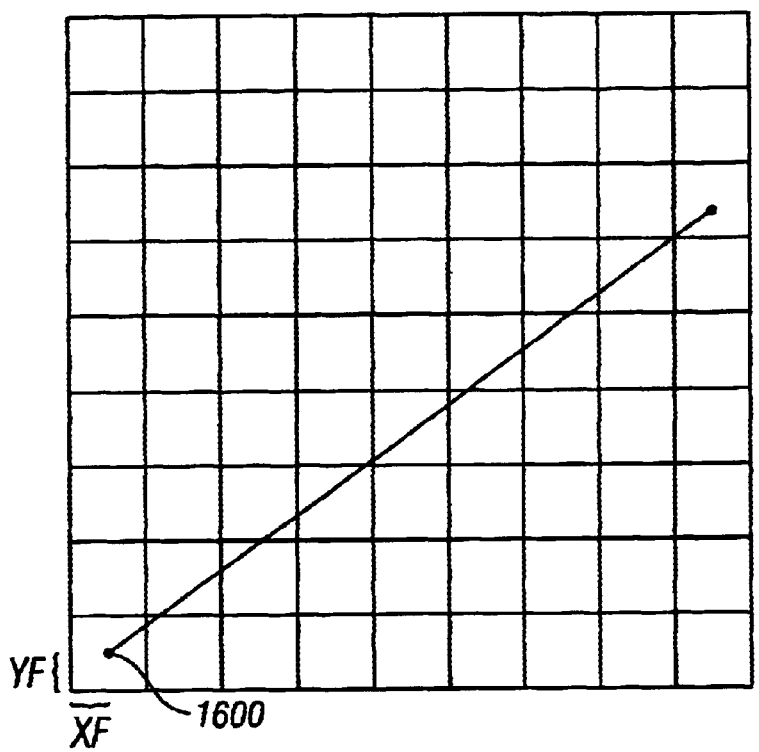
FIG. 16 is a diagram illustrating a line segment having coordinates with fractional components on a computer display.

Turning now to the middle of the line (i.e. each point on the line that is not a starting cap or an ending cap), a line segment may be approximated using fewer and less expensive calculations than called for by Bresenham. FIG. 16 is a diagram illustrating a line segment with coordinates having fractional components on a computer display. An origin point 1600 may be chosen. The values $x_f$ and $y_f$ represent the horizontal and vertical distances (respectively) between the origin point of the actual line and a corner of the pixel in which the origin is located. Different corners are used depending upon the direction of the line. In a presently preferred embodiment of the present invention, the corner chosen is the one opposite the direction of the line. In FIG. 2, the lower left-hand corner is chosen because the line progresses in the positive horizontal and positive vertical direction. Rather than compute this distance using the equation:

$$y_k = m(x_k+1) + b$$

where $m = \Delta y/\Delta x$ which can be very expensive, the present invention solves for $y_i$ directly by solving the equation:

$$y_i = y_f - x_f * m$$

This equation may be rewritten as:

$$y_i = y_f - f*(\Delta y/\Delta x).$$

However, one problem that may be encountered if one attempts to compute the value for this equation is that the division computation $(\Delta y/\Delta x)$ can be very expensive in a computer implementation. In a presently preferred embodiment of the present invention, this may be avoided by scaling the equation by $\Delta x$, giving:

$$y_i * \Delta x = (y_f * \Delta x) - (x_f * \Delta y).$$

Thus, the deviation term becomes $y_i * \Delta x$. There is still a overriding concern about reliability of the equation when $y_i>0.5$ or $y_i<-0.5$. Therefore, the value of $(y_f*\Delta x)-(x_f*\Delta y)$ should be compared to $0.5*\Delta x$. If it is greater than $0.5*\Delta x$, the process should be repeated after moving vertically up one pixel. $0.5*\Delta x$ is a very simple computation to make in a computer as in binary numbers it results in simply shifting the value Ax over to the right one bit.

The value $y_i*\Delta x$ maybe rewritten as simply dt. The present invention determines dt for each column (written as dt(0), dt(1), dt(2), etc.) and then compares the value to $0.5*\Delta x$. Rather than completely recompute dt for each column, the dt value may be determined by using the last dt value computed. The following equation is used:

$$dt(n+1)=dt(n)+\Delta y.$$

Thus, the process may simply iterate, computing dt for each column and comparing the result to $0.5*\Delta x$. If the result is bigger than $0.5*\Delta x$, the process moves up (or down for negative slope line segments) one pixel and shades it, otherwise the process simply shades the pixel on the same vertical level as the last one shaded.

One notable caveat is that if the result is indeed bigger than $0.5*\Delta x$, dt must be corrected before proceeding to the next iteration. This is done by subtracting $\Delta x$ from the current dt value.

Another caveat is that both $\Delta x$ and $\Delta y$ are absolute values, which simplifies computation, but requires a different process for the eight possible octant combinations in x-y plane.

Figure 17:
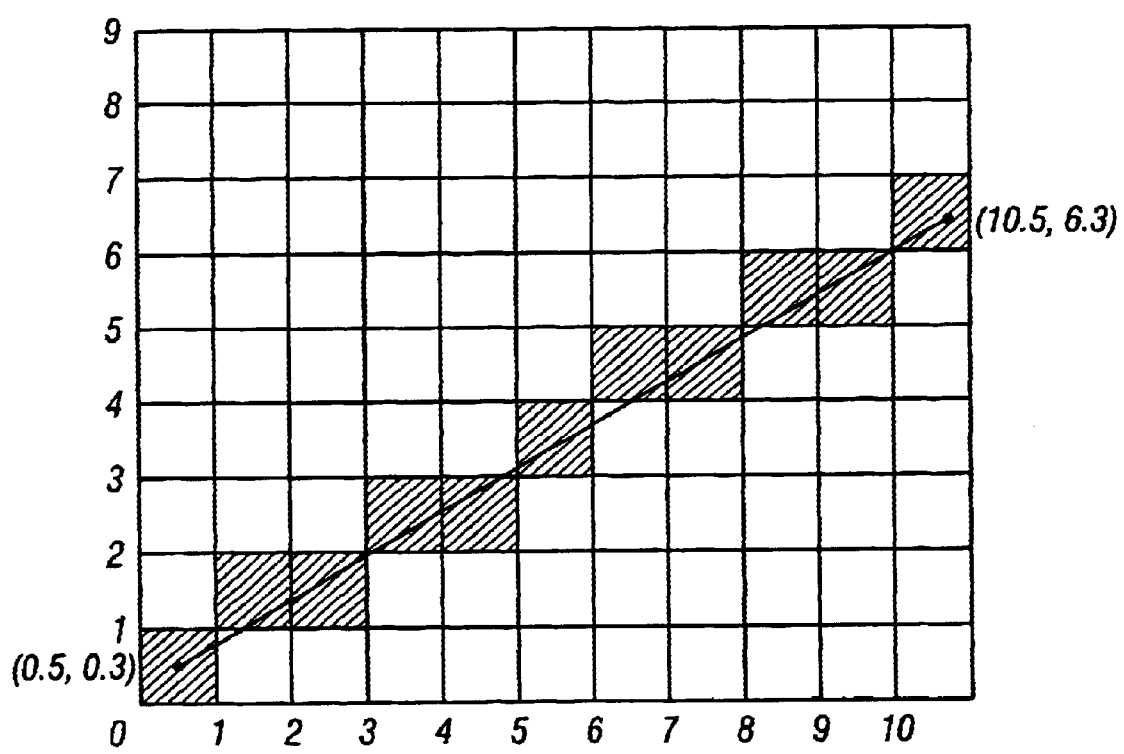
FIG. 17 is a diagram illustrating an example of the approximation of a line in accordance with a presently preferred embodiment of the present invention.

FIG. 17 is a diagram illustrating an example of the approximation of a line in accordance with a presently preferred embodiment of the present invention. The origin point is (0.5, 0.3) and the ending point is (10.5, 6.3), giving a slope of 0.6. $\Delta x$ then may be computed by subtracting 0.5 from 10.5 giving 10, with $\Delta y$ then being 6. Dt(0) may then be determined by using the equation $dt(\mathbf{0})=(y_f*\Delta x)-(x_f*\Delta y)=(0.3*10)-(0.5*6)=3-3=0$. Thus, since dt(0) $<0.5*\Delta x$, pixel (0,0) is shaded. Moving on to dt(1), this can be computed by adding $\Delta y$ to dt(0) giving 6, which is greater than $0.5*\Delta x$ (which is 5). Thus, the process steps up one pixel and shades pixel (1,1). Since the process stepped up a pixel, dt must be corrected before moving on, thus $\Delta x$ is subtracted from dt(1) making dt(1)=6−10=−4.

Continuing the process yields the following results:

dt(2)=−4+6=2, shade pixel (2,1).

dt(3)=2+6=8, bigger than 5, thus step up and shade pixel (3,2), correct dt(3) by subtracting 10, giving dt(3)=−2.

dt(4)=−2+6=4, shade pixel (4,2).

dt(5)=4+6=10, bigger than 5, thus step up and shade pixel (5,3), correct dt(5) by subtracting 10, giving dt(5)=−0.

dt(6)=0+6=6, bigger than 5, thus step up and shade pixel (6,4), correct dt(6) by subtracting 10, giving dt(6)=−4.

dt(7)=−4+6=2, shade pixel (7,4).

dt(8)=2+6=8, bigger than 5, thus step up and shade pixel (8,5), correct dt(8) by subtracting 10, giving dt(7)=−2.

dt(9)=−2+6=4, shade pixel (9,5).

dt(10)=4+6=10, bigger than 5, thus step up and shade pixel (10,6).

As can be seen, the present invention produces a fairly reliable approximation of the line segment while only requiring the direct computation of two constants.

Another adjustment that may be made is to correct the current pixel if dt(0) falls below 0. If that were to occur, it would be due to having a calculation in the pixel for the previous column giving dt(n)>$0.5*\Delta x$, thus causing the current pixel to be stepped up. Yet, its possible that the line then in the current column would still be in the same row as in the previous column if the slope is low enough, giving a situation where when dt(n) is computed for the current pixel, it is negative. In order to correct for this, if dt(n) is ever computed to be negative, the current pixel may simply be shifted down one (or in another direction, depending on the octant of the line segment).

Figure 18:
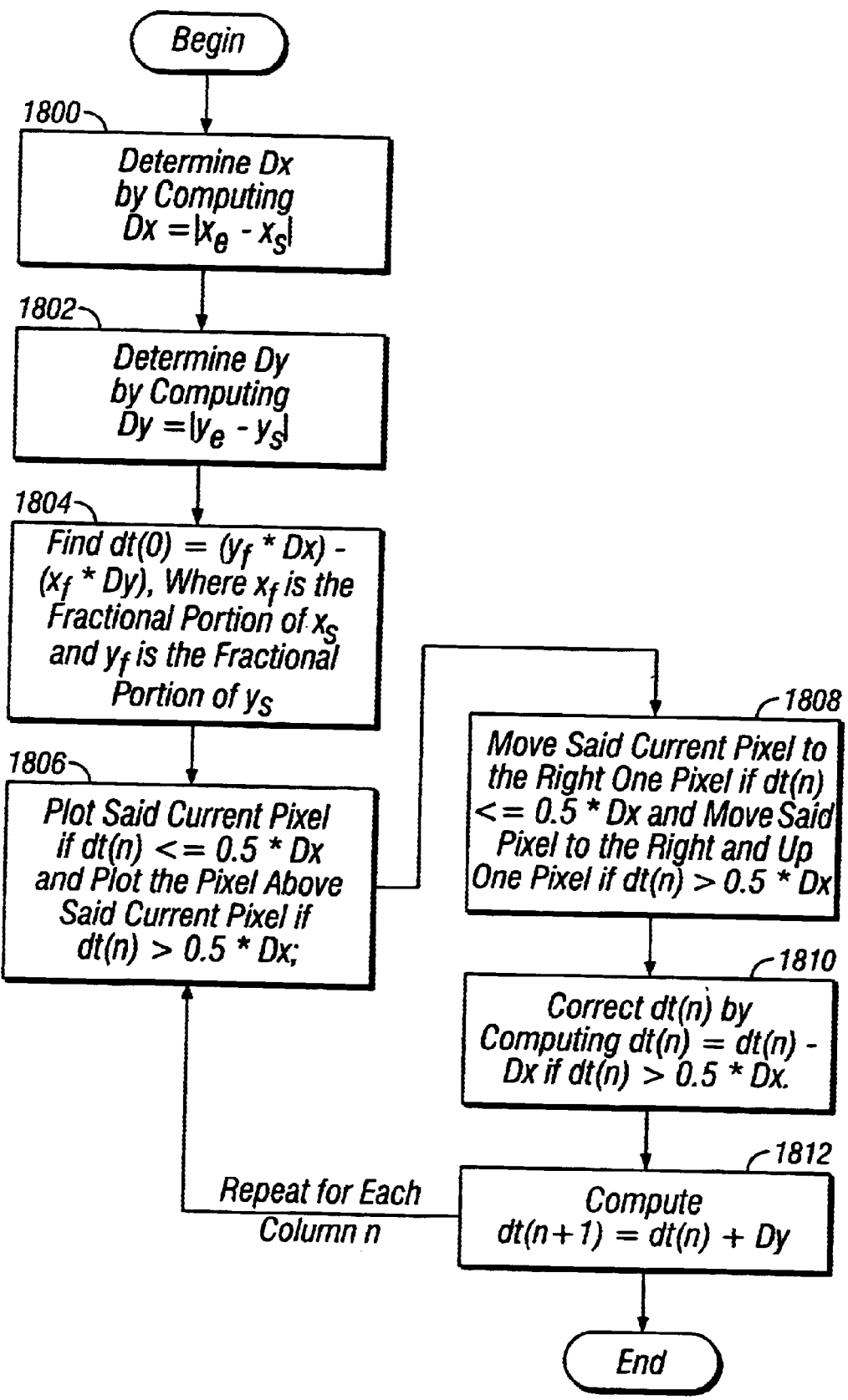
FIG. 18 is a flow diagram illustrating a method for rendering a line segment extending in the positive-x direction and positive-y direction with an absolute value of its slope between 0 and 1 on a computer display given a starting point and an ending point, the starting point having the form $(x_s, y_s)$ and the ending point having the form $(x_e, y_e)$, the computer display having a current pixel initially set to a pixel containing the starting point, in accordance with a presently preferred embodiment of the present invention.

FIG. 18 is a flow diagram illustrating a method for rendering a line segment extending in the positive-x direction and positively direction with an absolute value of its slope between 0 and 1 on a computer display given a starting point and an ending point, the starting point having the form $(x_s, y_s)$ and the ending point having the form $(x_e, y_e)$, the computer display having a current pixel initially set to a pixel containing the starting point, in accordance with a presently preferred embodiment of the present invention. At 1800, $\Delta x$ is determined by computing $\Delta x=|x_e-x_s|$. At 1802, $\Delta y$ is determined by computing $\Delta y=|y_e-y_s|$.

At 1804, the process finds dt(0) by solving $dt(\mathbf{0})=(y_f*\Delta x)-(x_f*\Delta y)$, where $x_f$ is the fractional portion of $x_s$ and $y_f$ is the fractional portion of $y_s$. Then the process iterates through each column, for each column n containing a portion of said line segment:

At 1806, plotting said current pixel if dt(n)<=$0.5*\Delta x$ and plotting the pixel above said current pixel if dt(n) >$0.5*\Delta x$.

At 1808, moving said current pixel to the right one pixel if dt(n)<=$0.5*\Delta x$ and moving said pixel to the right and up one pixel if dt(n)>$0.5 *\Delta x$.

At 1810 correcting dt(n) by computing dt(n)=dt(n)−$\Delta x$ if dt(n)>$0.5*\Delta x$.

At 1812, computing dt(n+1)=dt(n)+$\Delta y$.

Figure 19:
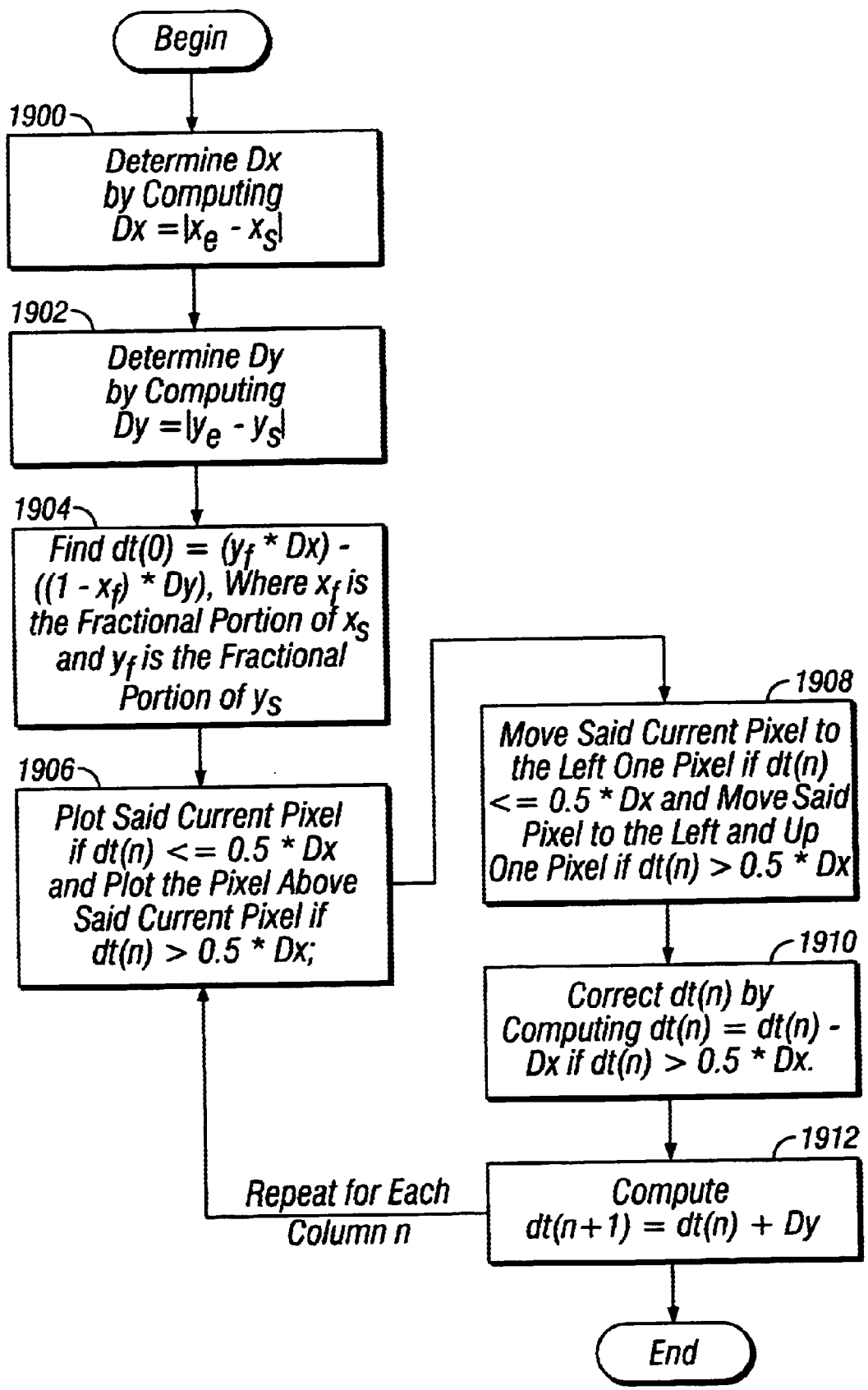
FIG. 19 is a flow diagram illustrating a method for rendering a line segment extending in the negative-x direction and positive-y direction with an absolute value of its slope between 0 and 1 on a computer display given a starting point and an ending point, the starting point having the form $(x_s, y_s)$ and the ending point having the form $(x_e, y_e)$, the computer display having a current pixel initially set to a pixel containing the starting point, in accordance with a presently preferred embodiment of the present invention.

FIG. 19 is a flow diagram illustrating a method- for rendering a line segment extending in the negative-x direction and positively direction with an absolute value of its slope between 0 and 1 on a computer display given a starting point and an ending point, the starting point having the form $(x_s, y_s)$ and the ending point having the form $(x_e, y_e)$, the computer display having a current pixel initially set to a pixel containing the starting point, in accordance with a presently preferred embodiment of the present invention. At 1900, $\Delta x$ is determined by computing $\Delta x=|x_e-x_s|$. At 1902, $\Delta y$ is determined by computing $\Delta y=|y_e-y_s|$.

At 1904, the process finds dt(0) by solving $dt(\mathbf{0})=(y_f*\Delta x)-((1-x_f)*\Delta y)$, where $x_f$ is the fractional portion of $x_s$ and $y_f$ is the fractional portion of $y_s$. Then the process iterates through each column, for each column n containing a portion of said line segment:

At 1906, plotting said current pixel if dt(n)<=$0.5*\Delta x$ and plotting the pixel above said current pixel if dt(n) >$0.5*\Delta x$.

At 1908, moving said current pixel to the left one pixel if dt(n)<=$0.5*\Delta x$ and moving said pixel to the left and up one pixel if dt(n)>$0.5*\Delta x$.

At 1910 correcting dt(n) by computing dt(n)=dt(n)−$\Delta x$ if dt(n)>0.5.$*\Delta x$.

At 1912, computing dt(n+1)=dt(n)+$\Delta y$.

Figure 20:
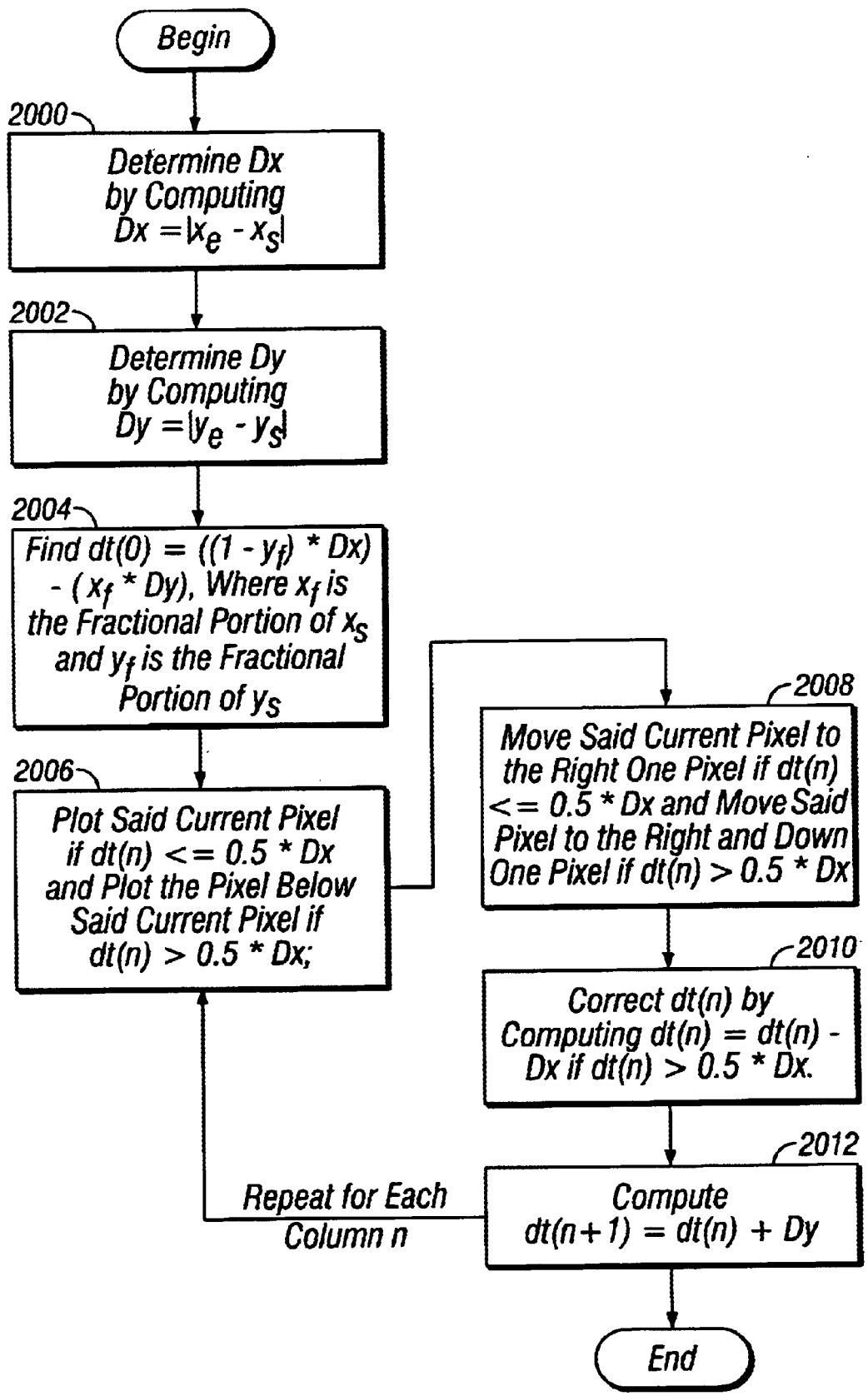
FIG. 20 is a flow diagram illustrating a method for rendering a line segment extending in the positive-x direction and negative-y direction with an absolute value of its slope between 0 and 1 on a computer display given a starting point and an ending point, the starting point having the form $(x_s, y_s)$ and the ending point having the form $(x_e, y_e)$, the computer display having a current pixel initially set to a pixel containing the starting point, in accordance with a presently preferred embodiment of the present invention.

FIG. 20 is a flow diagram illustrating a method for rendering a line segment extending in the positive-x direction and negative-y direction with an absolute value of its slope between 0 and 1 on a computer display given a starting point and an ending point, the starting point having the form $(x_s, y_s)$ and the ending point having the form $(x_e, y_e)$, the computer display having a current pixel initially set to a pixel containing the starting point, in accordance with a presently preferred embodiment of the present invention. At 2000, $\Delta x$ is determined by computing $\Delta x=|x_e-x_s|$. At 2002, $\Delta y$ is determined by computing $\Delta y=|y_e-y_s|$.

At 2004, the process finds dt(0) by solving dt(0)=((1−$y_f$)*Δx)−($x_f$*Δy), where $x_f$ is the fractional portion of $x_s$ and $y_f$ is the fractional portion of $y_s$. Then the process iterates through each column, for each column n containing a portion of said line segment:

At 2006, plotting said current pixel if dt(n)<=0.5*Δx and plotting the pixel above said current pixel if dt(n)>0.5*Δx.

At 2008, moving said current pixel to the right one pixel if dt(n)<=0.5*Δx and moving said pixel to the right and down one pixel if dt(n)>0.5*Δx.

At 2010 correcting dt(n) by computing dt(n)=dt(n)−Δx if dt(n)>0.5*Δx.

At 2012, computing dt(n+1)=dt(n) +Δy.

Figure 21:
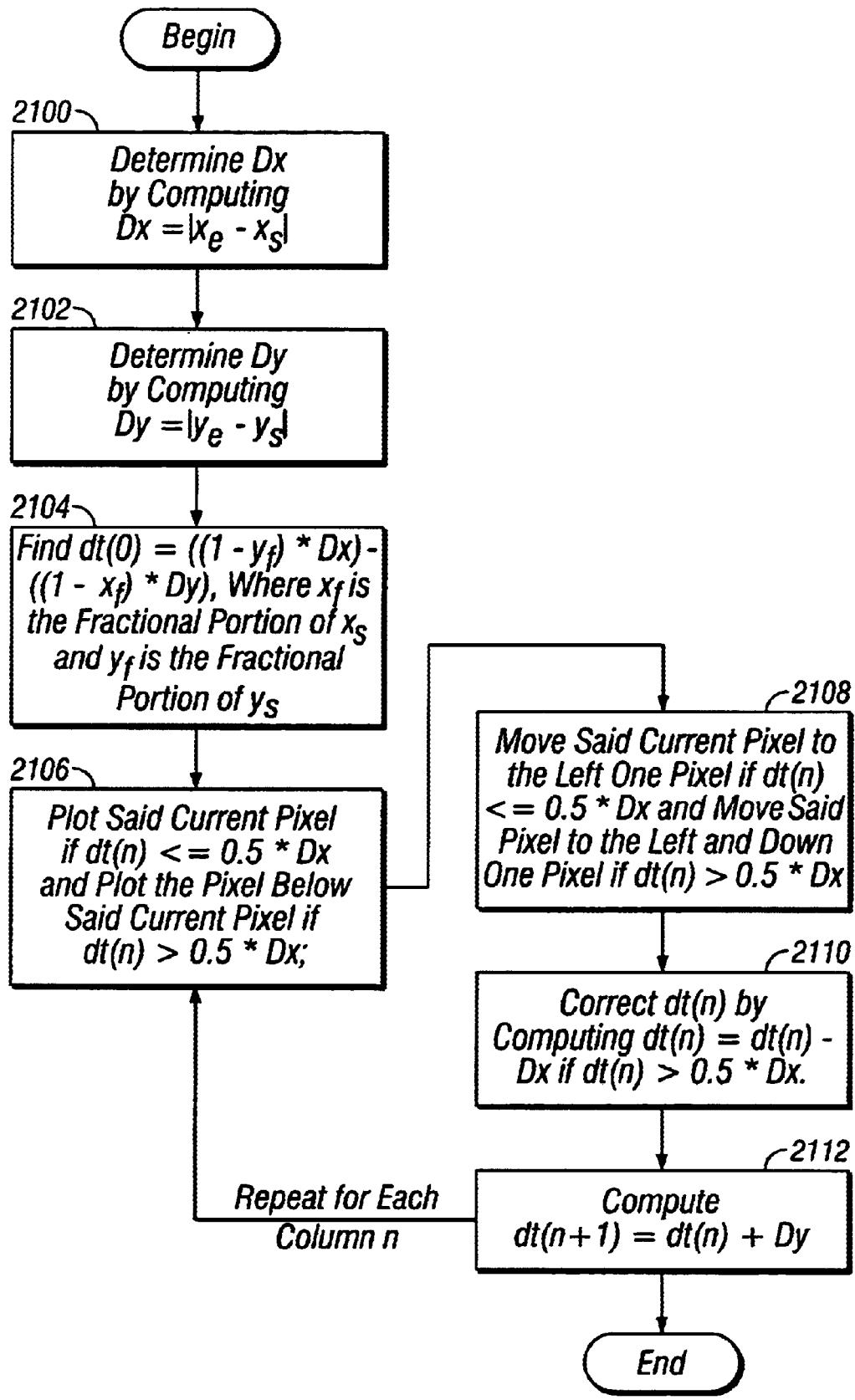
FIG. 21 is a flow diagram illustrating a method for rendering a line segment extending in the negative-x direction and negative-y direction with an absolute value of its slope between 0 and 1 on a computer display given a starting point and an ending point, the starting point having the form $(x_s, y_s)$ and the ending point having the form $(x_e, y_e)$, the computer display having a current pixel initially set to a pixel containing the starting point, in accordance with a presently preferred embodiment of the present invention.

FIG. 21 is a flow diagram illustrating a method for rendering a line segment extending in the negative-x direction and negative-y direction with an absolute value of its slope between 0 and 1 on a computer display given a starting point and an ending point, the starting point having the form ($x_s$, $y_s$) and the ending point having the form ($x_e$, $y_e$), the computer display having a current pixel initially set to a pixel containing the starting point, in accordance with a presently preferred embodiment of the present invention. At 2100, Δx is determined by computing Δx=|$x_e$−$x_s$|. At 2102, Δy is determined by computing Δy=|$y_e$−$y_s$|.

At 2104, the process finds dt(0) by solving dt(0)=((1−$x_f$)*Δy)−((1−$y_f$)*Δx), where $x_f$ is the fractional portion of $x_s$ and $y_f$ is the fractional portion of $y_s$. Then the process iterates through each column, for each column n containing a portion of said line segment:

At 2106, plotting said current pixel if dt(n)<=0.5*Δy and plotting the pixel below said current pixel if dt(n)>0.5*Δy.

At 2108, moving said current pixel to the left one pixel if dt(n)<=0.5*Δy and moving said pixel to the left and down one pixel if dt(n)>0.5*Δy.

At 2110 correcting dt(n) by computing dt(n)=dt(n)−Δy if dt(n)>0.5*Δy.

At 2112, computing dt(n+1)=dt(n)+Δx.

For lines with an absolute value of their slope being greater than one, the process must be slightly modified to symmetrically correct for the angle of the line. Thus, rather than stepping through n columns, it must step through r rows. Additionally, minor alterations to the variables and equations must be performed.

Figure 22:
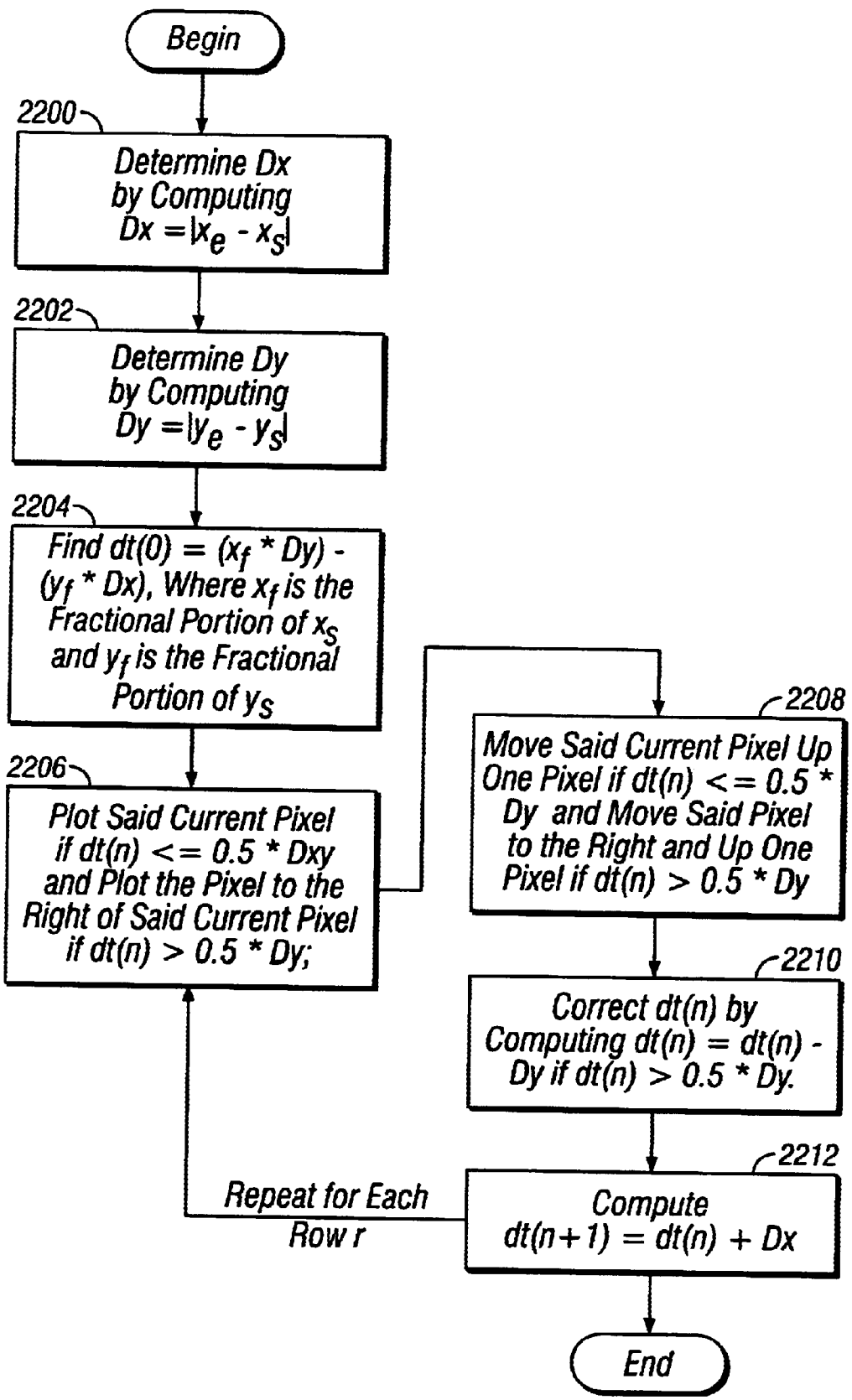
FIG. 22 is a flow diagram illustrating a method for rendering a line segment extending in the positive-x direction and positive-y direction with an absolute value of its slope greater than 1 on a computer display given a starting point and an ending point, the starting point having the form $(x_s, y_s)$ and the ending point having the form $(x_e, y_e)$, the computer display having a current pixel initially set to a pixel containing the starting point, in accordance with a presently preferred embodiment of the present invention.

FIG. 22 is a flow diagram illustrating a method for rendering a line segment extending in the positive-x direction and positive-y direction with an absolute value of its slope greater than 1 on a computer display given a starting point and an ending point, the starting point having the form ($x_s$, $y_s$) and the ending point having the form ($x_e$, $y_e$), the computer display having a current pixel initially set to a pixel containing the starting point, in accordance with a presently preferred embodiment of the present invention. At 2200, Δx is determined by computing Δx=|$x_e$−$x_s$|. At 2202, Δy is determined by computing Δy=|$y_e$−$y_s$|.

At 2204, the process finds dt(0) by solving dt(0)=($x_f$*Δy)−($y_f$*Δx), where $x_f$ is the fractional portion of $x_s$ and $y_f$ is the fractional portion of $y_s$. Then the process iterates through each row, for each row r containing a portion of said line segment:

At 2206, plotting said current pixel if dt(n)<=0.5*Δy and plotting the pixel to the right of said current pixel if dt(n)>0.5*Δy.

At 2208, moving said current pixel up one pixel if dt(n)<=0.5*Δy and moving said pixel to the right and up one pixel if dt(n)>0.5*Δy.

At 2210 correcting dt(n) by computing dt(n)=dt(n)−Δy if dt(n)>0.5*Δy.

At 2212, computing dt(n+1)=dt(n)+Δx.

Figure 23:
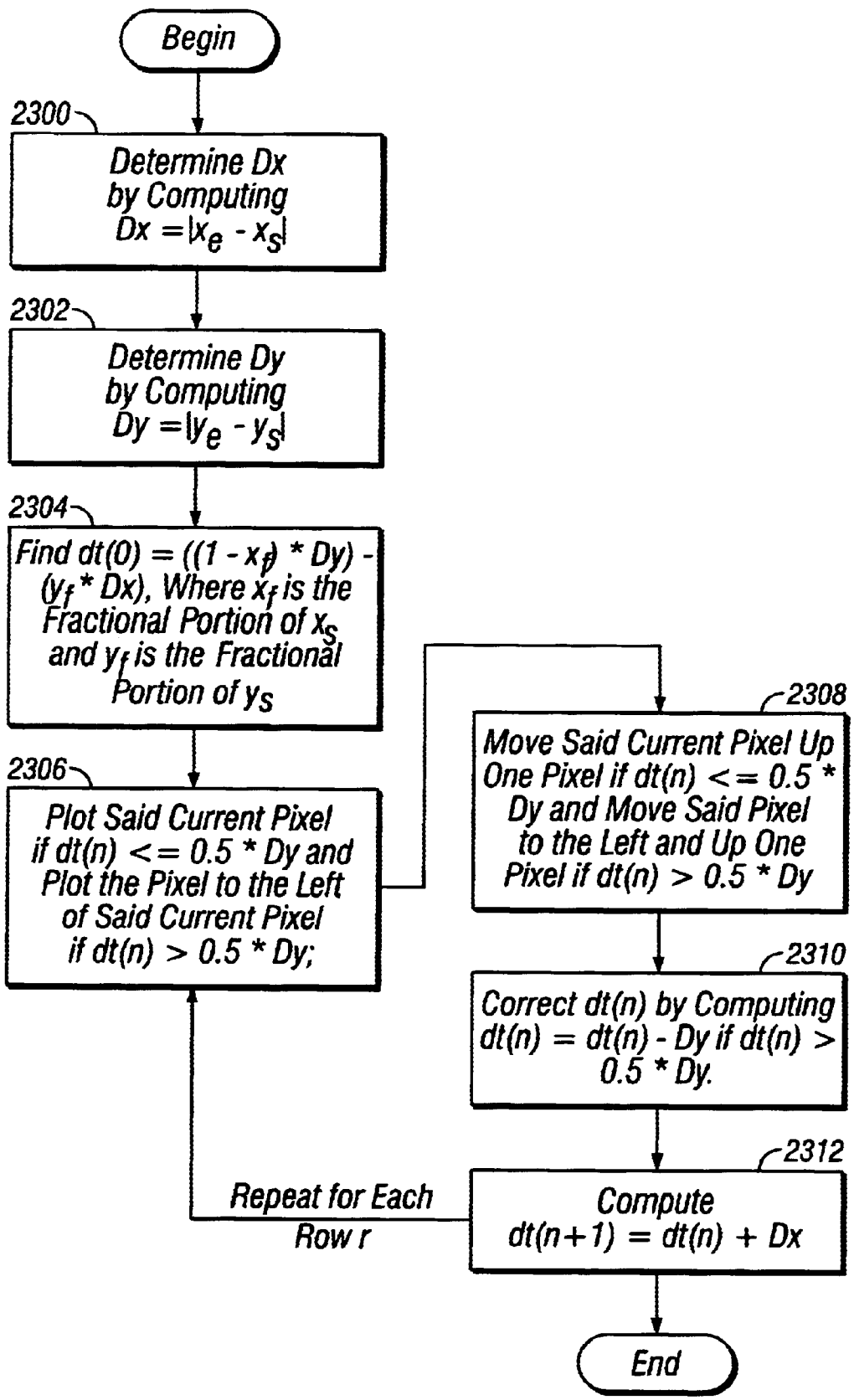
FIG. 23 is a flow diagram illustrating a method for rendering a line segment extending in the negative-x direction and positive-y direction with an absolute value of its slope greater than 1 on a computer display given a starting point and an ending point, the starting point having the form $(x_s, y_s)$ and the ending point having the form $(x_e, y_e)$, the computer display having a current pixel initially set to a pixel containing the starting point, in accordance with a presently preferred embodiment of the present invention.

FIG. 23 is a flow diagram illustrating a method for rendering a line segment extending in the negative-x direction and positive-y direction with an absolute value of its slope greater than 1 on a computer display given a starting point and an ending point, the starting point having the form ($x_s$, $y_s$) and the ending point having the form ($x_e$, $y_e$), the computer display having a current pixel initially set to a pixel containing the starting point, in accordance with a presently preferred embodiment of the present invention. At 2300, Δx is determined by computing Δx=|$x_e$−$x_s$|. At 2302, Δy is determined by computing Δy=|$y_e$−$y_s$|.

At 2304, the process finds dt(0) by solving dt(0) ((1−$x_f$)*Δy)−($y_f$*Δx), where $x_f$ is the fractional portion of $x_s$ and $y_f$ is the fractional portion of $y_s$. Then the process iterates through each row, for each row r containing a portion of said line segment:

At 2306, plotting said current pixel if dt(n)<=0.5*Δy and plotting the pixel to the left of said current pixel if dt(n)>0.5*Δy.

At 2308, moving said current pixel up one pixel if dt(n)<=0.5*Δy and moving said pixel to the left and up one pixel if dt(n)>0.5*Δy.

At 2310 correcting dt(n) by computing dt(n)=dt(n)−Δy if dt(n)>0.5*Δy.

At 2312, computing dt(n+1)=dt(n)+Δx.

Figure 24:
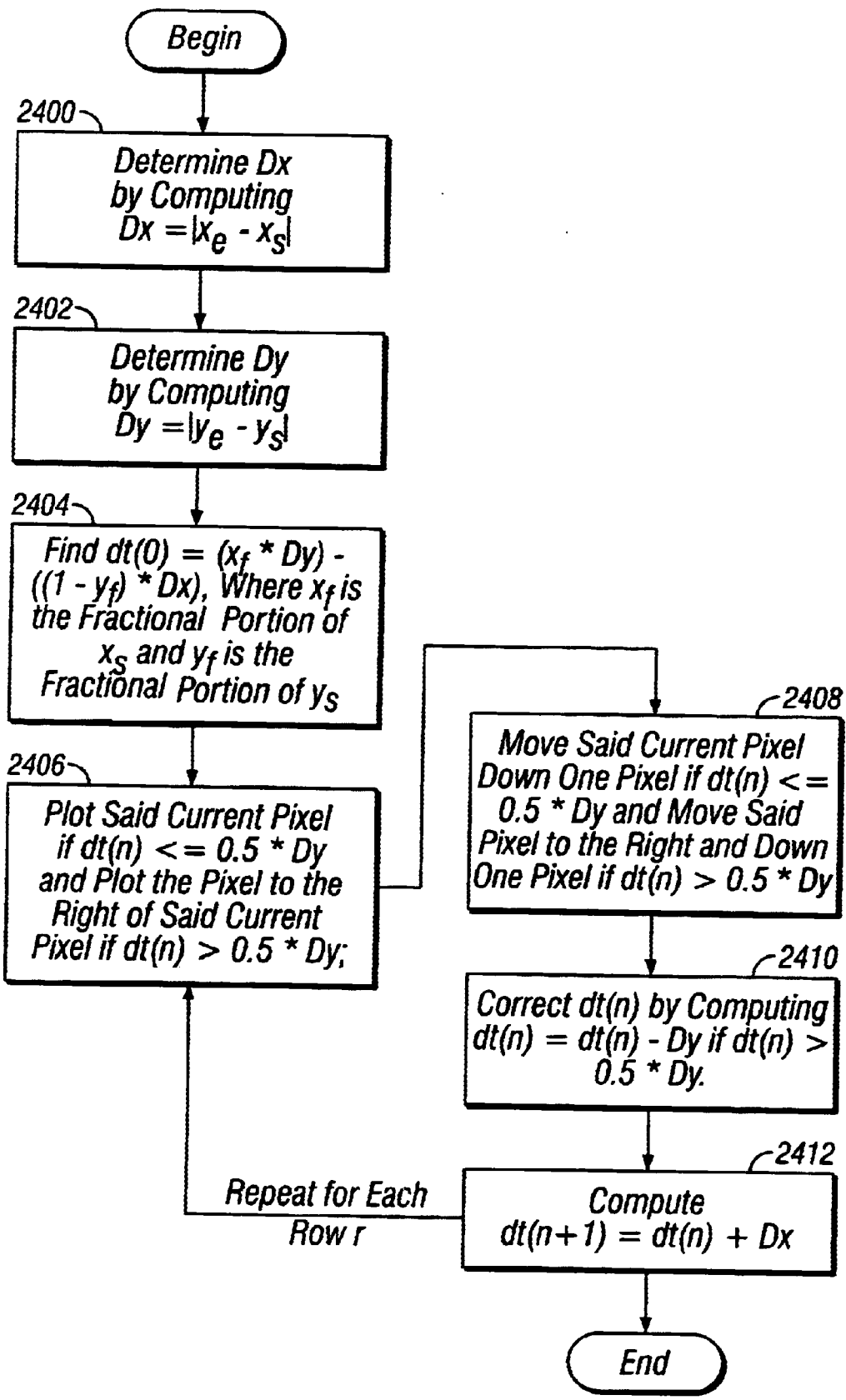
FIG. 24 is a flow diagram illustrating a method for rendering a line segment extending in the positive-x direction and negative-y direction with an absolute value of its slope greater than 1 on a computer display given a starting point and an ending point, the starting point having the form $(x_s, y_s)$ and the ending point having the form $(x_e, y_e)$, the computer display having a current pixel initially set to a pixel containing the starting point, in accordance with a presently preferred embodiment of the present invention.

FIG. 24 is a flow diagram illustrating a method for rendering a line segment extending in the positive-x direction and negative-y direction with an absolute value of its slope greater than 1 on a computer display given a starting point and an ending point, the starting point having the form ($x_s$, $y_s$) and the ending point having the form ($x_e$, $y_e$), the computer display having a current pixel initially set to a pixel containing the starting point, in accordance with a presently preferred embodiment of the present invention. At 2400, Δx is determined by computing Δx=|$x_e$−$x_s$|. At 2402, Δy is determined by computing Δy=|$y_e$−$y_s$|.

At 2404, the process finds dt(0) by solving dt(0)=($x_f$*Δy)−((1−$y_f$)*Δx), where $x_f$ is the fractional portion of $x_s$ and $y_f$ is the fractional portion of $y_s$. Then the process iterates through each row, for each row r containing a portion of said line segment:

At 2404, plotting said current pixel if dt(n)<=0.5*Δy and plotting the pixel to the right of said current pixel if dt(n)>0.5*Δy.

At 2408, moving said current pixel down one pixel if dt(n)<=0.5*Δy and moving said pixel to the right and down one pixel if dt(n)>0.5*Δy.

At 2410 correcting dt(n) by computing dt(n)=dt(n)−Δy if dt(n)>0.5*Δy.

At 2412, computing dt(n+1)=dt(n)+Δx.

Figure 25:
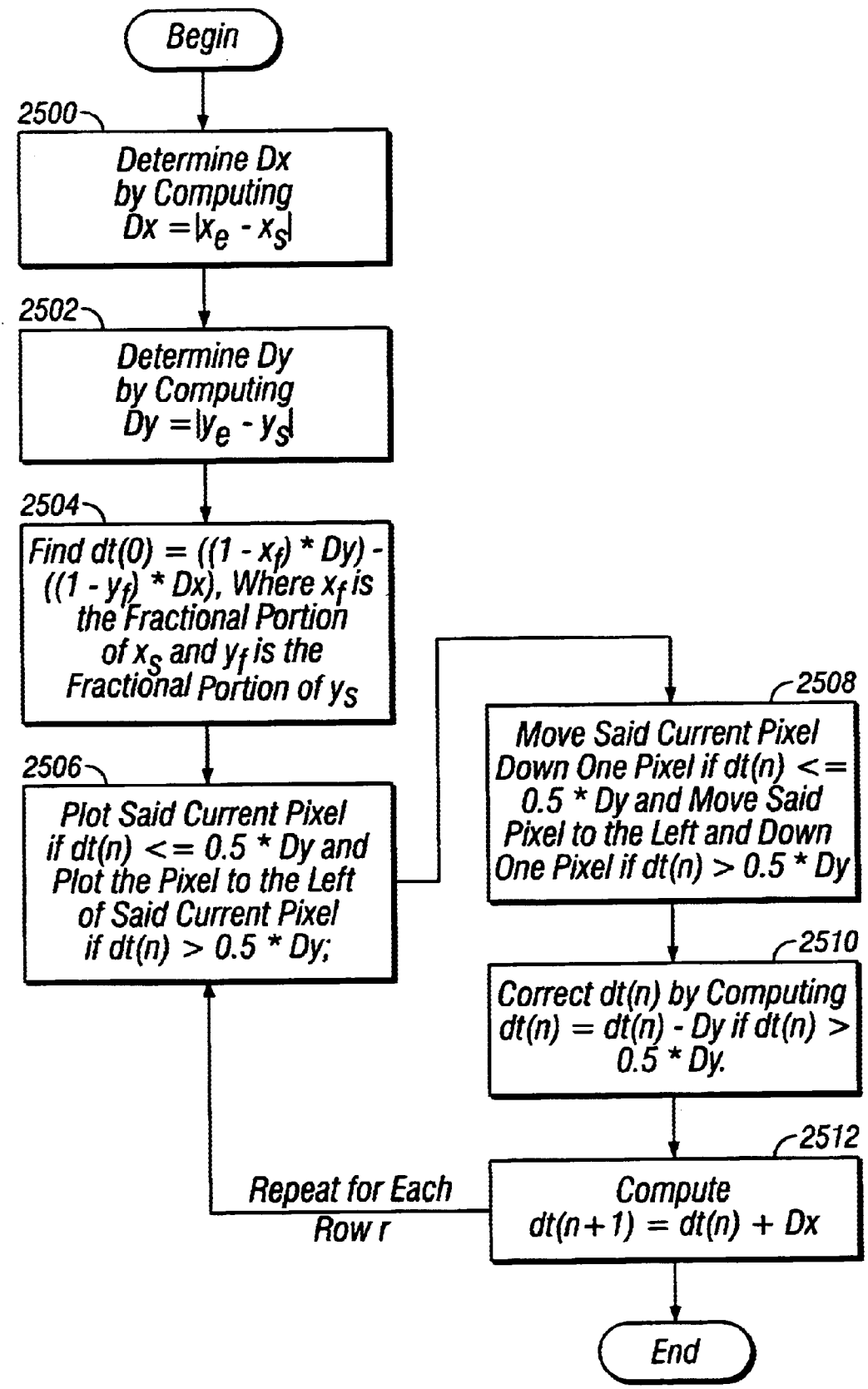
FIG. 25 is a flow diagram illustrating a method for rendering a line segment extending in the negative-x direction and negative-y direction with an absolute value of its slope greater than 1 on a computer display given a starting point and an ending point, the starting point having the form $(x_s, y_s)$ and the ending point having the form $(x_e, y_e)$, the computer display having a current pixel initially set to a pixel containing the starting point, in accordance with a presently preferred embodiment of the present invention.

FIG. 25 is a flow diagram illustrating a method for rendering a line segment extending in the negative-x direction and negative-y direction with an absolute value of its slope greater than 1 on a computer display given a starting point and an ending point, the starting point having the form ($x_s$, $y_s$) and the ending point having the form ($x_e$, $y_e$), the computer display having a current pixel initially set to a pixel containing the starting point, in accordance with a presently preferred embodiment of the present invention. At 2500, Δx is determined by computing Δx=|$x_e$−$x_s$|. At 2502, Δy is determined by computing Δy=|$y_e$−$y_s$|.

At 2504, the process finds dt(0) by solving dt(0)=((1−$x_f$)*Δy)−((1−$y_f$)*Δx), where $x_f$ is the fractional portion of $x_s$ and $y_f$ is the fractional portion of $y_s$. Then the process iterates through each row, for each row r containing a portion of said line segment:

At 2506, plotting said current pixel if $dt(n)<=0.5*\Delta y$ and plotting the pixel to the left of said current pixel if $dt(n)>0.5*\Delta y$.

At 2508, moving said current pixel down one pixel if $dt(n)<=0.5*\Delta y$ and moving said pixel to the left and down one pixel if $dt(n)>0.5*\Delta y$.

At 2510 correcting $dt(n)$ by computing $dt(n)=dt(n)-\Delta y$ if $dt(n)>0.5*\Delta y$.

At 2512, computing $dt(n+1)=dt(n)+\Delta x$.

Figure 26:
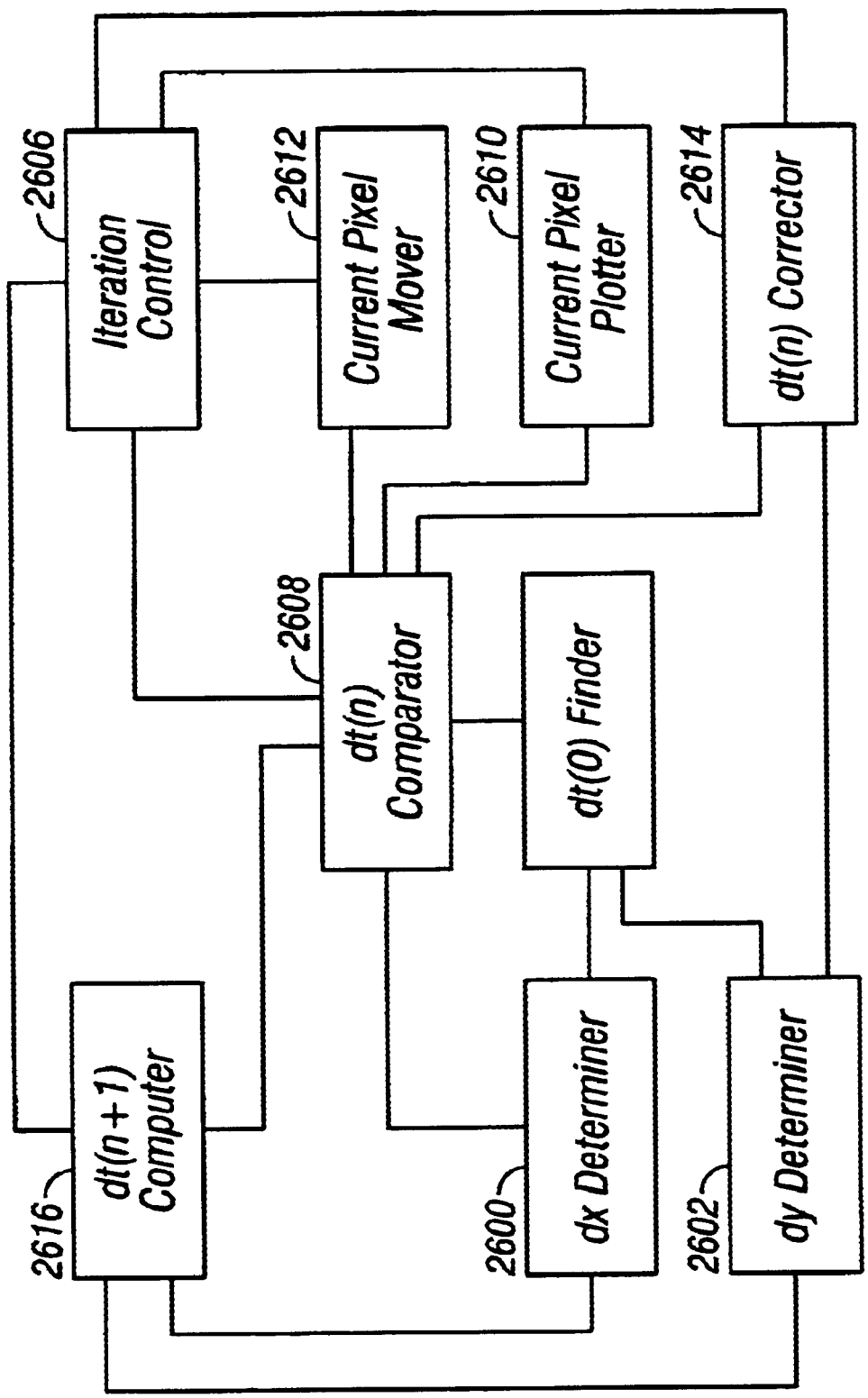
FIG. 26 is a block diagram illustrating an apparatus for rendering a line segment on a computer display given a starting point and an ending point, the starting point having the form $(x_s, y_s)$ and the ending point having the form $(x_e, y_e)$, the computer display having a current pixel initially set to a pixel containing the starting point, in accordance with a presently preferred embodiment of the present invention.

FIG. 26 is a block diagram illustrating an apparatus for rendering a line segment on a computer display given a starting point and an ending point, the starting point having the form $(x_s, y_s)$ and the ending point having the form $(x_e, y_e)$, the computer display having a current pixel initially set to a pixel containing the starting point, in accordance with a presently preferred embodiment of the present invention. A $\Delta x$ determiner 2600 determines $\Delta x$ by computing $\Delta x=|x_e-x_s|$. A $\Delta y$ determiner 2602 determines $\Delta y$ by computing $\Delta y=|y_e-y_s|$.

A $dt(0)$ finder 2604 coupled to said $\Delta x$ determiner 2600 and said $\Delta y$ determiner 2602 solves $dt(0)=((1-y_f)*\Delta x)-((1-x_f)*\Delta y)$, where $x_f$ is the fractional portion of $x_s$ and $y_f$ is the fractional portion of $y_s$. An iteration control 2606 iterates through each column (or row), for each column n (or row r) containing a portion of said line segment:

A $dt(n)$ comparator 2608 coupled to said $\Delta x$ determiner 2600, said $dt(0)$ finder 2604, and said iteration control 606 compares $dt(n)$ with $0.5*\Delta x$.

A current pixel plotter 2610 coupled to said iteration control 2606 and said $dt(n)$ comparator 2608 plots said current pixel if $dt(n)<=0.5*\Delta x$ and plots the pixel above said current pixel if $dt(n)>0.5*\Delta x$ (or other directions depending on the octant).

A current pixel mover 2612 coupled to said iteration control 606 and said $dt(n)$ comparator 2608 moves said current pixel to the right one pixel if $dt(n)<=0.5*\Delta x$ (or other directions depending on the octant) and moves said pixel to the right (or other directions depending on the octant) and up (or other directions depending on the octant) one pixel if $dt(n)>0.5*\Delta x$.

A $dt(n)$ corrector 2614 coupled to said $\Delta y$ determiner 2602, said iteration control 2606 and said $dt(n)$ comparator 2608 computes $dt(n)=dt(n)-\Delta x$ if $dt(n)>0.5\Delta x$.

A $dt(n+1)$ computer 2616 coupled to said iteration control 2606, said $dt(n)$ comparator 2608 and said $\Delta y$ determiner 2602 or $\Delta x$ determiner 2600 computes $dt(n+1)=dt(n)+\Delta y$ (or $\Delta x$ depending on the octant).

This solution, while elegant, still may leave something of a "staircase" effect after it is completed due to the single-pixel thickness of the line. 2-pixel groupings are utilized to smooth the line segment and remove the staircase effect. However, unlike the caps, each point in the middle of the line is sampled using only 2 pixels, as opposed to 4. Therefore, the next step is to determine which pixels should be sampled.

In a specific embodiment of the present invention, one of the pixel's chosen will always be the pixel determined by utilizing the methods in FIGS. 18–25. This will be referred to as the pixel containing the line segment. The second pixel will be determined based on the direction of the line as follows:

If between 0 and 45 degrees or between 135 and 180 degrees (Octants 1 and 4), the second pixel will be the one directly above the pixel containing the line segment.

If between 45 an 90 degrees or between −45 and −90 degrees (Octants 2 and 7), the second pixel will be the one directly to the right of the pixel containing the line segment.

If between 90 and 135 degrees or between −90 and −135 degrees (Octants 3 and 6), the second pixel will be the one directly to the left of the pixel containing the line segment.

If between 0 and −45 degrees or between −135 and −180 degrees (Octants 5 and 8), the second pixel will be the one directly below the pixel containing the line segment.

Turning now to the intensities applied to each of the two pixels, once again one of the goals is to ensure that the intensities of the pixels used to represent a point on the line add up to 1.0. However, in this case there are only two pixels being used for each point, as opposed to four for the starting and ending caps. These pixels, as discussed above, are referred to as the first and second pixels. Thus, the sum of the normalized intensity value of the first pixel and the normalized intensity value of the second pixel must be 1.0.

The $dt(n)$ value computed for each point on the line in determining the location of the first pixel for each iteration also may be used here to aid in computation of the normalized intensity value. Since dt represents $(y_f*\Delta x)-(x_f*\Delta y)$, we may multiply the current dt by $1/\Delta x$ to arrive at an index value, the index value corresponding to a cell in a normalized intensity lookup table. To find the illumination of the second pixel, one need only subtract the value in the lookup table from 1.0.

Figure 27A:
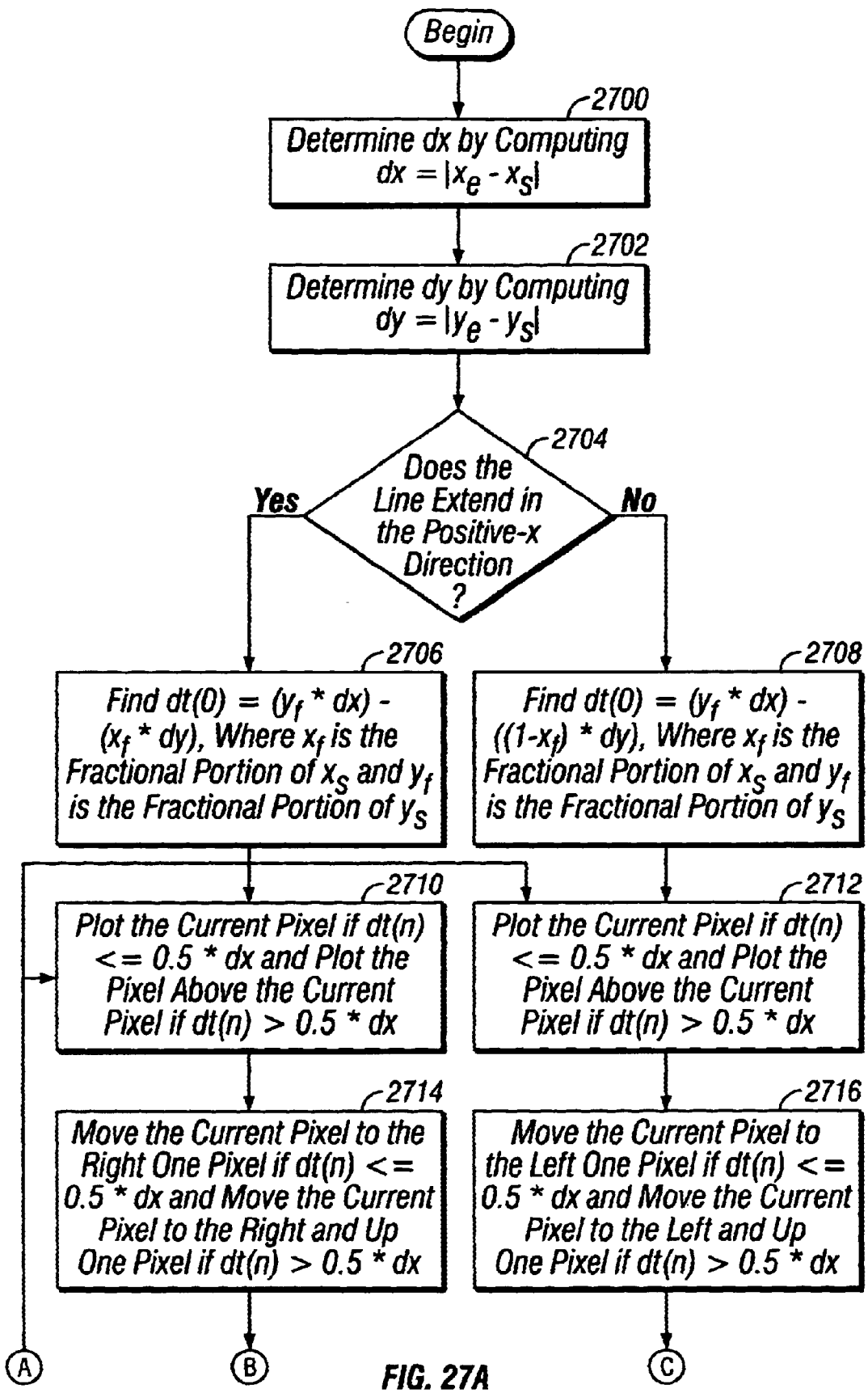
FIG. 27 is a flow diagram illustrating a method for rendering the middle of a line, wherein the line extends in the positive-x direction and positive-y direction or extends in the negative-x direction and positively direction, wherein the line has an absolute value of its slope between 0 and 1 in accordance with a specific embodiment of the present invention.
Figure 27B:
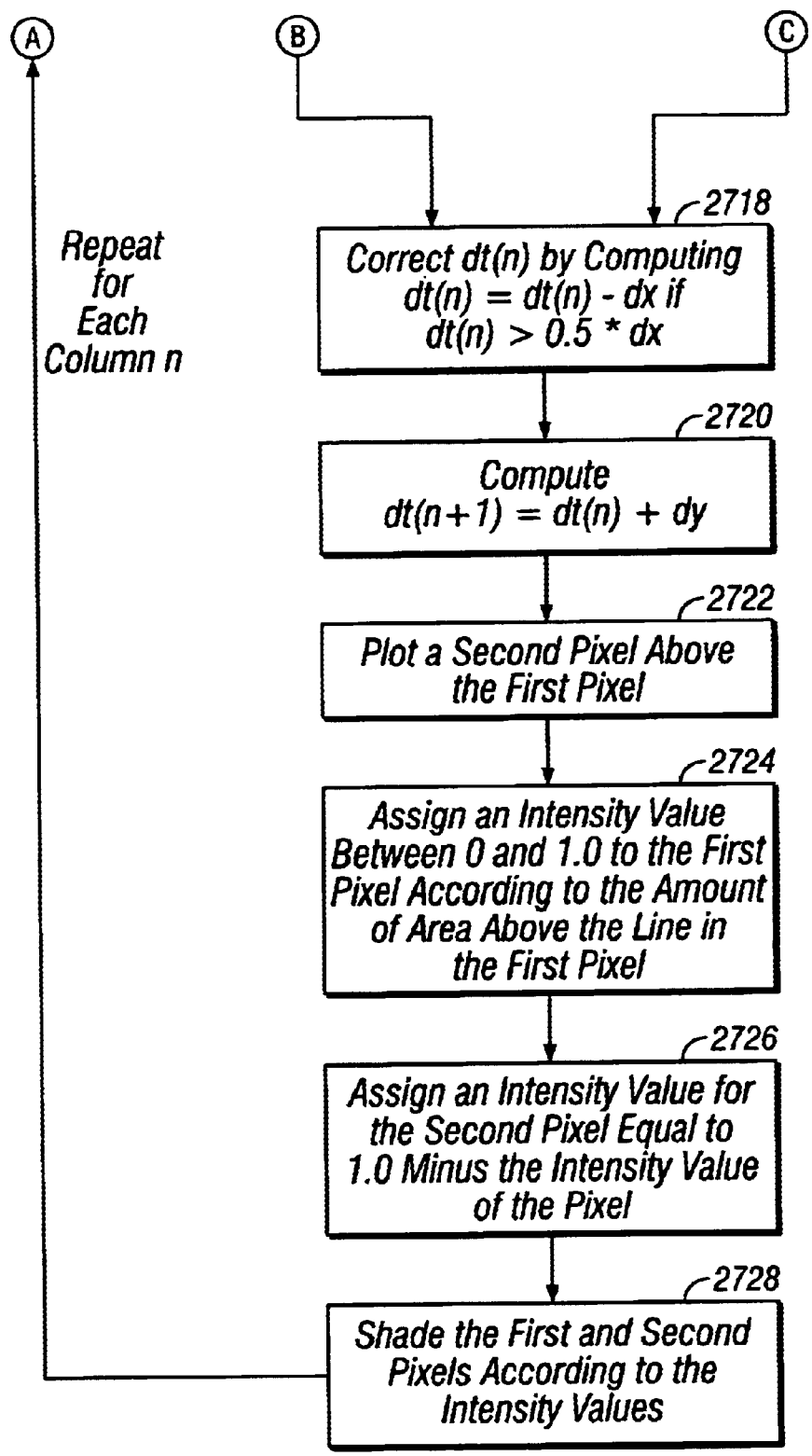

FIG. 27 is a flow diagram illustrating a method for rendering the middle of a line, wherein the line extends in the positive-x direction and positive-y direction or extends in the negative-x direction and positive-y direction, wherein the line has an absolute value of its slope between 0 and 1 in accordance with a specific embodiment of the present invention. At 2700, $\Delta x$ is determined by computing $\Delta x=|x_e-x_s|$, wherein $(x_s, y_s)$ represents a starting point for the line and $(x_e, y_e)$ represents an ending point for the line, $x_s$, $y_s$, $x_{e, ye}$ each having an integer portion and a fractional portion. At 2702, $\Delta y$ is determined by computing $\Delta y=|y_e-y_s|$. At 2704, it is determined if the line extends in the positive-x direction or not. If so, then at 2706 $dt(0)$ $(y_f*\Delta x)-(x_f*\Delta y)$ is found, where $x_f$ is the fractional portion of $x_s$ and $y_f$ is the fractional portion of $y_s$. If the line instead extends in the negative-x direction, then $dt(0)=(y_f*\Delta x)-((1-x_f)*\Delta y)$ at 2708.

At this point, there is a loop that iterates for each column n containing a portion of the middle of the line. A first pixel is plotted, the first pixel being a pixel which best represents the location of the line in the column. This plotting includes several parts. At 2710 and 2712, the first part is plotting the current pixel if $dt(n)<=0.5*\Delta x$ and plotting the pixel above the current pixel if $dt(n)>0.5*\Delta x$. The second part includes moving the current pixel to the right one pixel if $dt(n)<=0.5*\Delta x$ and moving the current pixel to the right and up one pixel if $dt(n)>0.5*\Delta x$ and the line extends in the positive-x direction at 2714. If, however, the line extends in the negative-x and positively directions, the second part includes moving the current pixel to the left one pixel if $dt(n)<=0.5*\Delta x$ and moving the current pixel to the left and up one pixel if $dt(n)>0.5*\Delta x$ at 2716. The third part includes correcting $dt(n)$ by computing $dt(n)=dt(n)-\Delta x$ if $dt(n)>0.5*\Delta x$ at 2718. The fourth part includes computing $dt(n+1)=dt(n)+\Delta y$ at 2720.

At 2722, a second pixel is plotted above the first pixel. At 2724, an intensity value between 0 and 1.0 is assigned to the first pixel according to the amount of area above the line in the first pixel. This includes multiplying $dt(n)$ by $(1/\Delta x)$ to arrive at an index value, the index value corresponding to a cell in a normalized intensity lookup table, in order to get a normalized intensity value for the first pixel. At 2726, an intensity value is assigned for the second pixel equal to 1.0 minus the intensity value of the pixel. Finally, at 2728, the first and second pixels are shaded according to the intensity values.

Figure 28A:
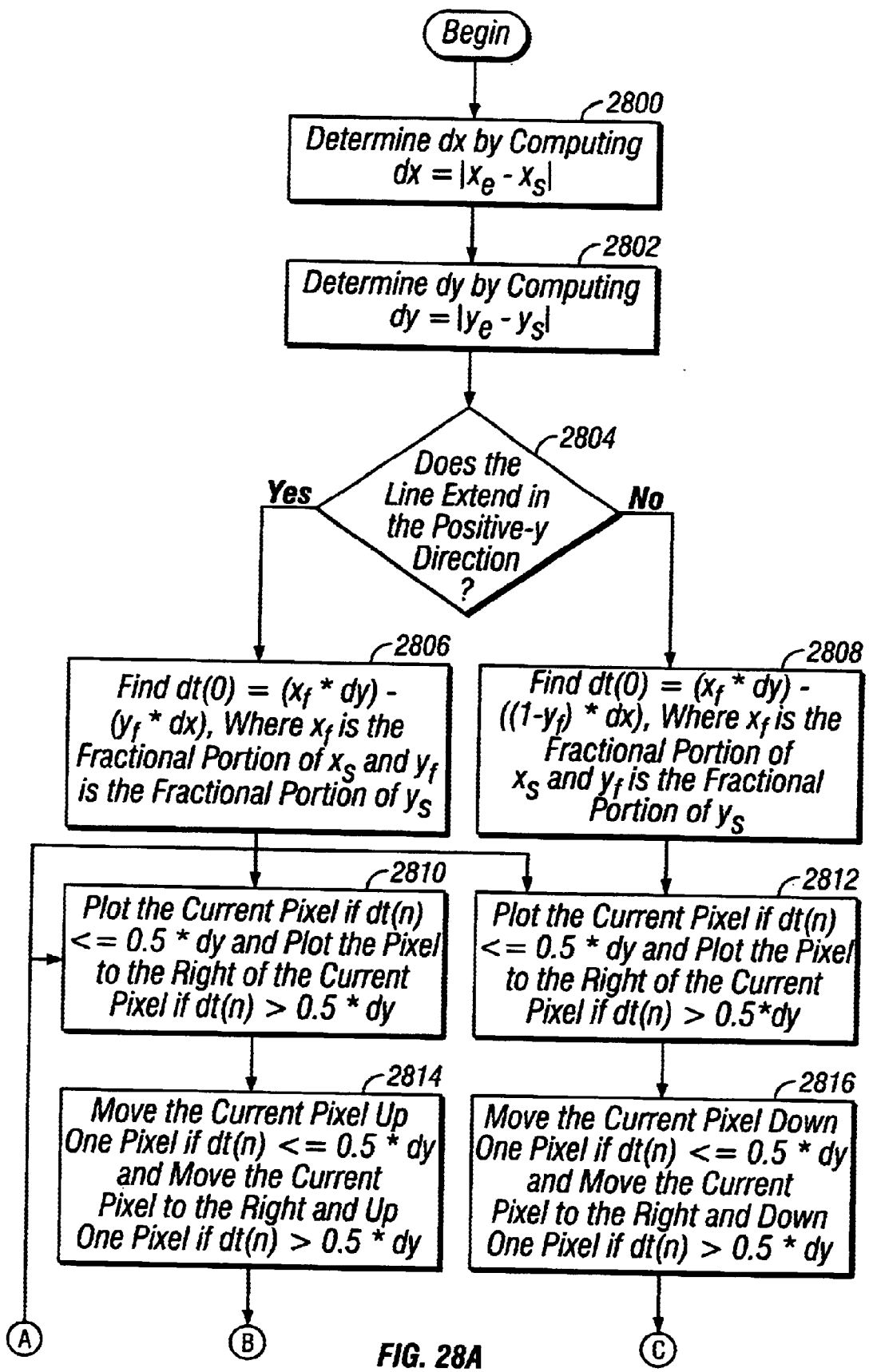
FIG. 28 is a flow diagram illustrating a method for rendering the middle of a line, wherein the line extends in the positive-x direction and positive-y direction or extends in the positive-x direction and negative-y direction, wherein the line has an absolute value of its slope greater than 1 in accordance with a specific embodiment of the present invention.
Figure 28B:
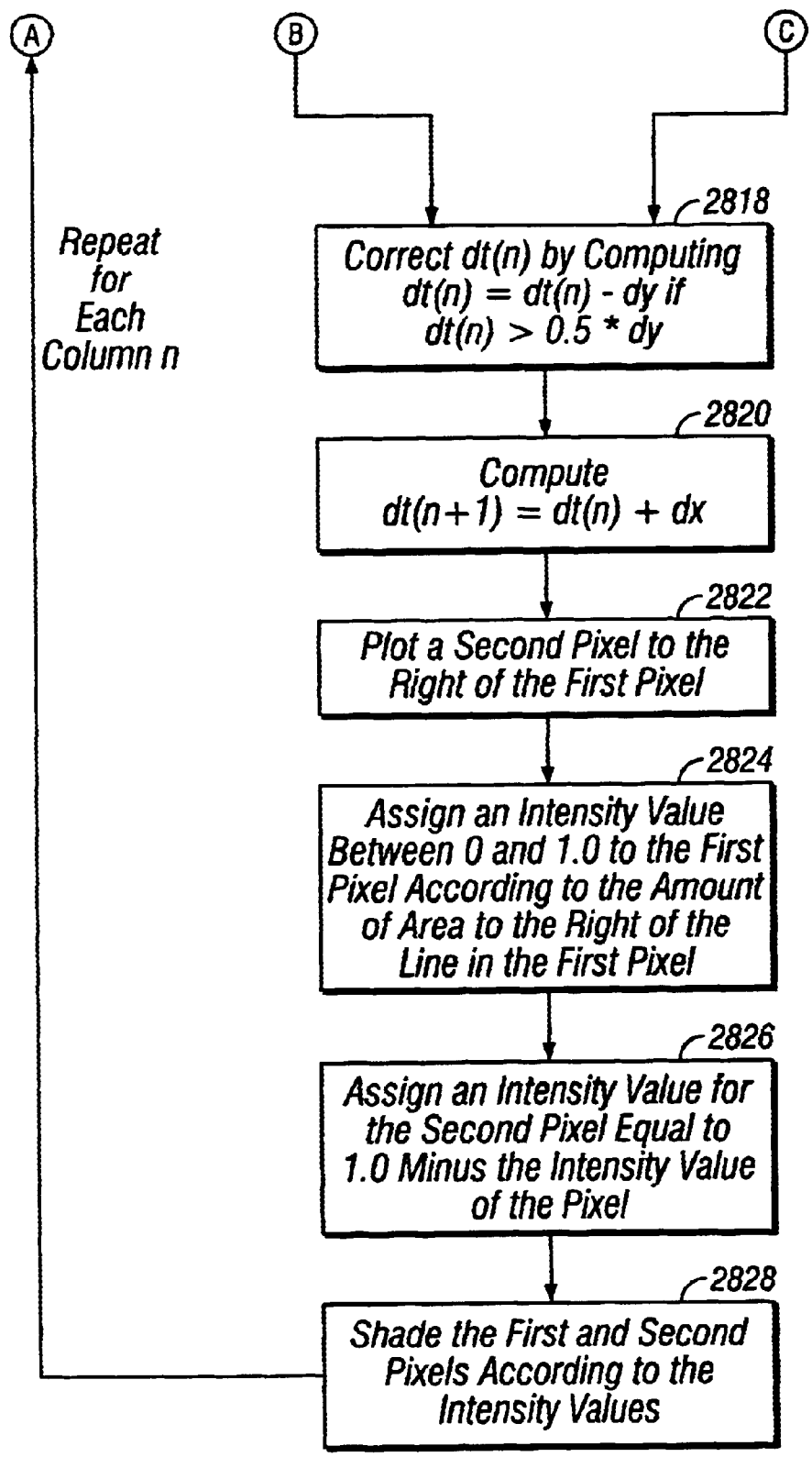

FIG. 28 is a flow diagram illustrating a method for rendering the middle of a line, wherein the line extends in the positive-x direction and positive-y direction or extends in the positive-x direction and negatively direction, wherein the line has an absolute value of its slope greater than 1 in accordance with a specific embodiment of the present invention. At 2800, $\Delta x$ is determined by computing $\Delta x=|x_e-x_s|$, wherein $(x_s, y_s)$ represents a starting point for the line and $(x_e, y_e)$ represents an ending point for the line, $x_s, y_s, x_e, y_e$ each having an integer portion and a fractional portion. At 2802, $\Delta y$ is determined by computing $\Delta y=|y_e-y_s|$. At 2804, it is determined if the line extends in the positive-y direction or not. If so, then at 2806 $dt(0)=(x_f*\Delta y)-(y_f*\Delta x)$ is found, where $x_f$ is the fractional portion of $x_s$ and $y_f$ is the fractional portion of $y_s$. If the line instead extends in the negative-x direction, then $dt(0)=(x_f*\Delta y)-((1-y_f)*\Delta x)$ at 2808.

At this point, there is a loop that iterates for each column n containing a portion of the middle of the line. A first pixel is plotted, the first pixel being a pixel which best represents the location of the line in the column. This plotting includes several parts. At 2810 and 2812, the first part is plotting the current pixel if $dt(n)<=0.5*\Delta y$ and plotting the pixel to the right of the current pixel if $dt(n)>0.5*\Delta y$. The second part includes moving the current pixel up one pixel if $dt(n)<=0.5*\Delta y$ and moving the current pixel to the right and up one pixel if $dt(n)>0.5*\Delta y$ and the line extends in the positive-x direction at 2814. If, however, the line extends in the negative-x and positive-y directions, the second part includes moving the current pixel down one pixel if $dt(n)<=0.5*\Delta y$ and moving the current pixel to the right and down one pixel if $dt(n)>0.5*\Delta y$ at 2816. The third part includes correcting $dt(n)$ by computing $dt(n)=dt(n)-\Delta y$ if $dt(n)>0.5*\Delta y$ at 2818. The fourth part includes computing $dt(n+1)=dt(n)+\Delta x$ at 2820.

At 2822, a second pixel is plotted directly to the right of the first pixel. At 2824, an intensity value between 0 and 1.0 is assigned to the first pixel according to the amount of area to the right of the line in the first pixel. This includes multiplying $dt(n)$ by $(1/\Delta x)$ to arrive at an index value, the index value corresponding to a cell in a normalized intensity lookup table, in order to get a normalized intensity value for the first pixel. At 2826, an intensity value is assigned for the second pixel equal to 1.0 minus the intensity value of the pixel. Finally, at 2828, the first and second pixels are shaded according to the intensity values.

Figure 29A:
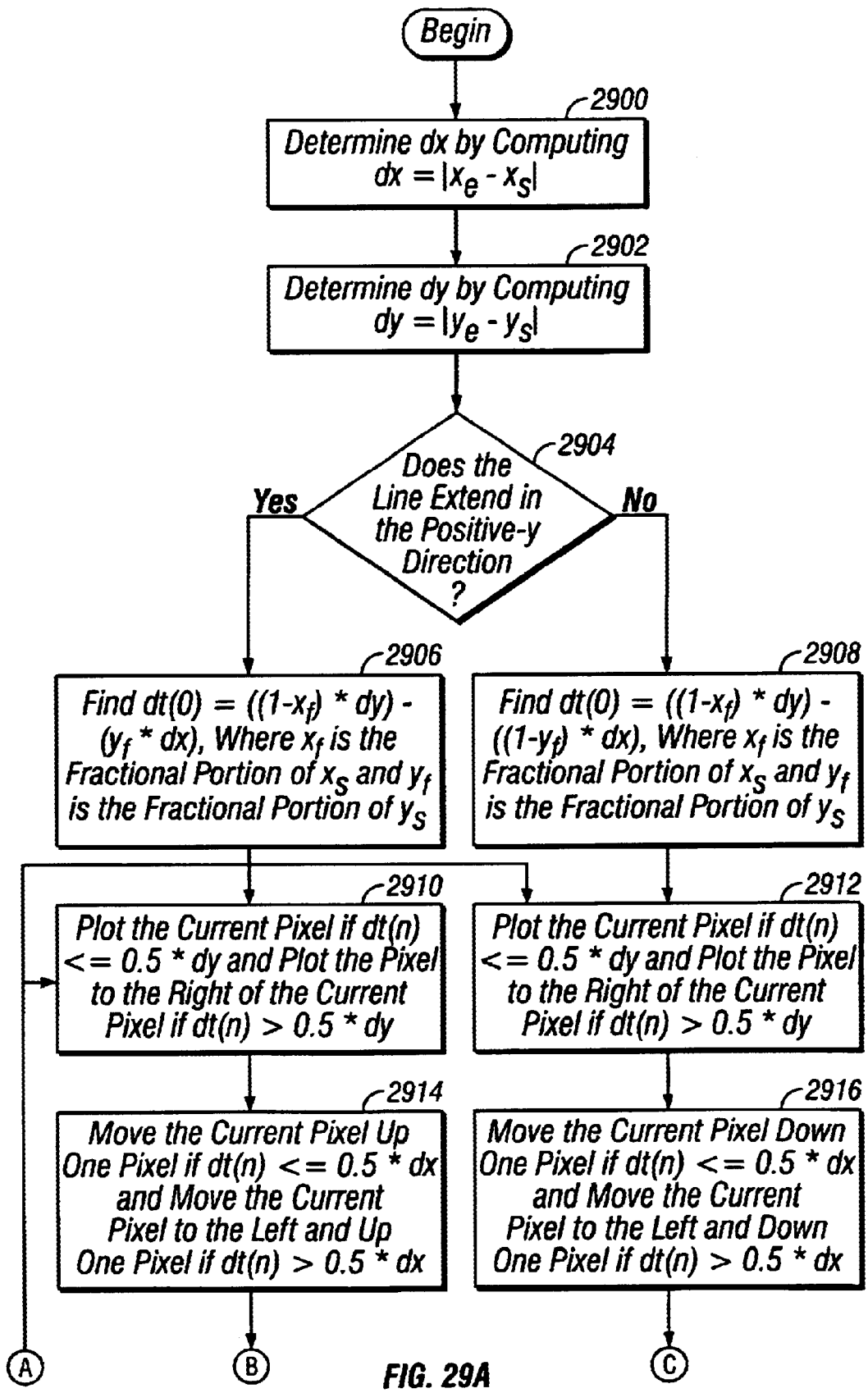
FIG. 29 is a flow diagram illustrating a method for rendering the middle of a line, wherein the line extends in the negative-x direction and positive-y direction or extends in the negative-x direction and negative-y direction, wherein the line has an absolute value of its slope greater than 1 in accordance with a specific embodiment of the present invention.
Figure 29B:
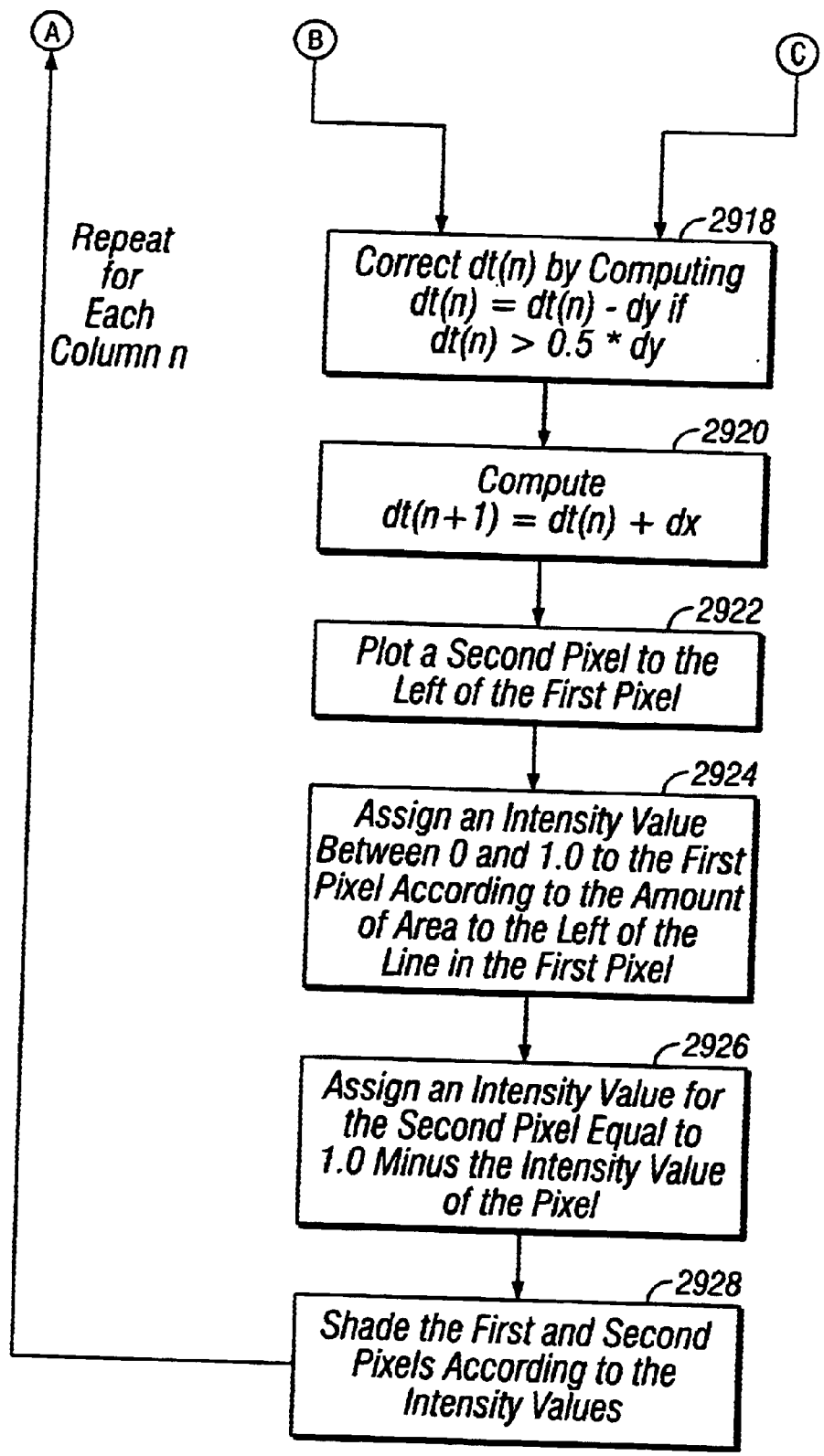

FIG. 29 is a flow diagram illustrating a method for rendering the middle of a line, wherein the line extends in the negative-x direction and positive-y direction or extends in the negative-x direction and negative-y direction, wherein the line has an absolute value of its slope greater than 1 in accordance with a specific embodiment of the present invention. At 2900, $\Delta x$ is determined by computing $\Delta x=|x_e-x_s|$, wherein $(x_s, y_s)$ represents a starting point for the line and $(x_e, y_e)$ represents an ending point for the line, $x_s, y_s, x_e, y_e$ each having an integer portion and a fractional portion. At 2902, $\Delta y$ is determined by computing $\Delta y=|y_e-y_s|$. At 2904, it is determined if the line extends in the positively direction or not. If so, then at 2906 $dt(0)=((1-x_f)*\Delta y)-(y_f*\Delta x)$ is found, where $x_f$ is the fractional portion of $x_s$ and $y_f$ is the fractional portion of $y_s$. If the line instead extends in the negative-x direction, then $dt(0)=((1-x_f)*\Delta y)-((1-y_f)*\Delta x)$ at 2908.

An adjustment must then be made to starting pixel for what will be known as the current pixel to reflect the fact that the line is extending in the 3rd and 6th octants. This will compensate for the symmetrical nature of these octants to the 2nd and 7th octants, and thus allow identical lines drawn in symmetrical octants to more closely resemble each other on the computer display. Therefore, before the plotting even begins, the current pixel is simply shifted to the right one pixel. This will cause the current pixel (and thus the first pixel plotted each column) to not necessarily contain a portion of the mathematical line. However, in this case the second pixel will then contain at least a portion of the mathematical line. In essence, the line will be simply shifted one pixel to the right.

At this point, there is a loop that iterates for each column n containing a portion of the middle of the line. A first pixel is plotted, the first pixel being a pixel which best represents the location of the line in the column. This plotting includes several parts. At 2910 and 2912, the first part is plotting the current pixel if $dt(n)<=0.5*\Delta y$ and plotting the pixel to the right of the current pixel if $dt(n)>0.5*\Delta y$. The second part includes moving the current pixel up one pixel if $dt(n)<=0.5*\Delta y$ and moving the current pixel to the left and up one pixel if $dt(n)>0.5*\Delta y$ and the line extends in the positive-x direction at 2914. If, however, the line extends in the negative-x and positive-y directions, the second part includes moving the current pixel down one pixel if $dt(n)<=0.5*\Delta y$ and moving the current pixel to the left and down one pixel if $dt(n)>0.5*\Delta y$ at 2916. The third part includes correcting $dt(n)$ by computing $dt(n)=dt(n)-\Delta y$ if $dt(n)>0.5*\Delta y$ at 2918. The fourth part includes computing $dt(n+1)=dt(n)+\Delta x$ at 2920.

At 2922, a second pixel is plotted directly to the left of the first pixel. At 2924, an intensity value between 0 and 1.0 is assigned to the first pixel according to the amount of area to the left of the line in the first pixel. This includes multiplying $dt(n)$ by $(1/\Delta x)$ to arrive at an index value, the index value corresponding to a cell in a normalized intensity lookup table, in order to get a normalized intensity value for the first pixel. At 2926, an intensity value is assigned for the second pixel equal to 1.0 minus the intensity value of the pixel. Finally, at 2928, the first and second pixels are shaded according to the intensity values.

Figure 30A:
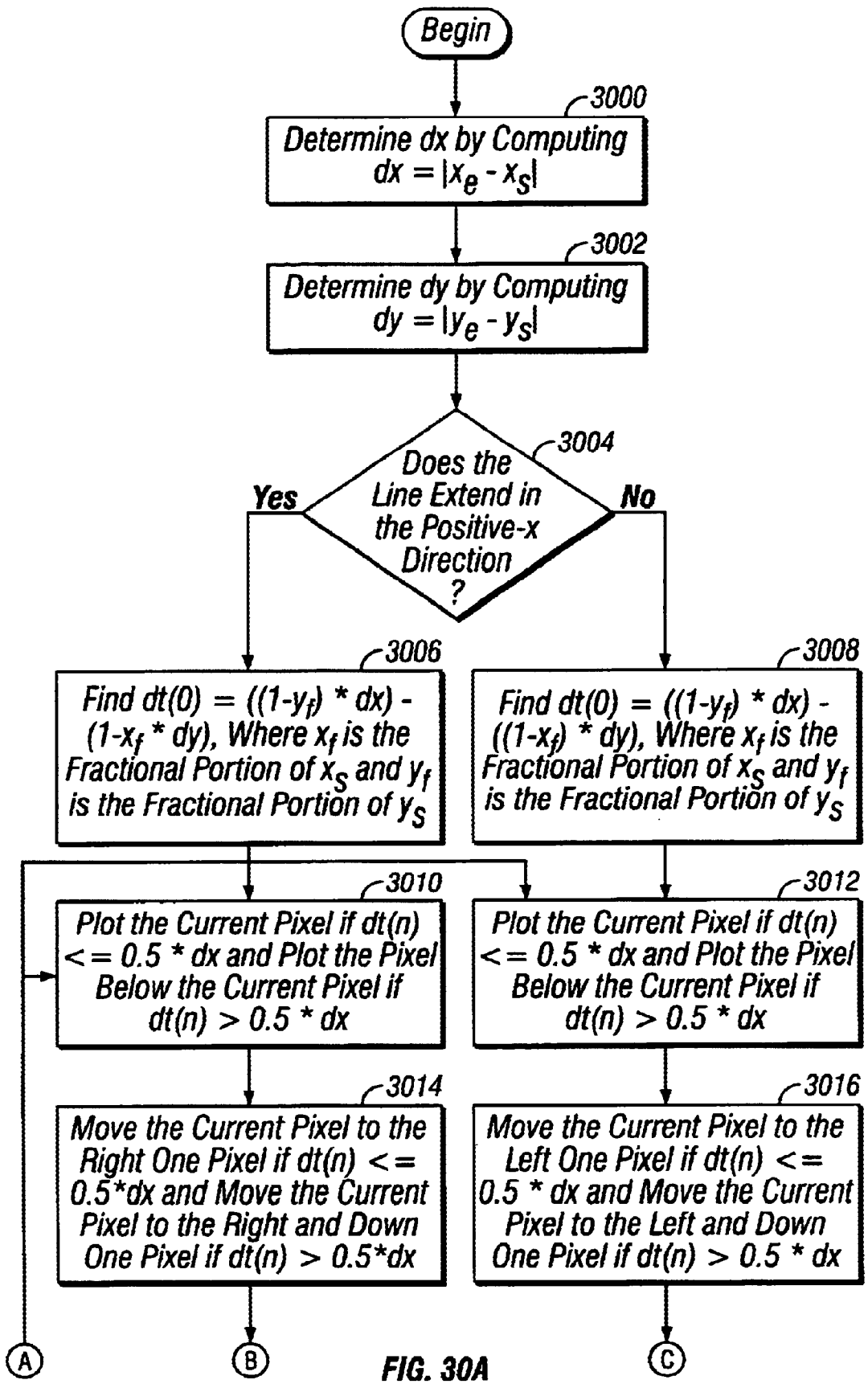
FIG. 30 is a flow diagram illustrating a method for rendering the middle of a line, wherein the line extends in the positive-x direction and negative-y direction or extends in the negative-x direction and negative-y direction, wherein the line has an absolute value of its slope between 0 and 1 in accordance with a specific embodiment of the present invention.
Figure 30B:
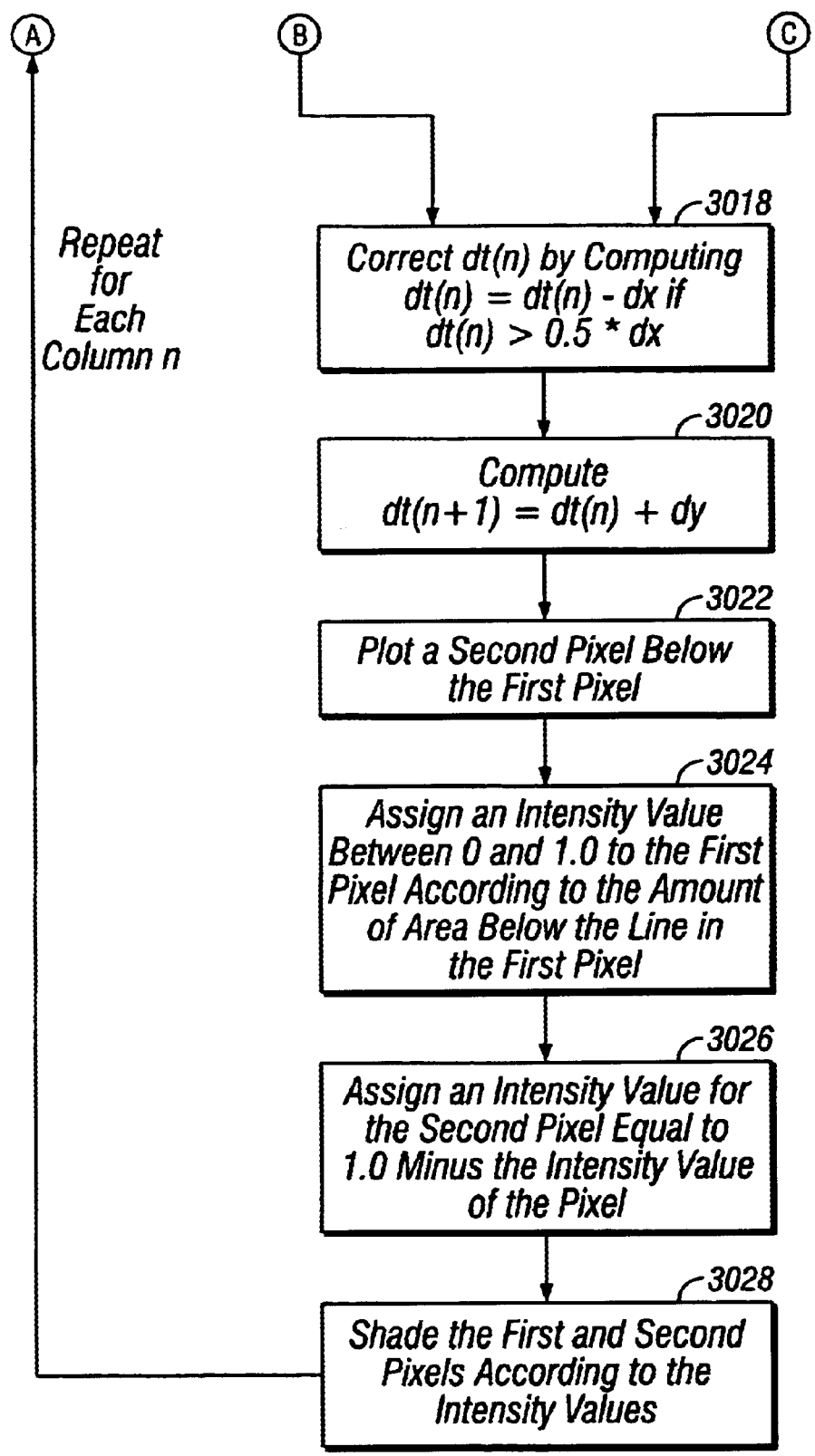

FIG. 30 is a flow diagram illustrating a method for rendering the middle of a line, wherein the line extends in the positive-x direction and negative-y direction or extends in the negative-x direction and negative-y direction, wherein the line has an absolute value of its slope between 0 and 1 in accordance with a specific embodiment of the present invention. At 3000, $\Delta x$ is determined by computing $\Delta x=|x_e-x_s|$, wherein $(x_s, y_s)$ represents a starting point for the line and $(x_e, y_e)$ represents an ending point for the line, $x_s, y_s, x_e, y_e$ each having an integer portion and a fractional portion. At 3002, $\Delta y$ is determined by computing $\Delta y=|y_e-y_s|$. At 3004, it is determined if the line extends in the positive-x direction or not. If so, then at 3006 $dt(0)=((1-y_f)*\Delta x)-(x_f*\Delta y)$ is found, where $x_f$ is the fractional portion of $x_s$ and $y_f$ is the fractional portion of $y_s$. If the line instead extends in the negative-x direction, then $dt(0)=((1-y_f)*\Delta x)-((1-x_f)*\Delta y)$ at 3008.

An adjustment must then be made to starting pixel for what will be known as the current pixel to reflect the fact that the line is extending in the 5th and 8th octants. This will compensate for the symmetrical nature of these octants to the 1st and 4th octants, and thus allow identical lines drawn in symmetrical octants to more closely resemble each other on the computer display. Therefore, before the plotting even begins, the current pixel is simply shifted up one pixel. This will cause the current pixel (and thus the first pixel plotted each column) to not necessarily contain a portion of the mathematical line. However, in this case the second pixel will then contain at least a portion of the mathematical line. In essence, the line will be simply shifted up one pixel.

At this point, there is a loop that iterates for each column n containing a portion of the middle of the line. A first pixel is plotted, the first pixel being a pixel which best represents the location of the line in the column. This plotting includes several parts. At 3010 and 3012, the first part is plotting the current pixel if $dt(n)<=0.5*\Delta x$ and plotting the pixel below the current pixel if $dt(n)>0.5*\Delta x$. The second part includes moving the current pixel to the right one pixel if $dt(n)<=0.5*\Delta x$ and moving the current pixel to the right and down one pixel if $dt(n)>0.5*\Delta x$ and the line extends in the positive-x direction at 3014. If, however, the line extends in the negative-x and positive-y directions, the second part includes moving the current pixel to the left one pixel if $dt(n)<=0.5*\Delta x$ and moving the current pixel to the left and down one pixel if $dt(n)>0.5*\Delta x$ at 3016. The third part includes correcting $dt(n)$ by computing $dt(n)=dt(n)-\Delta x$ if $dt(n)>0.5*\Delta x$ at 3018. The fourth part includes computing $dt(n+1)=dt(n)+\Delta y$ at 3020.

At 3022, a second pixel is plotted below the first pixel. At 3024, an intensity value between 0 and 1.0 is assigned to the first pixel according to the amount of area below the line in the first pixel. This includes multiplying $dt(n)$ by $(1/\Delta x)$ to arrive at an index value, the index value corresponding to a cell in a normalized intensity lookup table, in order to get a normalized intensity value for the first pixel. At 3026, an intensity value is assigned for the second pixel equal to 1.0 minus the intensity value of the pixel. Finally, at 3028, the first and second pixels are shaded according to the intensity values.

Figure 31:
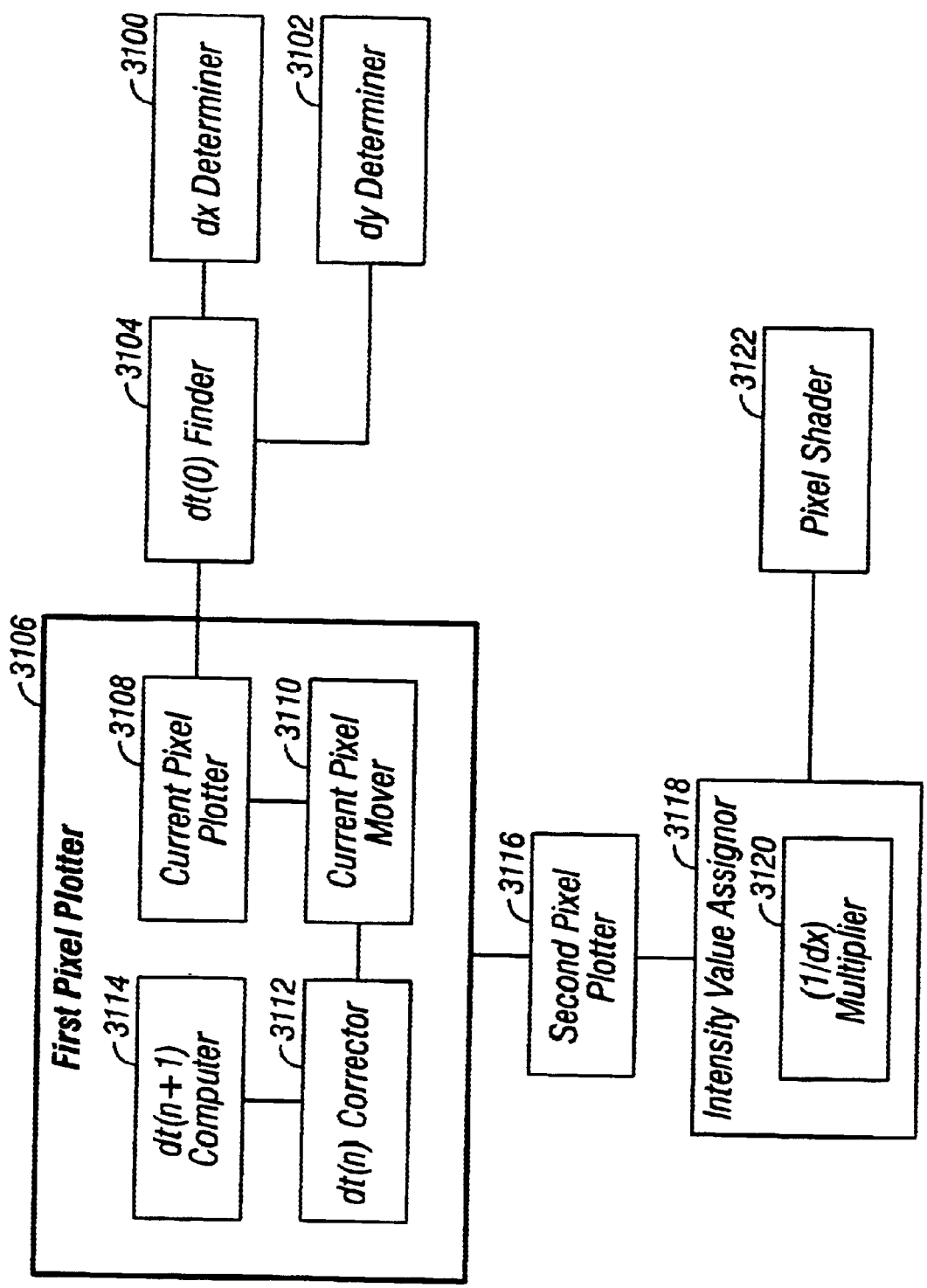
FIG. 31 is a block diagram illustrating an apparatus for rendering the middle of a line in accordance with a specific embodiment of the present invention.

FIG. 31 is a block diagram illustrating an apparatus for rendering the middle of a line in accordance with a specific embodiment of the present invention. A dx determiner 3100 determines $\Delta x$ by computing $\Delta x=|x_e-x_s|$, wherein $(x_s, y_s)$ represents a starting point for the line and $(x_e, y_e)$ represents an ending point for the line, $x_s$, $y_s$, $x_e$, $y_e$ each having an integer portion and a fractional portion. A dy determiner 3102 determines $\Delta y$ by computing $\Delta y=|y_e-y_s|$. A dt(0) finder 3104 coupled to said dx determiner 3100 and said dy determiner 3102 finds $dt(0)$. This is found differently depending on the octant the line is in according to the following list where $x_f$ is the fractional portion of $x_s$ and $y_f$ is the fractional portion of y.

Octant 1: $dt(0)=(y_f*\Delta x)-(x_f*\Delta y)$
Octant 2: $dt(0)=(x_f*\Delta y)-(y_f*\Delta x)$
Octant 3: $dt(0)=((1-x_f)*\Delta y)-(y_f*\Delta x)$
Octant 4: $dt(0)=(y_f*\Delta x)-((1-x_f)*\Delta y)$
Octant 5: $dt(0)=((1-y_f)*\Delta x)-((1-x)*\Delta y)$
Octant 6: $dt(0)=((1-x_f)*\Delta y)-((1-y_f)*\Delta x)$
Octant 7: $dt(0)=(x_f*\Delta y)-((1-y_f)*\Delta x)$
Octant 8: $dt(0)=((1-y_f)*\Delta x)-(x_f*\Delta y)$ At this point, there is a loop that iterates for each column n containing a portion of the middle of the line. A first pixel is plotted by a first pixel plotter 3106, the first pixel being a pixel which best represents the location of the line in the column. This plotting includes several parts. A current pixel plotter 3108 coupled to said dt(0) finder 3104 plots a pixel depending on the direction of the line. The current pixel is plotted if the line extends in the 1st, 4th, 5th, or 8th octants and $dt(n)<=0.5*\Delta x$. The current pixel is also plotted if the line extends in the 2nd, 3rd, 6th, or 7th octants and $dt(n)<=0.5*\Delta y$. If neither case is true, then a pixel above the current pixel is plotted if the line extends in the 1st or 4th octants, below the current pixel if the line extends in the 5th or 8th octants, to the right of the current pixel if the line extends in the 2nd or 7th octants, and to the left of the current pixel if the line extends in the 3rd or 6th octants.

A current pixel mover 3110 coupled to the current pixel plotter 3108 moves the current pixel. Again, the direction moved depends on the octant according to the following list:

Octant 1: right one pixel if $dt(n)<=0.5*\Delta x$ and to the right and up one pixel if $dt(n)>0.5*\Delta x$.

Octant 2: up one pixel if $dt(n)<=0.5*\Delta y$ and to the right and up one pixel if $dt(n)>0.5*\Delta y$.

Octant 3: up one pixel if $dt(n)<=0.5*\Delta y$ and to the right and up one pixel if $dt(n)>0.5*\Delta y$.

Octant 4: left one pixel if $dt(n)<=0.5*\Delta x$ and to the left and up one pixel if $dt(n)>0.5*\Delta x$.

Octant 5: left one pixel if $dt(n)<=0.5*\Delta x$ and to the left and down one pixel if $dt(n)>0.5*\Delta x$.

Octant 6: down one pixel if $dt(n)<=0.5*\Delta y$ and to the left and down one pixel if $dt(n)>0.5*\Delta y$.

Octant 7: down one pixel if $dt(n)<=0.5*\Delta y$ and to the left and down one pixel if $dt(n)>0.5*\Delta y$.

Octant 8: right one pixel if $dt(n)<=0.5*\Delta x$ and to the right and down one pixel if $dt(n)>0.5*\Delta x$.

A dt(n) corrector 3112 coupled to the current pixel mover 3110 corrects $dt(n)$ by computing $dt(n)=dt(n)-\Delta x$ if $dt(n)>0.5*\Delta x$ and the line extends in the 1st, 4th, 5th, or 8th octants, and $dt(n)=dt(n)-\Delta y$ if $dt(n)>0.5*\Delta y$ and the line extends in the 2nd, 3rd, 6th, or 7th octants. A dt(n+1) computer 3114 coupled to said dt(n) corrector 3112 computes $dt(n+1)=dt(n)+\Delta y$ if the line extends in the 1st, 4th, 5th, or 8th octants and computes $dt(n+1)=dt(n)+\Delta x$ if the line extends in the 2nd, 3rd, 6th, or 7th octants.

A second pixel plotter 3116 coupled to said first pixel plotter 3106 plots a second pixel adjacent to the first pixel. The second pixel is above the first pixel if the line extends in the 1st or 4th octants, below the first pixel if the line extends in the 5th or 8th octants, to the left of the first pixel if the line extends in the 3rd or 6th octants, and to the right of the first pixel if the line extends in the 2nd or 7th octants.

An intensity value assignor 3118 coupled to said second pixel plotter assigns an intensity value to each of the first and second pixels. The first pixel is assigned an intensity value between 0 and 1.0 according to the amount of area above the line in the first pixel if the line extends in the 1st or 4th octants, below the line in the first pixel if the line extends in the 5th or 8th octants, to the left of the line in the first pixel if the line extends in the 3rd or 6th octants, and to the right of the line in the first pixel if the line extends in the 2nd or 7th octants. Then an intensity value is assigned to the second pixel equal to 1.0 minus the intensity value of the first pixel. The determination of the first pixel includes multiplying $dt(n)$ by $(1/\Delta x)$ using a $(1/dx)$ multiplier 3120 to arrive at an index value, the index value corresponding to a cell in a normalized intensity lookup table, in order to get a normalized intensity value for the first pixel. A pixel shader 3122 coupled to said intensity value assignor 3118 shades the first and second pixels according to the intensity values.

To handle the case where dt may be negative, this may also be expressed by the following:

If dt<0:

for octants 1 and 4, the first pixel's normalized intensity is proportional to the complement of dt/dx with the second pixel below the first pixel at a normalized intensity value of 1.0 minus the normalized intensity of the first pixel.

for octants 5 and 8, the first pixel's normalized intensity is proportional to the complement of dt/dx with the second pixel above the first pixel at a normalized intensity value of 1.0 minus the normalized intensity of the first pixel.

for octants 3 and 6, the first pixel's normalized intensity is proportional to the complement of dt/dy with the second pixel to the left of the first pixel at a normalized intensity value of 1.0 minus the normalized intensity of the first pixel.

for octants 2 and 7, the first pixel's normalized intensity is proportional to the complement of dt/dy with the second pixel to the right of the first pixel at a normalized intensity value of 1.0 minus the normalized intensity of the first pixel.

If dt>0:

for octants 1 and 4, the first pixel's normalized intensity is proportional to dt/dx with the second pixel above the first pixel at a normalized intensity value of 1.0 minus the normalized intensity of the first pixel.

for octants 5 and 8, the first pixel's normalized intensity is proportional to dt/dx with the second pixel below the first pixel at a normalized intensity value of 1.0 minus the normalized intensity of the first pixel.

for octants 3 and 6, the first pixel's normalized intensity is proportional to dt/dy with the second pixel to the right of the first pixel at a normalized intensity value of 1.0 minus the normalized intensity of the first pixel.

for octants 2 and 7, the first pixel's normalized intensity is proportional to dt/dy with the second pixel to the left of the first pixel at a normalized intensity value of 1.0 minus the normalized intensity of the first pixel.

Figure 32:
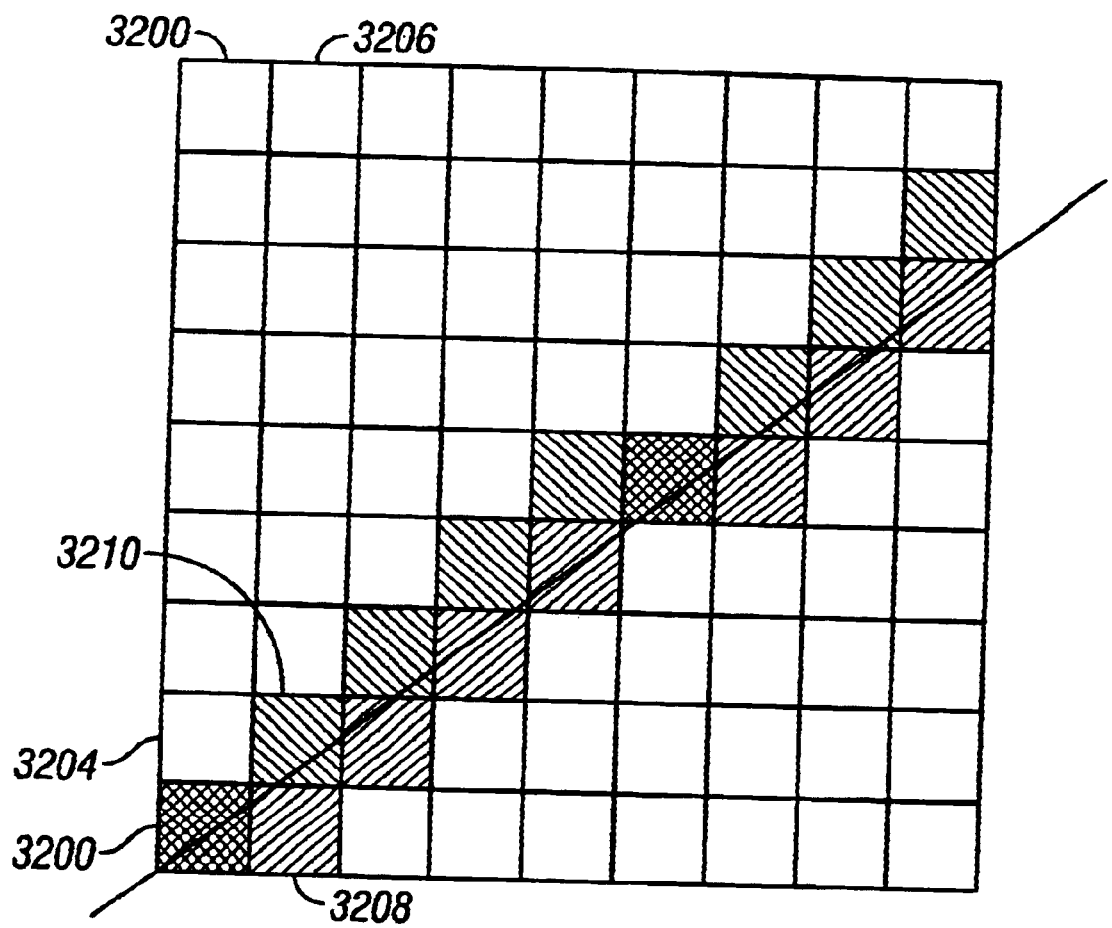
FIG. 32 is a diagram illustrating an example of a line drawn in accordance with a specific embodiment of the present invention.

FIG. 32 is a diagram illustrating an example of a line drawn in accordance with a specific embodiment of the present invention. In the first column 3200, two pixels 3202, 3204 are plotted. However, since the line runs nearly perfectly diagonally through pixel 3202, pixel 3202 may have an intensity value at or near 1.0 and pixel 3204 may have an intensity value at or near 0, thus appearing as only one pixel has been shaded. In the second column 3206, two pixels 3208, 3210 are plotted. Here, pixel 3208 may have some shading, but not all that much, whereas the majority of the intensity will be in pixel 3210. Thus, while upon close inspection one could see that two pixels are illuminated, when viewed from further away, it will appear as if the pixel is still only a single pixel thick, yet will still maintain its smoothness and avoidance of the staircase effect.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method for rendering the middle of a line using a matrix of pixels, wherein the line extends in the positive-x direction and positive-y direction or extends in the negative-x direction and positive-y direction, wherein the line has an absolute value of its slope between 0 and 1 and a current pixel has been defined, the method including:

for each column containing a portion of the middle of the line:

plotting a first pixel, the first pixel being a pixel which best represents the location of the line in the column;

plotting a second pixel above the first pixel;

assigning a normalized intensity value between 0 and 1.0 to the first pixel according to the amount of area above the line in the first pixel;

assigning a normalized intensity value for the second pixel equal to 1.0 minus the normalized intensity value of the first pixel; and shading the first and second pixels according to the normalized intensity values.

2. The method of claim 1, wherein if the line extends in the positive-x and positive-y directions the method further includes:

determining $\Delta x$ by computing $\Delta x = |x_e - x_s|$ wherein $(x_s, y_s)$ represents a starting point for the line and $(x_e, y_e)$ represents an ending point for the line, $x_s, y_s, x_e, y_e$ each having an integer portion and a fractional portion;

determining $\Delta y$ by computing $\Delta y = |y_e - y_s|$; and finding $dt(0) = (y_f * \Delta x) - (x_f * \Delta y)$, where $x_f$ is the fractional portion of $x_s$ and $y_f$ is the fractional portion of $y_s$.

3. The method of claim 1, wherein if the line extends in the negative-x and positive-y directions the method further includes:

determining $\Delta x$ by computing $\Delta x = |x_e - x_s|$ wherein $(x_s, y_s)$ represents a starting point for the line and $(x_e, y_e)$ represents an ending point for the line, $x_s, y_s, x_e, y_e$ each having an integer portion and a fractional portion;

determining $\Delta y$ by computing $\Delta y = |y_e - y_s|$; and finding $dt(0) = (y_f * \Delta x) - ((1 - x_f) * \Delta y)$, where $x_f$ is the fractional portion of $x_s$ and $y_f$ is the fractional portion of $y_s$.

4. The method of claim 2, wherein if the line extends in the positive-x and positive-y directions, said plotting a first pixel includes:

plotting the current pixel if $dt(n) <= 0.5 * \Delta x$ and plotting the pixel above the current pixel if $dt(n) > 0.5 * \Delta x$;

moving the current pixel to the right one pixel if $dt(n) <= 0.5 * \Delta x$ and moving the current pixel to the right and up one pixel if $dt(n) > 0.5 * \Delta x$;

correcting $dt(n)$ by computing $dt(n) = dt(n) - \Delta x$ if $dt(n) > 0.5 \Delta x$; and computing $dt(n+1) = dt(n) + \Delta y$.

5. The method of claim 3, wherein if the line extends in the negative-x and positive-y directions, said plotting a first pixel includes:

plotting the current pixel if $dt(n) <= 0.5 * \Delta$ and plotting the pixel above the current pixel if $dt(n) > 0.5 * \Delta x$;

moving the current pixel to the left one pixel if $dt(n) <= 0.5 * \Delta x$ and moving the current pixel to the left and up one pixel if $dt(n) > 0.5 * \Delta x$;

correcting $dt(n)$ by computing $dt(n) = dt(n) - \Delta x$ if $dt(n) > 0.5 * \Delta x$; and computing $dt(n+1) = dt(n) + \Delta y$.

6. The method of claim 4, wherein said assigning a normalized intensity value between 0 and 1.0 to the first pixel includes:

multiplying $dt(n)$ by $(1/\Delta x)$ to arrive at an index value, the index value corresponding to a cell in a normalized intensity lookup table.

7. The method of claim 5, wherein said assigning a normalized intensity value between 0 and 1.0 to the first pixel includes:

multiplying $dt(n)$ by $(1/\Delta x)$ to arrive at an index value, the index value corresponding to a cell in a normalized intensity lookup table.

8. A method for rendering the middle of a line using a matrix of pixels, wherein the line extends in the positive-x direction and positive-y direction or extends in the positive-x direction and negative-y direction, wherein the line has an absolute value of its slope greater than 1 and a current pixel has been defined, the method including:

for each column containing a portion of the middle of the line:
plotting a first pixel, the first pixel being a pixel which best represents the location of the line in the column;
plotting a second pixel directly to the right of the first pixel;
assigning a normalized intensity value between 0 and 1.0 to the first pixel according to the amount of area to the right of the line in the first pixel;
assigning a normalized intensity value for the second pixel equal to 1.0 minus the normalized intensity value of the first pixel; and
shading the first and second pixels according to the normalized intensity values.

9. The method of claim 8, wherein if the line extends in the positive-x and positive-y directions the method further includes:
determining $\Delta x$ by computing $\Delta x=|x_e-x_s|$ wherein $(x_s, y_s)$ represents a starting point for the line and $(x_e, y_e)$ represents an ending point for the line, $x_s, y_s, x_e, y_e$ each having an integer portion and a fractional portion;
determining $\Delta y$ by computing $\Delta y=|y_e-y_s|$; and
finding $dt(0)=(x_f*\Delta y)-(y_f*\Delta x)$, where $x_f$ is the fractional portion of $x_s$ and $y_f$ is the fractional portion of $y_s$.

10. The method of claim 8, wherein if the line extends in the positive-x and negative-y directions the method further includes:
determining $\Delta x$ by computing $\Delta x=|x_e-x_s|$ wherein $(x_s, y_s)$ represents a starting point for the line and $(x_e, y_e)$ represents an ending point for the line, $x_s, y_s, x_e, y_e$ each having an integer portion and a fractional portion;
determining $\Delta y$ by computing $\Delta y=|y_e-y_s|$; and
finding $dt(0)=(x_f*\Delta y)-((1-y_f)*\Delta x)$, where $x_f$ is the fractional portion of $x_s$ and $y_f$ is the fractional portion of $y_s$.

11. The method of claim 9, wherein if the line extends in the positive-x and positive-y directions, said plotting a first pixel includes:
plotting the current pixel if $dt(n)<=0.5*\Delta y$ and plotting the pixel to the right of the current pixel if $dt(n)>0.5*\Delta y$;
moving the current pixel up one pixel if $dt(n)<=0.5*\Delta y$ and moving the current pixel to the right and up one pixel if $dt(n)>0.5*\Delta y$;
correcting $dt(n)$ by computing $dt(n)=dt(n)-\Delta y$ if $dt(n)>0.5*\Delta y$; and
computing $dt(n+1)=dt(n)+\Delta x$.

12. The method of claim 10, wherein if the line extends in the positive-x and negative-y directions, said plotting a first pixel includes:
plotting the current pixel if $dt(n)<=0.5*\Delta y$ and plotting the pixel to the right of the current pixel if $dt(n)>0.5*\Delta y$;
moving the current pixel down one pixel if $dt(n)<=0.5*\Delta y$ and moving the current pixel to the right and down one pixel if $dt(n)>0.5*\Delta y$;
correcting $dt(n)$ by computing $dt(n)=dt(n)-\Delta y$ if $dt(n)>0.5*\Delta y$; and
computing $dt(n+1)=dt(n)+\Delta x$.

13. The method of claim 11, wherein said assigning a normalized intensity value between 0 and 1.0 to the first pixel includes:
multiplying $dt(n)$ by $(1/\Delta x)$ to arrive at an index value, the index value corresponding to a cell in a normalized intensity lookup table.

14. The method of claim 12, wherein said assigning a normalized intensity value between 0 and 1.0 to the first pixel includes:
multiplying $dt(n)$ by $(1/\Delta x)$ to arrive at an index value, the index value corresponding to a cell in a normalized intensity lookup table.

15. A method for rendering the middle of a line using a matrix of pixels, wherein the line extends in the negative-x direction and positive-y direction or extends in the negative-x direction and negative-y direction, wherein the line has an absolute value of its slope greater than 1 and a current pixel has been defined, the method including:

for each column containing a portion of the middle of the line:
plotting a first pixel, the first pixel being a pixel which best represents the location of the line in the column;
plotting a second pixel directly to the left of the first pixel;
assigning a normalized intensity value between 0 and 1.0 to the first pixel according to the amount of area to the left of the line in the first pixel;
assigning a normalized intensity value for the second pixel equal to 1.0 minus the normalized intensity value of the first pixel; and
shading the first and second pixels according to the normalized intensity values.

16. The method of claim 15, wherein if the line extends in the negative-x and positive-y directions the method further includes:
determining $\Delta x$ by computing $\Delta x=|x_e-x_s|$ wherein $(x_s, y_s)$ represents a starting point for the line and $(x_e, y_e)$ represents an ending point for the line, $x_s, y_s, x_e, y_e$ each having an integer portion and a fractional portion;
determining $\Delta y$ by computing $\Delta y=|y_e-y_s|$; and
finding $dt(0)=((1-x_f)*\Delta y)-(y_f*\Delta x)$, where $x_f$ is the fractional portion of $x_s$ and $y_f$ is the fractional portion of $y_s$.

17. The method of claim 15, wherein if the line extends in the negative-x and negative-y directions the method further includes:
determining $\Delta x$ by computing $\Delta x=|x_e-x_s|$ wherein $(x_s, y_s)$ represents a starting point for the line and $(x_e, y_e)$ represents an ending point for the line, $x_s, y_s, x_e, y_e$ each having an integer portion and a fractional portion;
determining $\Delta y$ by computing $\Delta y=|y_e-y_s|$; and
finding $dt(0)=((1-x_f)*\Delta y)-((1-y_f)*\Delta x)$, where $x_f$ is the fractional portion of $x_s$ and $y_f$ is the fractional portion of $y_s$.

18. The method of claim 16, wherein if the line extends in the negative-x and positive-y directions, said plotting a first pixel includes:
plotting the current pixel if $dt(n)<=0.5*\Delta y$ and plotting the pixel to the left of the current pixel if $dt(n)>0.5*\Delta y$;
moving the current pixel up one pixel if $dt(n)<=0.5*\Delta y$ and moving the current pixel to the left and up one pixel if $dt(n)>0.5*\Delta y$;
correcting $dt(n)$ by computing $dt(n)=dt(n)-\Delta y$ if $dt(n)>0.5*\Delta y$; and
computing $dt(n+1)=dt(n)+\Delta x$.

19. The method of claim 17, wherein if the line extends in the negative-x and negative-y directions, said plotting a first pixel includes:
plotting the current pixel if $dt(n)<=0.5*\Delta y$ and plotting the pixel to the left of the current pixel if $dt(n)>0.5*\Delta y$;
moving the current pixel down one pixel if $dt(n)<=0.5*\Delta y$ and moving the current pixel to the left and down one pixel if $dt(n)>0.5*\Delta y$;

correcting dt(n) by computing dt(n)=dt(n)−Δy if dt(n) >0.5*Δy; and computing dt(n+1)=dt(n)+Δx.

20. The method of claim 18, wherein said assigning a normalized intensity value between 0 and 1.0 to the first pixel includes:

multiplying dt(n) by (1/Δx) to arrive at an index value, the index value corresponding to a cell in a normalized intensity lookup table.

21. The method of claim 19, wherein said assigning a normalized intensity value between 0 and 1.0 to the first pixel includes:

multiplying dt(n) by (1/Δx) to arrive at an index value, the index value corresponding to a cell in a normalized intensity lookup table.

22. The method of claim 15, further including correcting the line for symmetry by shifting the current pixel to the right one pixel.

23. A method for rendering the middle of a line using a matrix of pixels, wherein the line extends in the positive-x direction and negative-y direction or extends in the negative-x direction and negative-y direction, wherein the line has an absolute value of its slope between 0 and 1, and a current pixel has been defined the method including:

for each column containing a portion of the middle of the line:

plotting a first pixel, the first pixel being a pixel which best represents the location of the line in the column;

plotting a second pixel below the first pixel;

assigning a normalized intensity value between 0 and 1.0 to the first pixel according to the amount of area below the line in the first pixel;

assigning a normalized intensity value for the second pixel equal to 1.0 minus the normalized intensity value of the first pixel; and shading the first and second pixels according to the normalized intensity values.

24. The method of claim 23, wherein if the line extends in the positive-x and negative-y directions the method further includes:

determining Δx by computing Δx=$|x_e-x_s|$ wherein ($x_s$, $y_s$) represents a starting point for the line and ($x_e$, $y_e$) represents an ending point for the line, $x_s$, $y_s$, $x_e$, $y_e$ each having an integer portion and a fractional portion;

determining Δy by computing Δy=$|y_e-y_s|$; and finding dt(0)=((1−$y_f$)*Δx)−($x_f$*Δy), where $x_f$ is the fractional portion of $x_s$ and $y_f$ is the fractional portion of $y_s$.

25. The method of claim 23, wherein if the line extends in the negative-x and negative-y directions the method further includes:

determining Δx by computing Δx=$|x_e-x_s|$ wherein ($x_s$, $y_s$) represents a starting point for the line and ($x_e$, $y_e$) represents an ending point for the line, $x_s$, $y_s$, $x_e$, $y_e$ each having an integer portion and a fractional portion;

determining Δy by computing Δy=$|y_e-y_s|$; and finding dt(0)=((1−$y_f$)*Δx)−((1−$x_f$)*Δy), where $x_f$ is the fractional portion of $x_s$ and $y_f$ is the fractional portion of $y_s$.

26. The method of claim 24, wherein if the line extends in the positive-x and negative-y directions, said plotting a first pixel includes:

plotting the current pixel if dt(n)<=0.5*Δx and plotting the pixel below the current pixel if dt(n)>0.5*Δx;

moving the current pixel to the right one pixel if dt(n)<= 0.5*Δx and moving the current pixel to the right and down one pixel if dt(n)>0.5*Δx;

correcting dt(n) by computing dt(n)=dt(n)−Δx if dt(n) >0.5*Δx; and computing dt(n+1)=dt(n)+Δy.

27. The method of claim 25, wherein if the line extends in the negative-x and negative-y directions, said plotting a first pixel includes:

plotting the current pixel if dt(n)<=0.5*Δx and plotting the pixel below the current pixel if dt(n)>0.5*Δx;

moving the current pixel to the left one pixel if dt(n)<= 0.5*Δx and moving the current pixel to the left and down one pixel if dt(n)>0.5*Δx;

correcting dt(n) by computing dt(n)=dt(n)−Δx if dt(n) >0.5*Δx; and computing dt(n+1)=dt(n)+Δy.

28. The method of claim 26, wherein said assigning a normalized intensity value between 0 and 1.0 to the first pixel includes:

multiplying dt(n) by (1/Δx) to arrive at an index value, the index value corresponding to a cell in a normalized intensity lookup table.

29. The method of claim 27, wherein said assigning a normalized intensity value between 0 and 1.0 to the first pixel includes:

multiplying dt(n) by (1/Δx) to arrive at an index value, the index value corresponding to a cell in a normalized intensity lookup table.

30. The method of claim 23, further including correcting the line for symmetry by shifting the current pixel up one pixel.

31. An apparatus for rendering the middle of a line using a matrix of pixels including:

a first pixel plotter, said first pixel plotter plotting, for each column containing a portion of the middle of the line, a first pixel which best represents the location of the line in the column;

a second pixel plotter coupled to said first pixel plotter, said second pixel plotter plotting a second pixel adjacent to the first pixel, location of the second pixel being selected from among above, below, right, and left of the first pixel in accordance with a direction and a slope of the line, the plotted second pixel abutting a first side of the first pixel;

an intensity value assignor coupled to said first pixel plotter and said second pixel plotter, said intensity value assignor assigning a normalized intensity value between 0 and 1.0 to the first pixel according to the amount of an area of the first pixel between the line and the first side, and assigning a normalized intensity value for the second pixel equal to 1.0 minus the normalized intensity value of the first pixel; and a pixel shader coupled to said intensity value assignor, said pixel shader shading the first and second pixels according to the normalized intensity values.

32. The apparatus of claim 31, further including:

a Δx determiner, said Δx determiner determining Δx by computing Δx=$|x_e-x_s|$ wherein ($x_s$, $y_s$) represents a starting point for the line and ($x_e$, $y_e$) represents an ending point for the line, $x_s$, $y_s$, $x_e$, $y_e$ each having an integer portion and a fractional portion;

a Δy determiner, said Δy determiner determining Δy by computing Δy=$|y_e-y_s|$; and a dt(0) finder coupled to said Δx determiner and said Δy determiner.

33. The apparatus of claim 32, wherein said first pixel plotter includes:
   a current pixel plotter coupled to said dt(0) finder;
   a current pixel mover coupled to said current pixel plotter;
   a dt(n) corrector coupled to said current pixel mover; and
   a dt(n+1) computer.

34. The apparatus of claim 33, wherein said intensity value assignor includes a (1/Δx) multiplier coupled to said dt(n) corrector.

35. A program storage device readable by a machine, tangibly embodying a program of instructions executable by the machine for rendering the middle of a line using a matrix of pixels, wherein the line extends in the positive-x direction and positive-y direction or extends in the negative-x direction and positive-y direction, wherein the line has an absolute value of its slope between 0 and 1, the method including:
   for each column containing a portion of the middle of the line:
      plotting a first pixel, the first pixel being a pixel which best represents the location of the line in the column;
      plotting a second pixel above the first pixel;
      assigning an intensity value between 0 and 1.0 to the first pixel according to the amount of area above the line in the first pixel;
      assigning an intensity value for the second pixel equal to 1.0 minus the intensity value of the first pixel; and
      shading the first and second pixels according to the intensity values.

36. A program storage device readable by a machine, tangibly embodying a program of instructions executable by the machine for rendering the middle of a line using a matrix of pixels, wherein the line extends in the positive-x direction and positive-y direction or extends in the positive-x direction and negative-y direction, wherein the line has an absolute value of its slope greater than 1, the method including:
   for each column containing a portion of the middle of the line:
      plotting a first pixel, the first pixel being a pixel which best represents the location of the line in the column;
      plotting a second pixel directly to the right of the first pixel;
      assigning an intensity value between 0 and 1.0 to the first pixel according to the amount of area to the right of the line in the first pixel;
      assigning an intensity value for the second pixel equal to 1.0 minus the intensity value of the first pixel; and
      shading the first and second pixels according to the intensity values.

37. A program storage device readable by a machine, tangibly embodying a program of instructions executable by the machine for rendering the middle of a line using a matrix of pixels, wherein the line extends in the negative-x direction and positive-y direction or extends in the negative-x direction and negative-y direction, wherein the line has an absolute value of its slope greater than 1, the method including:
   for each column containing a portion of the middle of the line:
      plotting a first pixel, the first pixel being a pixel which best represents the location of the line in the column;
      plotting a second pixel directly to the left of the first pixel;
      assigning an intensity value between 0 and 1.0 to the first pixel according to the amount of area to the left of the line in the first pixel;
      assigning an intensity value for the second pixel equal to 1.0 minus the intensity value of the first pixel; and
      shading the first and second pixels according to the intensity values.

38. A program storage device readable by a machine, tangibly embodying a program of instructions executable by the machine for rendering the middle of a line using a matrix of pixels, wherein the line extends in the positive-x direction and negative-y direction or extends in the negative-x direction and negative-y direction, wherein the line has an absolute value of its slope between 0 and 1, the method including:
   for each column containing a portion of the middle of the line:
      plotting a first pixel, the first pixel being a pixel which best represents the location of the line in the column;
      plotting a second pixel below the first pixel;
      assigning an intensity value between 0 and 1.0 to the first pixel according to the amount of area below the line in the first pixel;
      assigning an intensity value for the second pixel equal to 1.0 minus the intensity value of the first pixel; and
      shading the first and second pixels according to the intensity values.

39. The apparatus of claim 32 wherein said dt(0) finder finds:
   $dt(0)$ $(y_f*\Delta x)-(x_f*\Delta y)$ if the line extends in the positive-x and positive-y directions and has an absolute value of its slope between 0 and 1, where $x_f$ is the fractional portion of $x_s$ and $y_f$ is the fractional portion of $y_s$;
   $dt(0)=(y_f*\Delta x)-((1-x_f)*\Delta y)$ if the line extends in the negative-x and positive-y directions and has an absolute value of its slope between 0 and 1;
   $dt(0)=(x_f*\Delta y)-(y_f*\Delta x)$ if the line extends in the positive-x and positive-y directions and has an absolute value of its slope greater than 1;
   $dt(0)=(x_f*\Delta y)-((1-y)*\Delta x)$ if the line extends in the positive-x direction and negative-y direction and has an absolute value of its slope greater than 1;
   $dt(0)=((1-x_f)*\Delta y)-(y_f*\Delta x)$ if the line extends in the negative-x and positive-y directions and line has an absolute value of its slope greater than 1;
   $dt(0)=((1-x_f)*\Delta y)-((1-y_f)*\Delta x)$ if the line extends the negative-x and negative-y directions and line has an absolute value of its slope greater than 1;
   $dt(0)=((1-y_f)*\Delta x)-(x_f*\Delta y)$ if the line extends in the positive-x and negative-y directions and has an absolute value of its slope between 0 and 1; and
   $dt(0)=((1-y_{f)*\Delta x)-((}1-x_f)*\Delta y)$ if the line extends in the negative-x and negative-y directions and has an absolute value of its slope between 0 and 1.

40. A method for rendering the middle of a line using a matrix of pixels, wherein the line extends in a direction defined by x- and y-directions and has a slope defined by its absolute value, and wherein a current pixel has been defined, said method comprising:
   for each column containing a portion of the middle of the line:
      plotting a first pixel, the first pixel being a pixel which best represents the location of the line in the column;
      plotting a second pixel adjacent to the first pixel, location of the second pixel being selected from among above, below, right, and left of the first pixel in accordance with the direction and slope of the line, the plotted second pixel abutting a first side of the first pixel;

assigning a normalized intensity value between 0 and 1.0 to the first pixel according to the amount of an area of the first pixel between the line and the first side;

assigning a normalized intensity value for the second pixel equal to 1.0 minus the normalized intensity value of the first pixel; and shading the first and second pixels according to the respective normalized intensity values.

41. The method of claim 40, wherein said plotting a second pixel includes:

plotting the second pixel above the first pixel if the line extends in the positive-y direction and the slope is between 0 and 1;

plotting the second pixel to the right of the first pixel if the line extends in the positive-x direction and the slope is greater than 1;

plotting the second pixel to the left of the first pixel if the line extends in the negative-x direction and the slope is greater than 1; and plotting the second pixel below the first pixel if the line extends in the negative-y direction and the slope is between 0 and 1.

42. The method of claim 40, further includes:

determining $\Delta x$ by computing $\Delta x = |x_e - x_s|$ wherein $(x_s, y_s)$ represents a starting point for the line and $(x_e, y_e)$ represents an ending point for the line, $x_s$, $y_s$, $x_e$, $y_e$ each having an integer portion and a fractional portion; and determining $\Delta y$ by computing $\Delta y = |y_e - y_s|$.

43. The method of claim 42, further includes:

finding $dt(0)=(y_f*\Delta x)-(x_f*\Delta y)$ if the line extends in the positive-x and positive-y directions and the slope is between 0 and 1, where $x_f$ is the fractional portion of $x_s$ and $y_f$ is the fractional portion of $y_s$;

finding $dt(0)=(y_f*\Delta x)-((1-x_f)*\Delta y)$ if the line extends in the negative-x and positive-y directions and the slope is between 0 and 1;

finding $dt(0)=(x_f*\Delta y)-(y_f*\Delta x)$ if the line extends in the positive-x and positive-y directions and the slope is greater than 1;

finding $dt(0)=(x_f*\Delta y)-((1-y_f)*\Delta x)$ if the line extends in the positive-x direction and negative-y direction and the slope is greater than 1;

finding $dt(0)=((1-x_f)*\Delta y)-(y_f*\Delta x)$ if the line extends in the negative-x and positive-y directions and line has an absolute value of its slope greater than 1;

finding $dt(0)=((1-x_f)*\Delta y)-((1-y_f)*\Delta x)$ if the line extends the negative-x and negative-y directions and the slope is greater than 1;

finding $di(0)=((1-y_f)*\Delta x)-(x_f*\Delta y)$ if the line extends in the positive-x and negative-y directions and the slope is between 0 and 1; and finding $dt(0)=((1-y_f)*\Delta x)-((1-x_f)*\Delta y)$ if the line extends in the negative-x and negative-y directions and the slope is between 0 and 1.

44. The method of claim 43, wherein if the line extends in the positive-x and positive-y directions, said plotting a first pixel includes:

plotting the current pixel if $dt(n)<=0.5*\Delta x$ and plotting the pixel above the current pixel if $dt(n)>0.5*\Delta x$;

moving the current pixel to the right one pixel if $dt(n)<=0.5\Delta x$, and moving the current pixel to the right and up one pixel if $dt(n)>0.5\Delta x$;

correcting $dt(n)$ by computing $dt(n)=dt(n)-\Delta x$ if $dt(n)>0.5*\Delta x$; and computing $dt(n+1)=dt(n)+\Delta y$.

45. The method of claim 43, wherein if the line extends in the negative-x and positive-y directions, said plotting a first pixel includes:

plotting the current pixel if $dt(n)<=0.5*\Delta x$ and plotting the pixel above the current pixel if $dt(n)>0.5*\Delta x$;

moving the current pixel to the left one pixel if $dt(n)<=0.5*\Delta x$, and moving the current pixel to the left and up one pixel if $dt(n)>0.5*\Delta x$;

correcting $dt(n)$ by computing $dt(n)=dt(n)-\Delta x$ if $dt(n)>0.5*\Delta x$; and computing $dt(n+1)=dt(n)+\Delta y$.

46. The method of claim 43, wherein if the line extends in the positive-x and positive-y directions, said plotting a first pixel includes:

plotting the current pixel if $dt(n)<=0.5*\Delta y$ and plotting the pixel to the right of the current pixel if $dt(n)>0.5*\Delta y$;

moving the current pixel up one pixel if $dt(n)<=0.5*\Delta y$, and moving the current pixel to the right and up one pixel if $dt(n)>0.5*\Delta y$;

correcting $dt(n)$ by computing $dt(n)=dt(n)-\Delta y$ if $dt(n)>0.5*\Delta y$; and computing $dt(n+1)=dt(n)+\Delta x$.

47. The method of claim 43, wherein if the line extends in the positive-x and negative-y directions, said plotting a first pixel includes:

plotting the current pixel if $dt(n)<=0.5*\Delta y$ and plotting the pixel to the right of the current pixel if $dt(n)>0.5*\Delta y$;

moving the current pixel down one pixel if $dt(n)<=0.5*\Delta y$, and moving the current pixel to the right and down one pixel if $dt(n)>0.5*\Delta y$;

correcting $dt(n)$ by computing $dt(n)=dt(n)-\Delta y$ if $dt(n)>0.5*\Delta y$; and computing $dt(n+1)=dt(n)+\Delta x$.

48. The method of claim 43, wherein if the line extends in the negative-x and positive-y directions, said plotting a first pixel includes:

plotting the current pixel if $dt(n)<=0.5*\Delta y$ and plotting the pixel to the left of the current pixel if $dt(n)>0.5*\Delta y$;

moving the current pixel up one pixel if $dt(n)<=0.5*\Delta y$, and moving the current pixel to the left and up one pixel if $dt(n)>0.5*\Delta y$;

correcting $dt(n)$ by computing $dt(n)=dt(n)-\Delta y$ if $dt(n)>0.5*\Delta y$; and computing $dt(n+1)=dt(n)+\Delta x$.

49. The method of claim 43, wherein if the line extends in the negative-x and negative-y directions, said plotting a first pixel includes:

plotting the current pixel if $dt(n)<=0.5*\Delta y$ and plotting the pixel to the left of the current pixel if $dt(n)>0.5*\Delta y$;

moving the current pixel down one pixel if $dt(n)<=0.5*\Delta y$, and moving the current pixel to the left and down one pixel if $dt(n)>0.5*\Delta y$;

correcting $dt(n)$ by computing $dt(n)=dt(n)-\Delta y$ if $dt(n)>0.5*\Delta y$; and computing $dt(n+1)=dt(n)+\Delta x$.

50. The method of claim 43, wherein if the line extends in the positive-x and negative-y directions, said plotting a first pixel includes:

plotting the current pixel if $dt(n)<=0.5*\Delta x$ and plotting the pixel below the current pixel if $dt(n)>0.5*\Delta x$;

moving the current pixel to the right one pixel if $dt(n)<=0.5*\Delta x$, and moving the current pixel to the right and down one pixel if $dt(n)>0.5*\Delta x$;

correcting dt(n) by computing dt(n)=dt(n)−Δx if dt(n) >0.5*Δx; and computing dt(n+1)=dt(n)+Δy.

51. The method of claim 43, wherein if the line extends in the negative-x and negative-y directions, said plotting a first pixel includes:

plotting the current pixel if dt(n)<=0.5*Δx and plotting the pixel below the current pixel if dt(n)>0.5*Δx;

moving the current pixel to the left one pixel if dt(n)<= 0.5*Δx, and moving the current pixel to the left and down one pixel if dt(n)>0.5*Δx;

correcting dt(n) by computing dt(n)=dt(n)−Δx if dt(n) >0.5*Δx; and computing dt(n+1)=dt(n)+Δy.

52. An apparatus for rendering the middle of a line using a matrix of pixels, wherein the line extends in a direction defined by x- and y-directions and has a slope defined by its absolute value, and wherein a current pixel has been defined, said apparatus comprising:

means for plotting a first pixel for each column containing a portion of the middle of the line, the first pixel being a pixel which best represents the location of the line in the column;

means for plotting a second pixel adjacent to the first pixel, location of the second pixel being selected from among above, below, right, and left of the first pixel based on the direction and slope of the line, the plotted second pixel abutting a first side of the first pixel;

means for assigning a normalized intensity value between 0 and 1.0 to the first pixel according to the amount of an area of the first pixel between the line and the first side;

means for assigning a normalized intensity value for the second pixel equal to 1.0 minus the normalized intensity value of the first pixel; and means for shading the first and second pixels according to the respective normalized intensity values.

53. The apparatus of claim 52, wherein said means for plotting a second pixel includes:

means for plotting the second pixel above the first pixel if the line extends in the positive-y direction and the slope is between 0 and 1;

means for plotting the second pixel to the right of the first pixel if the line extends in the positive-x direction and the slope is greater than 1;

means for plotting the second pixel to the left of the first pixel if the line extends in the negative-x direction and the slope is greater than 1; and means for plotting the second pixel below the first pixel if the line extends in the negative-y direction and the slope is between 0 and 1.

54. The apparatus of claim 52, further includes:

means for determining Δx by computing Δx=|$x_e$−$x_s$| wherein ($x_s$, $y_s$) represents a starting point for the line and ($x_e$, $y_e$) represents an ending point for the line, $x_s$, $y_s$, $x_e$, $y_e$ each having an integer portion and a fractional portion; and means for determining Δy by computing Δy=|$y_e$−$y_s$|.

55. The apparatus of claim 54, further includes:

means for finding dt(0)=(y*Δx)−($x_f$*Δy) if the line extends in the positive-x and positive-y directions and the slope is between 0 and 1, where $x_f$ is the fractional portion of $x_s$ and $y_f$ is the fractional portion of $y_s$;

means for finding dt(0)=$y_f$*Δx)−((1−$x_f$)*Δy) if the line extends in the negative-x and positive-y directions and the slope is between 0 and 1;

means for finding dt(0)=($x_f$*Δy)−($y_f$*Δx) if the line extends in the positive-x and positive-y directions and the slope is greater than 1;

means for finding dt(0)=($x_f$*Δy)−((1−$y_f$)*Δx) if the line extends in the positive-x direction and negative-y direction and the slope is greater than 1;

means for finding dt(0)=((1−$x_f$)*Δy)−($y_f$*Δx) if the line extends in the negative-x and positive-y directions and line has an absolute value of its slope greater than 1;

means for finding dt(0)=((1−$x_f$)*Δy)−((1−$y_f$)*Δx) if the line extends the negative-x and negative-y directions and the slope is greater than 1;

means for finding dt(0)=((1−$y_f$)*Δx)−($x_f$*Δy) if the line extends in the positive-x and negative-y directions and the slope is between 0 and 1; and means for finding dt(0)=((1−$y_f$)*Δx)−((1−$x_f$)*Δy) if the line extends in the negative-x and negative-y directions and the slope is between 0 and 1.

56. A program storage device readable by a machine, tangibly embodying a program of instructions executable by the machine to perform a method for rendering the middle of a line using a matrix of pixels, wherein the line extends in a direction defined by x- and y-directions and has a slope defined by its absolute value, and wherein a current pixel has been defined, said method comprising:

for each column containing a portion of the middle of the line:

plotting a first pixel, the first pixel being a pixel which best represents the location of the line in the column;

plotting a second pixel adjacent to the first pixel, location of the second pixel being selected from among above, below, right, and left of the first pixel based on the direction and slope of the line, the plotted second pixel abutting a first side of the first pixel;

assigning a normalized intensity value between 0 and 1.0 to the first pixel according to the amount of an area of the first pixel between the line and the first side;

assigning a normalized intensity value for the second pixel equal to 1.0 minus the normalized intensity value of the first pixel; and shading the first and second pixels according to the respective normalized intensity values.

* * * * *

UNITED STATES PATENT AND TRADEMARK OFFICE
CERTIFICATE OF CORRECTION

PATENT NO. : 6,654,017 B1
DATED : November 25, 2003
INVENTOR(S) : Gunawan Ali-Santosa It is certified that error appears in the above-identified patent and that said Letters Patent is hereby corrected as shown below:

Title page,
Item [62], Related U.S. Application Data, replace the ending of the last line replace "in part of a application No, 09/544,658, filed on Apr. 6, 2000." with -- of application No. 09/544,658, filed on Apr. 6, 2000. --

Column 2,
Line 70, replace "$d_2=y_k+131\ m(x_k+1)-b$" with -- $d_2=y_k+1-m(x_k+1)-b$ --.

Column 3,
Line 35, replace "$P_{k+1}p_k=2\bullet y(x_{k+1}-x_k) - 2\bullet x(y_{k+1}+y_k)$" with --. $P_{k+1}-p_k = 2\bullet y\ (x_{k+1}-x_k) - 2\bullet x\ (y_{k+1}+y_k)$ --.

Column 7,
Line 25, replace "positively" with -- positive – y --

Column 12,
Line 36, replace "comers" with -- corners --
Lines 37 and 42, replace "comer" with -- corner --.
Line 51, replace "different-vertical" with -- different vertical --.

Column 13,
Line 20, replace "comers" with -- corners --.
Line 21, replace "comer" with -- corner --
Line 26, replace "comer" with -- corner --

Column 14,
Line 38, replace "comers" with -- corners --
Line 57, replace "$y_i=y_f-f * (\Delta y/\Delta x)$" with -- $y_i = y_f - x_f * (\Delta y/\Delta x)$ Column 15,
Line 6, replace "Ax" with -- $\Delta x$ --

Column 16,
Line 9, replace "positively" with -- positive - y --
Line 55, replace "dt(n)>0.5* Ax. with -- d(t)n>0.5* $\Delta x$. --

Column 17,
Line 27, replace "$x_5$" with -- $x_s$ --

UNITED STATES PATENT AND TRADEMARK OFFICE
CERTIFICATE OF CORRECTION

PATENT NO. : 6,654,017 B1
DATED : November 25, 2003
INVENTOR(S) : Gunawan Ali-Santosa It is certified that error appears in the above-identified patent and that said Letters Patent is hereby corrected as shown below:

Column 18,
Line 15, replace "dt(0) ((1-$x_f$)" with -- dt(0) = ((1-$x_f$) --
Line 41, replace "$x_5$" with -- $x_s$ --

Column 19,
Line 46, replace "dt(n)>0.5$\Delta$x" with -- dt(n)>0.5*$\Delta$x --

Column 20,
Line 56, replace "positively" with -- positive - y --

Column 21,
Line 9, replace "negatively" with -- negative - y --
Line 62, replace "positively" with -- positive - y --

Column 23,
Line 53, replace "Octant 5: dt(0)=((1-$y_f$)*$\Delta$x)-((1-x)*$\Delta$y) with -- Octant 5: dt(0)=((1-$y_f$)*$\Delta$x)-((1-$x_f$*$\Delta$y) --

Column 26,
Line 38, replace ">0.5$\Delta$x" with -- >0.5*$\Delta$x --

UNITED STATES PATENT AND TRADEMARK OFFICE
CERTIFICATE OF CORRECTION

PATENT NO.    : 6,654,017 B1
DATED         : November 25, 2003
INVENTOR(S)   : Gunawan Ali-Santosa It is certified that error appears in the above-identified patent and that said Letters Patent is hereby corrected as shown below:

Column 33,
Line 50, replace "d$i$ (0)" with -- d$t$ (0) --
Line 62, replace "0.5Δx" with -- 0.5*Δx --
Line 63, replace "dt(n)>0.5Δx" with -- dt(n)>0.5*Δx --

Column 36,
Line 2, replace "dt(0)=(y*Δx)-(x$_f$*Δy) with -- dt(0)=(y$_f$*Δx)-(x$_f$*Δy) --

Signed and Sealed this

Third Day of August, 2004

JON W. DUDAS
*Acting Director of the United States Patent and Trademark Office*